US009484038B2

(12) United States Patent
Del Galdo et al.

(10) Patent No.: US 9,484,038 B2
(45) Date of Patent: Nov. 1, 2016

(54) APPARATUS AND METHOD FOR MERGING GEOMETRY-BASED SPATIAL AUDIO CODING STREAMS

(75) Inventors: Giovanni Del Galdo, Heroldsberg (DE); Oliver Thiergart, Forchheim (DE); Juergen Herre, Buckenhof (DE); Fabian Kuech, Erlangen (DE); Emanuel Habets, Spardorf (DE); Alexandra Craciun, Erlangen (DE); Achim Kuntz, Hemhofen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 863 days.

(21) Appl. No.: 13/445,585

(22) Filed: Apr. 12, 2012

(65) Prior Publication Data

US 2013/0142341 A1    Jun. 6, 2013

(30) Foreign Application Priority Data

Dec. 2, 2011    (EP) .................................. 11191816

(51) Int. Cl.
*H04R 5/00* (2006.01)
*G10L 19/008* (2013.01)
(Continued)

(52) U.S. Cl.
CPC ............ *G10L 19/008* (2013.01); *G06K 9/624* (2013.01); *G10L 21/0272* (2013.01); *G10L 2021/02166* (2013.01); *H04R 5/00* (2013.01); *H04S 2420/03* (2013.01); *H04S 2420/11* (2013.01)

(58) Field of Classification Search
USPC ...... 381/10, 17–23, 307; 704/500, 201–205; 700/94
See application file for complete search history.

(56) References Cited

U.S. PATENT DOCUMENTS 6,363,155 B1 *   3/2002   Horbach ..................... 381/17
7,533,346 B2 *   5/2009   McGrath et al. ........... 715/757
(Continued)

FOREIGN PATENT DOCUMENTS

CN    101151659 A    3/2008
CN    102138342 A    7/2011
(Continued)

OTHER PUBLICATIONS

Del Galdo, et al., "Efficient merging of multiple audio streams for spatial sound reproduction in Directional Audio Condition", IEEE International Conference on Acoustics, Speech and Signal Processing; Piscataway, NJ, USA, Apr. 19, 2009, pp. 265-268.
(Continued)

*Primary Examiner* — Davetta W Goins
*Assistant Examiner* — Kuassi Ganmavo
(74) *Attorney, Agent, or Firm* — Michael A. Glenn; Perkins Coie LLP

(57) ABSTRACT

An apparatus for generating a merged audio data stream is provided. The apparatus includes a demultiplexer for obtaining a plurality of single-layer audio data streams, wherein each input audio data stream includes one or more layers, wherein the demultiplexer is adapted to demultiplex each one of one or more input audio data streams having one or more layers into two or more demultiplexed audio data streams having exactly one layer. Furthermore, the apparatus includes a merging module for generating the merged audio data stream based on the plurality of single-layer audio data streams. Each layer of the input data audio streams, of the demultiplexed audio data streams, of the single-layer data streams and of the merged audio data stream includes a pressure value of a pressure signal, a position value and a diffuseness value as audio data.

17 Claims, 43 Drawing Sheets

(51) Int. Cl.

| | | |
|---|---|---|
| G10L 21/0216 | (2013.01) | |
| G06K 9/62 | (2006.01) | |
| G10L 21/0272 | (2013.01) | |

(56) References Cited

U.S. PATENT DOCUMENTS

| | | | | |
|---|---|---|---|---|
| 8,139,775 | B2* | 3/2012 | Hilpert et al. | 381/22 |
| 8,364,197 | B2* | 1/2013 | Binning | 455/550.1 |
| 8,731,923 | B2* | 5/2014 | Shu | 704/243 |
| 2006/0171547 | A1 | 8/2006 | Lokki et al. | |
| 2007/0100605 | A1* | 5/2007 | Renevey et al. | 704/201 |
| 2008/0232601 | A1* | 9/2008 | Pulkki | H04S 7/302 381/1 |
| 2008/0292112 | A1* | 11/2008 | Valenzuela et al. | 381/97 |
| 2008/0306739 | A1* | 12/2008 | Nakajima et al. | 704/270 |

FOREIGN PATENT DOCUMENTS

| | | |
|---|---|---|
| EP | 2154910 | 2/2010 |
| EP | 2285139 A2 | 2/2011 |
| EP | 2346028 A1 | 7/2011 |
| EP | 2324645 | 2/2012 |
| JP | 2009537876 A | 10/2009 |
| JP | 2010109609 A | 5/2010 |
| KR | 1020070108302 A | 11/2007 |
| KR | 1020110040899 A | 4/2011 |
| KR | 1020130092604 A | 8/2013 |
| WO | WO 2010017967 A1 * | 2/2010 |
| WO | 2011/073210 A1 | 6/2011 |

OTHER PUBLICATIONS

Anderson, , "Optimum Control Logic for Successive Approximation Analog-To-Digital Converters", NASA: JPL Technical Report 32-1526, vol. XIII; Dec. 1972, 168-176.

Bonizzoni, et al., "Third-Order EA Modulator with 61-dB SNR and 6-MHz Bandwidth Consuming 6 mW", Dept. of Electron., Univ. of Pavia, Pavia; 2008 IEEE.

Cong, et al., "A New Charge Redistribution D/A and A/D Converter Technique—Pseudo C-2C Ladder", Proc. 43rd IEEE Midwest Symp. on Circuits and Systems, Lansing, MI. Aug 8-11, 2000.

Del Galdo, , "Efficient Methods for High Quality Merging of Spatial Audio Streams in Directional Audio Coding", Presented at the 126th Convention: May 7-10, 2009 Munich, Germany.

Del Galdo, , "Generating Virtual Microphone Signals Using Geometrical Information Gathered by Distributed Arrays", Fraunhofer Institute for Integrated Circuits IIS, Erlangen, Germany; International Audio Laboratories Erlangen, Germany; 2011 Joint Workshop on Hands-Free Speech Communication and Microphone Arrays; May 30-Jun. 1, 2011.

Engdegard, et al., "Spatial Audio Object Coding (SAOC)—The Upcoming MPEG Standard on Parametric Object Based Audio Coding", Presented at the 124th Convention; May 17-20, 2008 Amsterdam, The Netherlands.

Faller, , "Microphone Front-Ends for Spatial Audio Coders", Presented at the 125th Convention; Oct. 2-5, 2008 San Francisco, CA, USA.

Fathy, , "Sound Energy and Sound Intensity", Essex: Elsevier Science Publishers Ltd., 1989.

Furness, , "Ambisonics—An Overview", MinimElectronicsLimited,Burnham,Slough,U.K.; AES 8th International Conference; Apr. 1990, pp. 181-189., 181-189.

Gallo, , "Extracting and Re-rendering Structured Auditory Scenes from Field Recordings", AES 30th International Conference, Saariselkä, Finland, Mar. 15-17, 2007.

Gambini, , "Low-Power Successive Approximation Converter With 0.5 V Supply in 90 nm CMOS", University of California; Journal of Solid-State Circuits, vol. 42, No. 11, Nov. 2007 IEEE.

Gerzon, , "Ambisonics in Multichannel Broadcastingand Video", 74th Convention of the Audio Engineering Society, New York, Oct. 8-12, 1983, Oct. 18-12, 1983.

Herre, , "Interactive Teleconferencing Combining Spatial Audio Object Coding and DirAC Technology", Presented at the 128th Convention: May 22-25, 2010 London, UK.

Hindman, et al., "Experimentally Measured Input Referred Voltage Offsets and Kickback Noise in RHBD Analog Comparator Arrays", Arizona State University, Tempe, AZ; IEEE Transactions on Nuclear Science, vol. 54, No. 6, Dec. 2007.

Jian, et al., "A 59mW 10b 40Msample/ s Pipel ined ADC", Shanghai, China; Chinese Institute of Electronics 2005.

Kallinger, , "A Spatial Filtering Approach for Directional Audio Coding", Presented at the 126th Convention; May 7-10, 2009 Munich, Germany.

Kallinger, , "Enhanced Direction Estimation Using Microphone Arrays for Directional Audio Coding", Fraunhofer Institute for Integrated Circuits IIS, Erlangen, Germany,; Laboratory of Acoustics and Audio Sig. Proc., TKK, Helsinki, Finland, 2008 IEEE.

Kuntz, , "Limitations in the Extrapolation Ofwave Fields From Circular Measurements", Multimedia Communications and Signal Processing; Univ. Erlangen-Nuremberg, 91058 Erlangen, Germany; 15th European Signal Processing Conference (EUSIPCO 2007), Poznan, Poland, Sep. 3-7, 2007, copyright by EURASIP.

Meinerzhagen, , "Design of a 12-bit low-power SAR A/D Converter for a Neurochip", Swiss Federal Institute of Technology, Lausanne; Aug. 15, 2008.

Pulkki, , "Directional audio coding in spatial sound reproduction and stereo upmixing", AES 28th International Conference, Piteå, Sweden, Jun. 30 to Jul. 21, 2006.

Pulkki, , "Spatial Sound Reproduction with Directional Audio Coding", Laboratory of Acoustics and Audio Signal Processing, Helsinki University of Technology, FI-02015 TKK, Finland; J. Audio Eng. Soc., vol. 55, No. 6, Jun. 2007.

Rickard, , "On the Approximate W-Disjoint Orthogonality of Speech", Siemens Corporate Research, USA, Princeton University, USA; 2002 IEEE.

Roy, , "Direction-of-Arrival Estimation of Subspace Rotation Methods—ESPRIT", Information Systems Laboratory, Stanford University, Stanford, CA 94305; 1986 IEEE.

Roy, , "ESPRIT-Estimation of Signal Parameters Via Rotational Invariance Techniques", 1k.F.E Transactions on Acoustics. Speech. and Signal Processing. vol. 37. No. 7. Jul. 1989.

Schmidt, , "Multiple Emitter Location and Signal Parameter—Estimation", IEEE Transactions on Antennas and Propagation, vol. AP-34, No. 3, Mar. 1986.

Schultz-Amling, , "Acoustical Zooming Based on a Parametric Sound Field Representation", Presented at the 128th Convention; May 22-25, 2010 London, UK.

Schultz-Amling, , "Planar Microphone Array Processing for the Analysis and Reproduction of Spatial Audio using Directional Audio Coding", Presented at the 124th Convention; May 17-20, 2008 Amsterdam, The Netherlands.

Singh, et al., "C-2C Ladder-Based D/A Converters for PCM Codecs", Bangalore, India; Dec. 1987 IEEE; Journal of Solid-State Circuits, vol. SC-22 No. 6.

Singh, et al., "Design methodologies for C-2C ladder-based D/A convertors for PCM codecs", Central Labs R&D, Indian Telephone Ind. Ltd., Bangalore; IEE Proceedings, vol. 135, Pt. G, No. 4, Aug. 1988.

Steele, , "Optimal Triangulation of Random Samples in the Plane", Stanford University, Stanford, CA; The Annals of Probability; 1982m/vik, 10, No. 3, pp. 548-553, 548-553.

Uhle, et al., "A Supervised Learning Approach to Ambience Extraction From Mono Recordings for Blind Upmixing", Proc. of the 11th Int. Conference on Digital Audio Effects (DAFx-08), Espoo, Finland, Sep. 1-4, 2008.

Walther, , "Linear Simulation of Spaced Microphone Arrays Using B-Format Recordings", Presented at the 128th Convention; May 22-25, 2010 London, UK.

Williams, , "The Inverse Problem: Planar Nearfield Acoustical Holography", Fourier Acoustics: Sound Radiation and Nearfield Acoustical Holography, Academic Press, 1999.

Yuan, , "A 10-bit 5-MS/s Successive Approximation ADC Cell Used in a 70-MS/s ADC Array in 1.2-um CMOS", Geneva, Switzerland; IEEE Journal of Solid-State Circuits, vol. 29, No. 8, Aug. 1994.

* cited by examiner

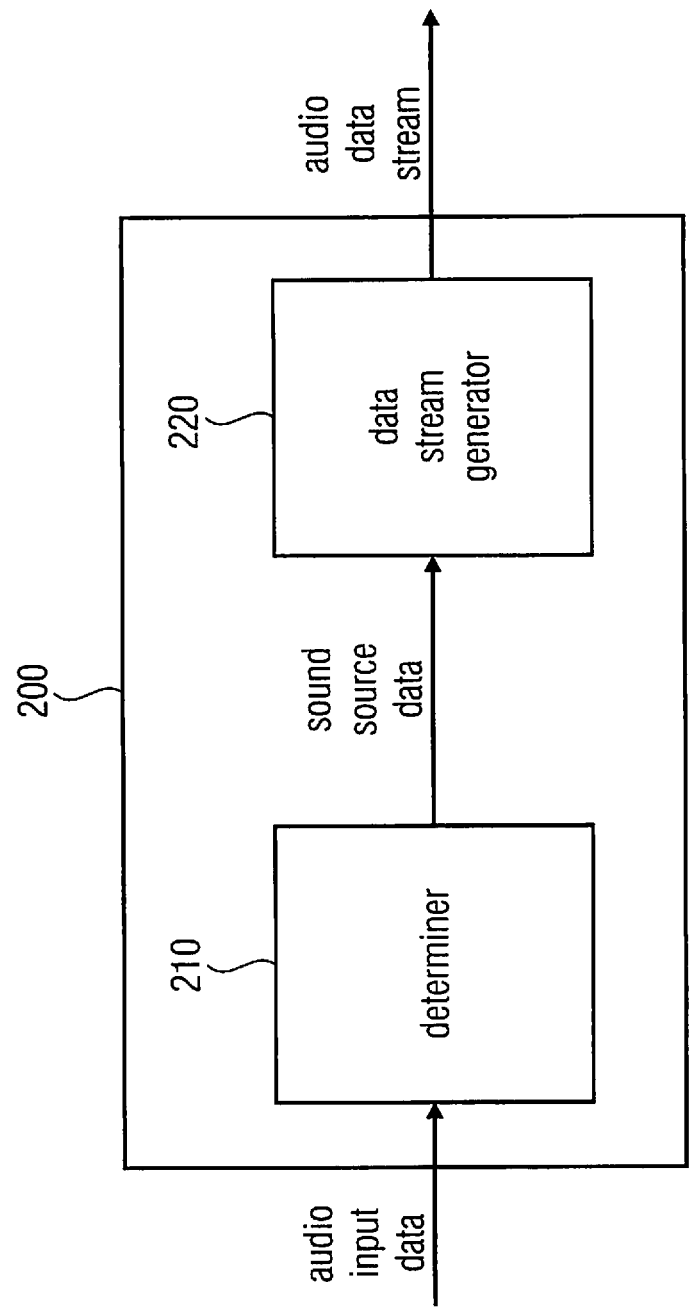

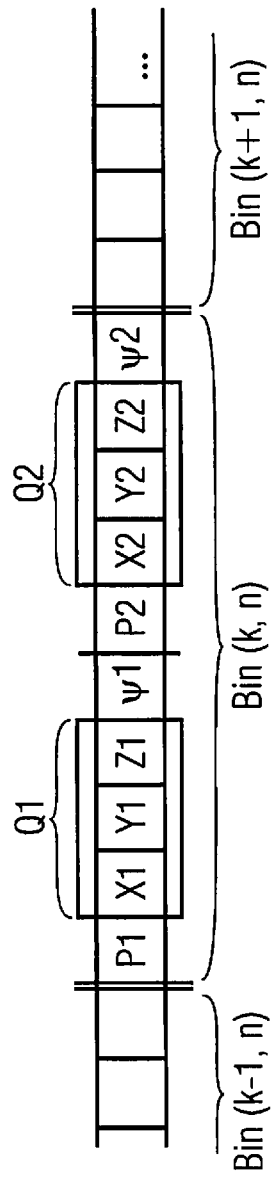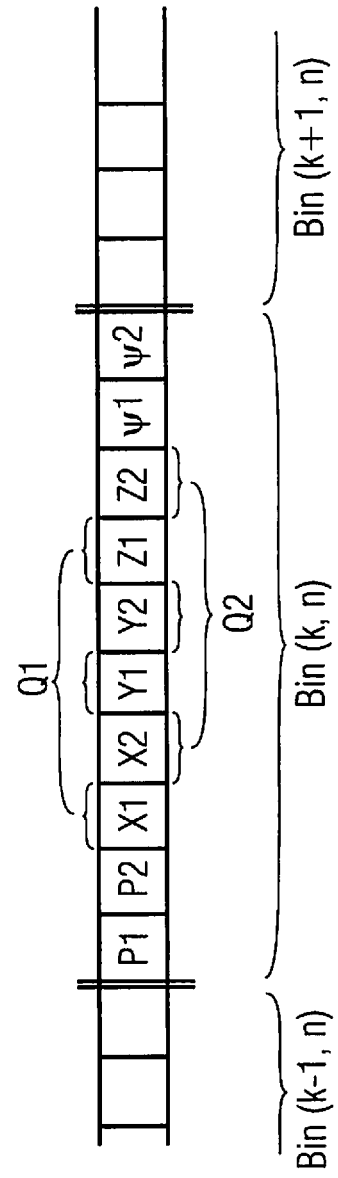

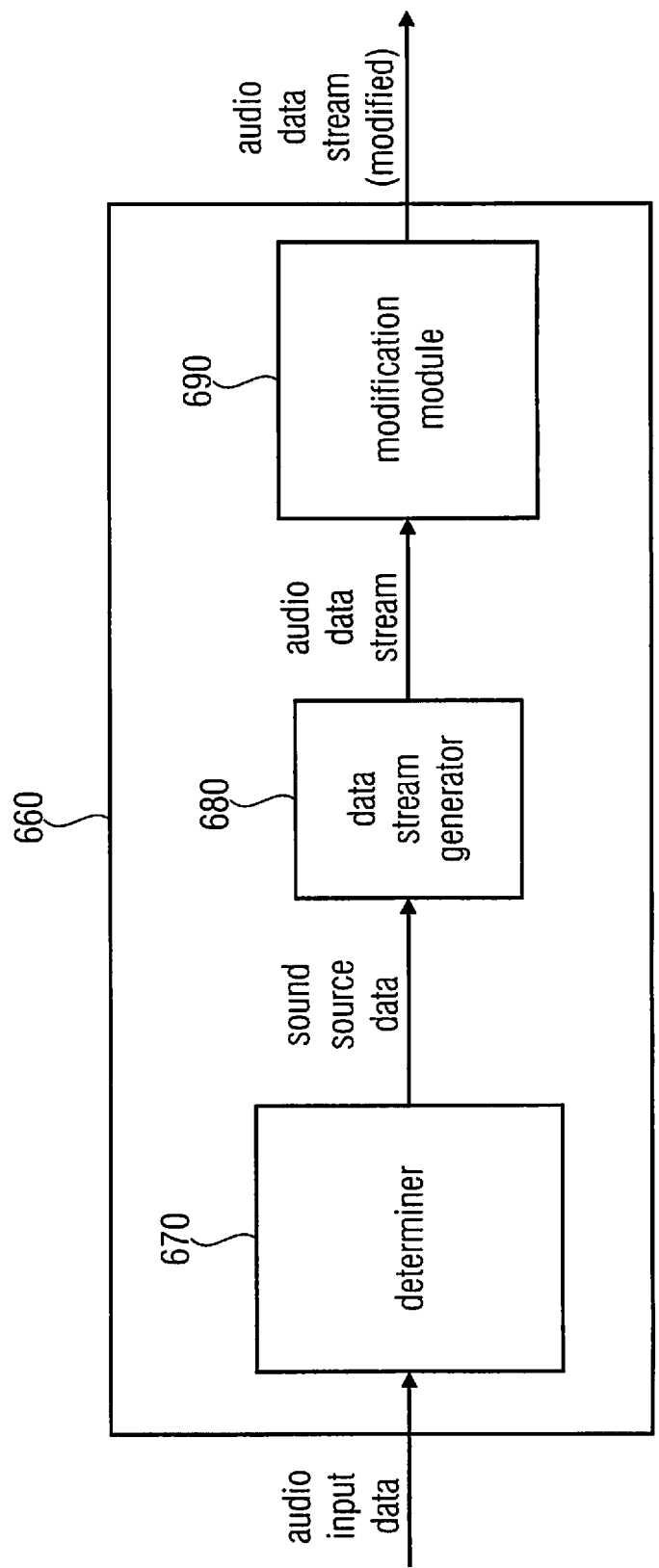

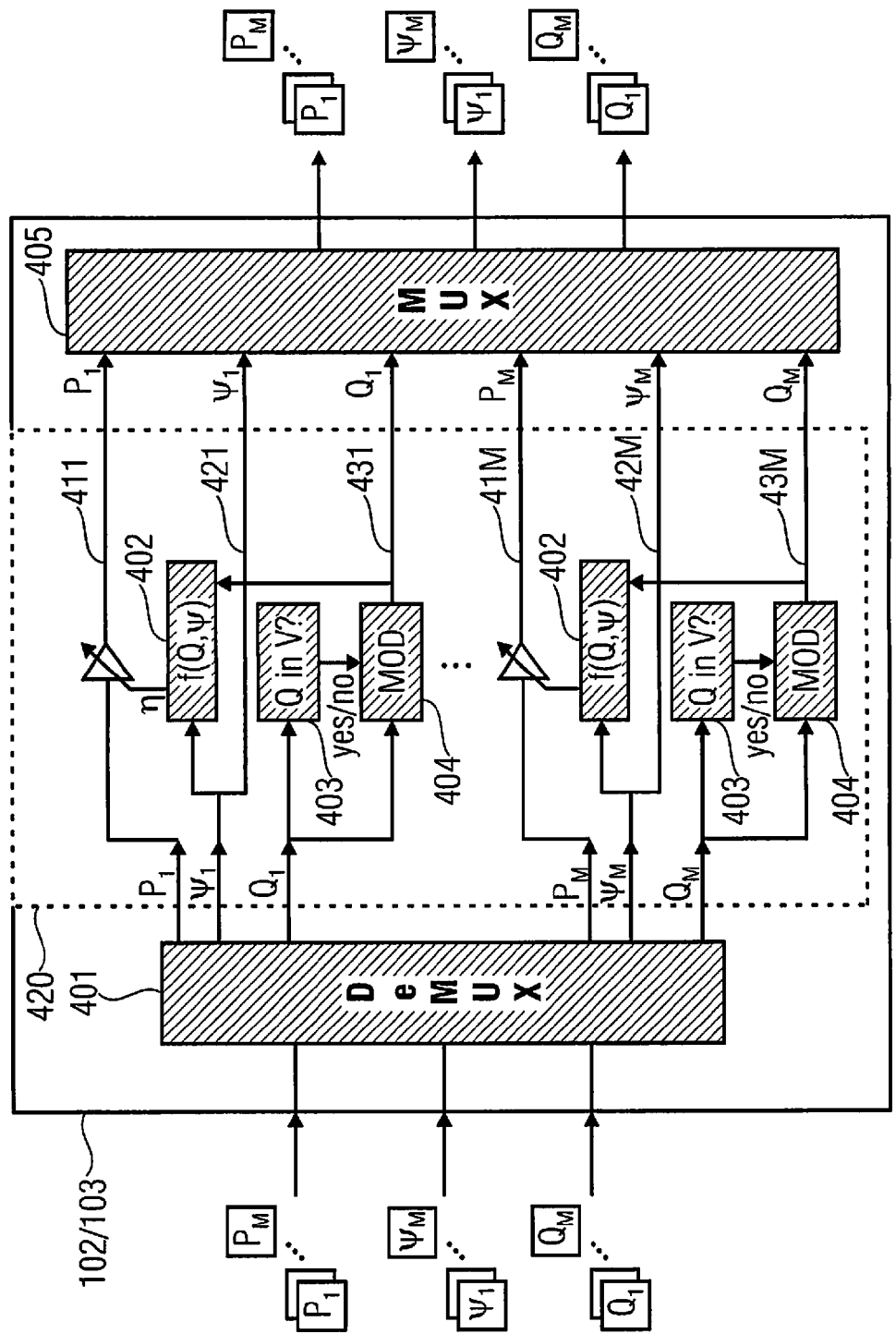

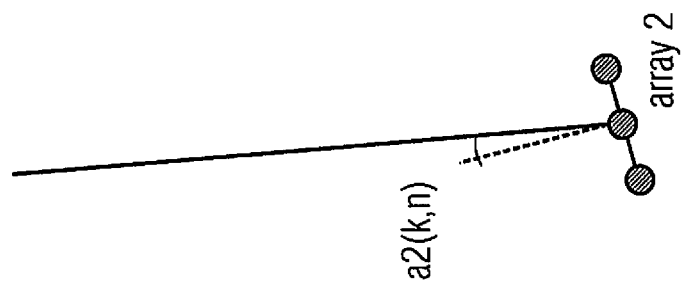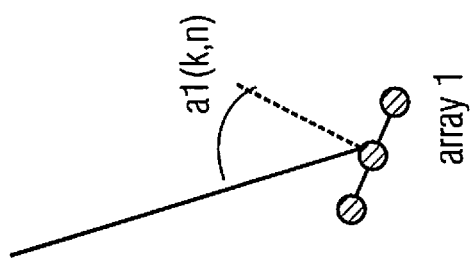
FIG 25

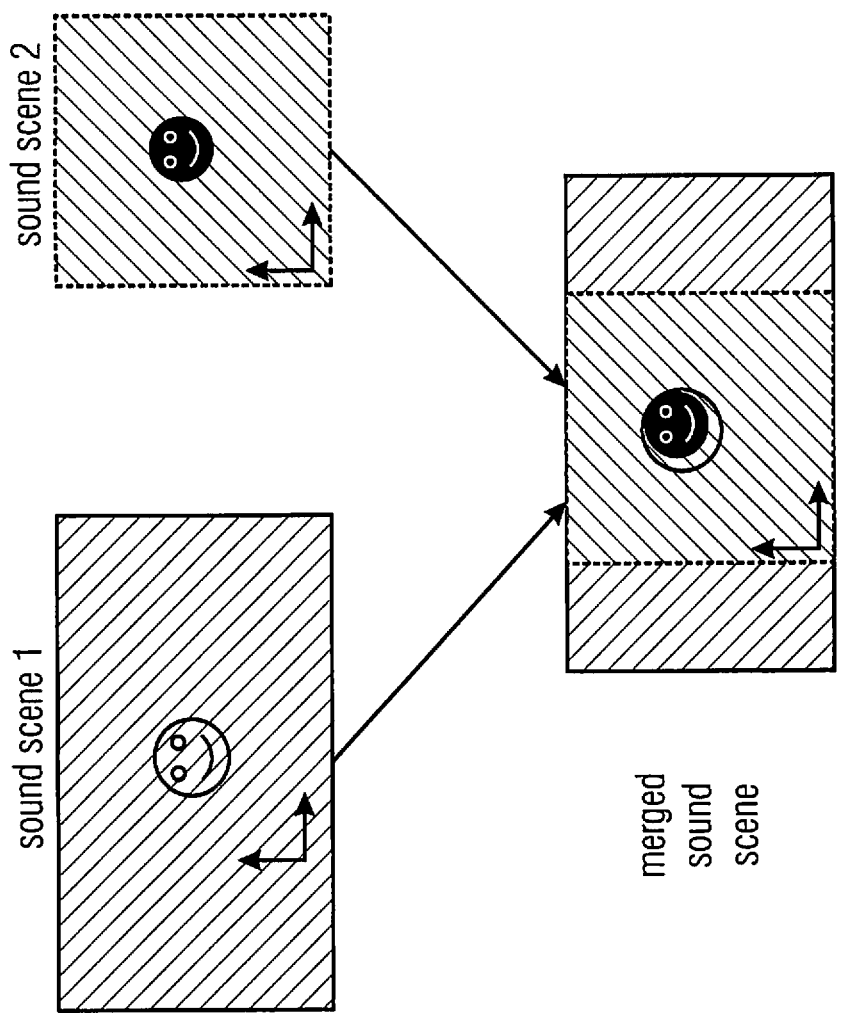

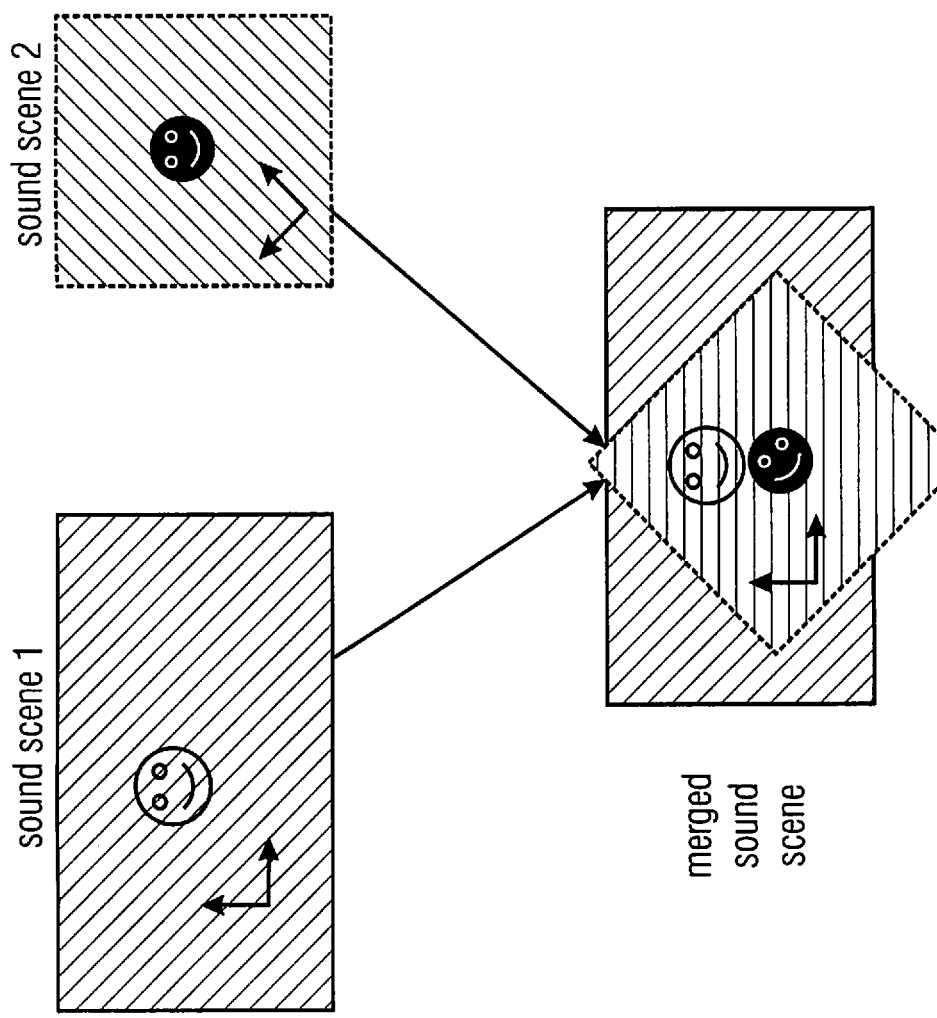

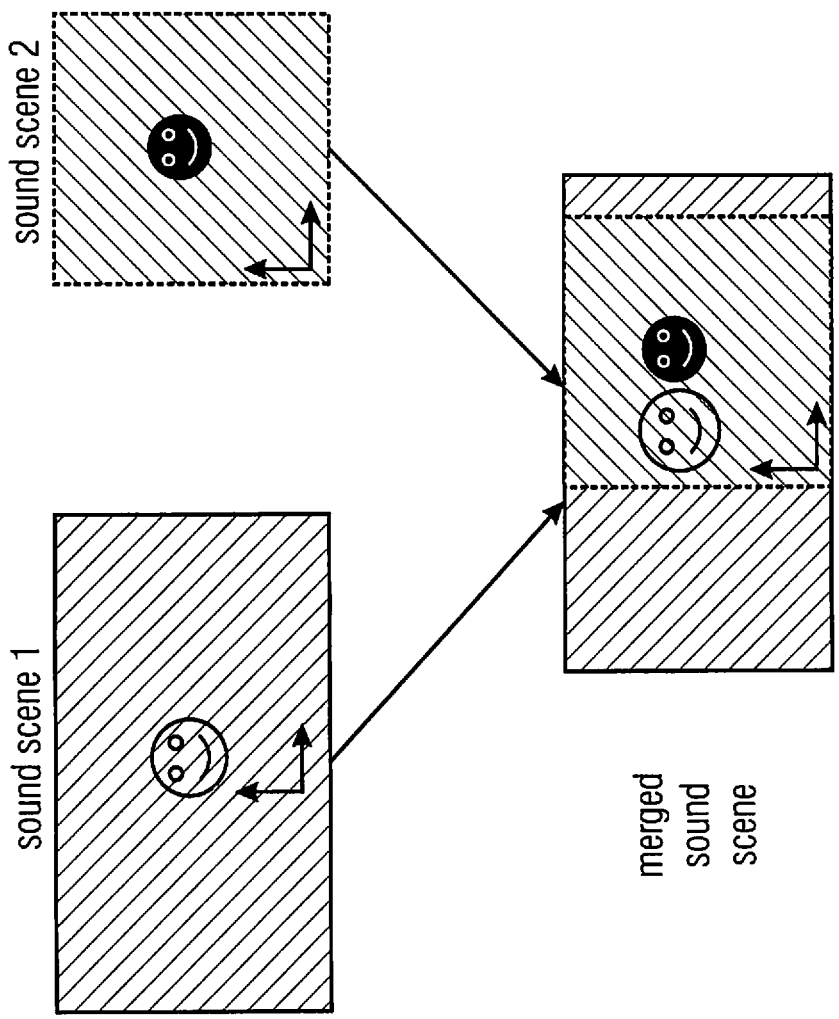

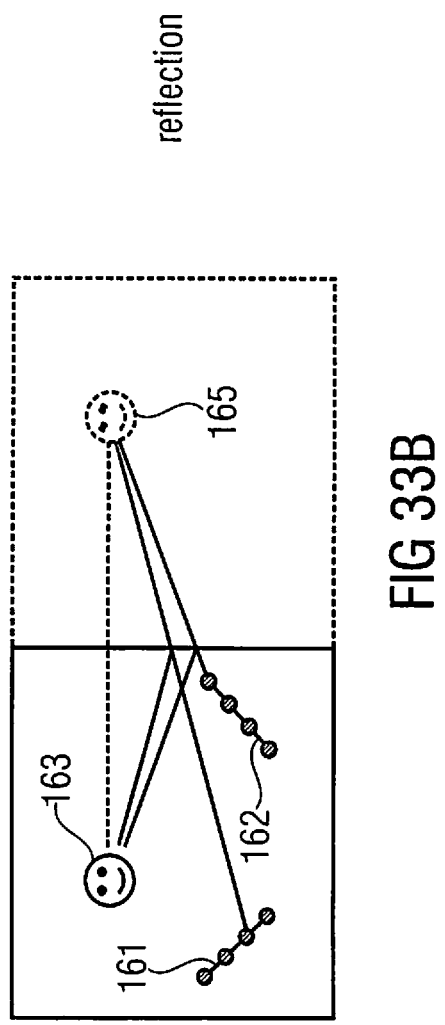

APPARATUS AND METHOD FOR MERGING GEOMETRY-BASED SPATIAL AUDIO CODING STREAMS

CROSS-REFERENCE TO RELATED APPLICATIONS

This application claims priority from European Patent Application No. 11191816.5, which was filed on Dec. 2, 2011, and is incorporated herein in its entirety by reference.

BACKGROUND OF THE INVENTION

The present invention relates to audio processing and, in particular, to an apparatus and method for generating a merged audio data stream is provided.

Audio processing and, in particular, spatial audio coding, becomes more and more important. Traditional spatial sound recording aims at capturing a sound field such that at the reproduction side, a listener perceives the sound image as it was at the recording location. Different approaches to spatial sound recording and reproduction techniques are known from the state of the art, which may be based on channel-, object- or parametric representations.

Channel-based representations represent the sound scene by means of N discrete audio signals meant to be played back by N loudspeakers arranged in a known setup, e.g. a 5.1 surround sound setup. The approach for spatial sound recording usually employs spaced, omnidirectional microphones, for example, in AB stereophony, or coincident directional microphones, for example, in intensity stereophony. Alternatively, more sophisticated microphones, such as a B-format microphone, may be employed, for example, in Ambisonics, see:

[1] Michael A. Gerzon. Ambisonics in multichannel broadcasting and video. J. Audio Eng. Soc, 33(11):859-871, 1985.

The desired loudspeaker signals for the known setup are derived directly from the recorded microphone signals and are then transmitted or stored discretely. A more efficient representation is obtained by applying audio coding to the discrete signals, which in some cases codes the information of different channels jointly for increased efficiency, for example in MPEG-Surround for 5.1, see:

[21] J. Herre, K. Kjörling, J. Breebaart, C. Faller, S. Disch, H. Purnhagen, J. Koppens, J. Hilpert, J. Roden, W. Oomen, K. Linzmeier, K. S. Chong: "MPEG Surround—The ISO/MPEG Standard for Efficient and Compatible Multichannel Audio Coding", 122nd AES Convention, Vienna, Austria, 2007, Preprint 7084.

A major drawback of these techniques is, that the sound scene, once the loudspeaker signals have been computed, cannot be modified.

Object-based representations are, for example, used in Spatial Audio Object Coding (SAOC), see

[25] Jeroen Breebaart, Jonas Engdegård, Cornelia Falch, Oliver Hellmuth, Johannes Hilpert, Andreas Hoelzer, Jeroens Koppens, Werner Oomen, Barbara Resch, Erik Schuijers, and Leonid Terentiev. Spatial audio object coding (saoc)—the upcoming mpeg standard on parametric object based audio coding. In Audio Engineering Society Convention 124, 5 2008.

Object-based representations represent the sound scene with N discrete audio objects. This representation gives high flexibility at the reproduction side, since the sound scene can be manipulated by changing e.g. the position and loudness of each object. While this representation may be readily available from an e.g. multitrack recording, it is very difficult to be obtained from a complex sound scene recorded with a few microphones (see, for example, [21]). In fact, the talkers (or other sound emitting objects) have to be first localized and then extracted from the mixture, which might cause artifacts.

Parametric representations often employ spatial microphones to determine one or more audio downmix signals together with spatial side information describing the spatial sound. An example is Directional Audio Coding (DirAC), as discussed in

[29] Ville Pulkki. Spatial sound reproduction with directional audio coding. J. Audio Eng. Soc, 55(6):503-516, June 2007.

The term "spatial microphone" refers to any apparatus for the acquisition of spatial sound capable of retrieving direction of arrival of sound (e.g. combination of directional microphones, microphone arrays, etc.).

The term "non-spatial microphone" refers to any apparatus that is not adapted for retrieving direction of arrival of sound, such as a single omnidirectional or directive microphone.

Another example is proposed in:

[4] C. Faller. Microphone front-ends for spatial audio coders. In Proc. of the AES $125^{th}$ International Convention, San Francisco, October 2008.

In DirAC, the spatial cue information comprises the direction of arrival (DOA) of sound and the diffuseness of the sound field computed in a time-frequency domain. For the sound reproduction, the audio playback signals can be derived based on the parametric description. These techniques offer great flexibility at the reproduction side because an arbitrary loudspeaker setup can be employed, because the representation is particularly flexible and compact, as it comprises a downmix mono audio signal and side information, and because it allows easy modifications on the sound scene, for example, acoustic zooming, directional filtering, scene merging, etc.

However, these techniques are still limited in that the spatial image recorded is relative to the spatial microphone used. Therefore, the acoustic viewpoint cannot be varied and the listening-position within the sound scene cannot be changed.

A virtual microphone approach is presented in

[22] Giovanni Del Galdo, Oliver Thiergart, Tobias Weller, and E. A. P. Habets. Generating virtual microphone signals using geometrical information gathered by distributed arrays. In Third Joint Workshop on Hands-free Speech Communication and Microphone Arrays (HSCMA '11), Edinburgh, United Kingdom, May 2011.

which allows to compute the output signals of an arbitrary spatial microphone virtually placed at will (i.e., arbitrary position and orientation) in the environment. The flexibility characterizing the virtual microphone (VM) approach allows the sound scene to be virtually captured at will in a postprocessing step, but no sound field representation is made available, which can be used to transmit and/or store and/or modify the sound scene efficiently. Moreover only one source per time-frequency bin is assumed active, and therefore, it cannot correctly describe the sound scene if two or more sources are active in the same time-frequency bin. Furthermore, if the virtual microphone (VM) is applied at the receiver side, all the microphone signals need to be sent over the channel, which makes the representation inefficient, whereas if the VM is applied at the transmitter side, the sound scene cannot be further manipulated and the model loses flexibility and becomes limited to a certain loudspeaker setup. Moreover, it does not considers a manipulation of the sound scene based on parametric information.

In
[24] Emmanuel Gallo and Nicolas Tsingos. Extracting and re-rendering structured auditory scenes from field recordings. In AES 30th International Conference on Intelligent Audio Environments, 2007, the sound source position estimation is based on pairwise time difference of arrival measured by means of distributed microphones. Furthermore, the receiver is dependent on the recording and necessitates all microphone signals for the synthesis (e.g., the generation of the loudspeaker Signals).

The method presented in
[28] Svein Berge. Device and method for converting spatial audio signal. U.S. patent application Ser. No. 10/547,151, uses, similarly to DirAC, direction of arrival as a parameter, thus limiting the representation to a specific point of view of the sound scene. Moreover, it does not propose the possibility to transmit/store the sound scene representation, since the analysis and synthesis need both to be applied at the same side of the communication system.

Another example can be videoconferencing applications, in which parties that are being recorded in different environments need to be played back in a unique sound scene. A Multipoint Control Unit (MCU) has to make sure that a unique sound scene is played back.

In
[22] G. Del Galdo, F. Kuech, M. Kallinger, and R. Schultz-Amling. Efficient merging of multiple audio streams for spatial sound reproduction in directional audio coding. In International Conference on Acoustics, Speech, and Signal Processing (ICASSP 2009), 2009.

and in
[23] US 20110216908: Apparatus for Merging Spatial Audio Streams the idea of combining two or more parametric representations of a sound scene has been proposed However, it would be highly beneficial, if concepts would be provided to create a unique sound scene from two or more sound scene representations in an efficient way, flexible enough to modify the sound scene.

SUMMARY

According to an embodiment, an apparatus for generating a merged audio data stream may have: a demultiplexer for obtaining a plurality of single-layer audio data streams, wherein the demultiplexer is adapted to receive one or more input audio data streams, wherein each input audio data stream includes one or more layers, wherein the demultiplexer is adapted to demultiplex each one of the input audio data streams having one or more layers into two or more demultiplexed audio data streams having exactly one layer, such that the two or more demultiplexed audio data streams together includee the one or more layers of the input audio data stream, to obtain two or more of the single-layer audio data streams; and a merging module for generating the merged audio data stream, having one or more layers, based on the plurality of single-layer audio data streams, wherein each layer of the input data audio streams, of the demultiplexed audio data streams, of the single-layer data streams and of the merged audio data stream includes a pressure value of a pressure signal, a position value and a diffuseness value as audio data.

According to another embodiment, a method for generating a merged audio data stream may have the steps of: obtaining a plurality of single-layer audio data streams, wherein the demultiplexer is adapted to receive one or more input audio data streams, wherein each input audio data stream includes one or more layers, wherein the demultiplexer is adapted to demultiplex each one of the input audio data streams having one or more layers into two or more demultiplexed audio data streams having exactly one layer, such that the two or more demultiplexed audio data streams together include the one or more layers of the input audio data stream, to obtain two or more of the single-layer audio data streams; and generating the merged audio data stream, having one or more layers, based on the plurality of single-layer audio data streams, wherein each layer of the input data audio streams, of the demultiplexed audio data streams, of the single-layer data streams and of the merged audio data stream includes a pressure value of a pressure signal, a position value and a diffuseness value as audio data, the audio data being defined for a time-frequency bin of a plurality of time-frequency bins.

Another embodiment may have a computer program for implementing the method when being executed on a computer or a signal processor.

According to an embodiment, an apparatus for generating a merged audio data stream is provided. The apparatus comprises a demultiplexer for obtaining a plurality of single-layer audio data streams, wherein the demultiplexer is adapted to receive one or more input audio data streams, wherein each input audio data stream comprises one or more layers, wherein the demultiplexer is adapted to demultiplex each one of the input audio data streams having one or more layers into two or more demultiplexed audio data streams having exactly one layer, such that the one or more demultiplexed audio data streams together comprise the one or more layers of the input audio data streams, to provide two or more of the single-layer audio data streams. Furthermore, the apparatus comprises a merging module for generating the merged audio data stream, having one or more layers, based on the plurality of single-layer audio data streams, e.g. based on the plurality of demultiplexed single-layer audio data streams. Each layer of the input data audio streams, of the demultiplexed audio data streams, of the single-layer data streams and of the merged audio data stream comprises a pressure value of a pressure signal, a position value and a diffuseness value as audio data.

In a further embodiment, the apparatus may comprise a demultiplexer for obtaining a plurality of single-layer audio data streams, wherein the demultiplexer is adapted to receive two or more input audio data streams, wherein each input audio data stream comprises one or more layers, wherein the demultiplexer is adapted to demultiplex each one of the input audio data streams having two or more layers into two or more demultiplexed audio data streams having exactly one layer, such that the two or more demultiplexed audio data streams together comprise the two or more layers of the input audio data streams, to obtain two or more of the single-layer audio data streams. Furthermore, the apparatus may comprise a merging module for generating the merged audio data stream, having one or more layers, based on the plurality of single-layer audio data streams.

In an embodiment, the apparatus may be adapted to feed one or more received input audio data streams having exactly one layer directly into the merging module without feeding them into the demultiplexer.

Each layer of the input data audio streams, of the demultiplexed audio data streams, of the single-layer data streams and of the merged audio data stream comprises a pressure value of a pressure signal, a position value and a diffuseness value as audio data, the audio data being defined for a time-frequency bin of a plurality of time-frequency bins.

According to this embodiment, two or more recorded sound scenes are merged into one by means of merging two or more audio data streams, e.g. GAC streams, and by outputting a single audio data stream, e.g. a single GAC stream.

Merging sound scenes can be used, e.g., in videoconferencing applications, in which parties being recorded in different environments need to be played back in a unique sound scene. The merging can therefore take place in a Multipoint Control Unit (MCU), to reduce network traffic or at the end-users, to reduce the computational cost of the synthesis (e.g. the computation of the loudspeaker signals).

In an embodiment, the merging module may comprise a cost function module for assigning a cost value to each one of the single-layer audio data streams, and wherein the merging module may be adapted to generate the merged audio data stream based on the cost values assigned the single-layer audio data streams.

According to another embodiment, the cost function module may be adapted to assign the cost value to each one of the single-layer audio data streams depending on at least one of the pressure values or the diffuseness values of the single-layer audio data stream.

In a further embodiment, the cost function module may be adapted to assign a cost value to each audio data stream of the group of single-layer audio data streams by applying the formula:

$$f_i(\Psi_i, P_i) = (1-\Psi_i) \cdot |P_i|^2$$

wherein $P_i$ is the pressure value and is the diffuseness value of the layer of an i-th audio data stream of the group of single-layer audio data streams, e.g. for each time-frequency bin.

According to another embodiment, the merging module may furthermore comprise a pressure merging unit, wherein the pressure merging unit may be adapted to determine a first group comprising one or more single-layer audio data streams of the plurality of single-layer audio data streams and to determine a second group comprising one or more different single-layer audio data streams of the plurality of single-layer audio data streams, wherein the cost value of each of the single-layer audio data streams of the first group may be greater than the cost value of each of the single-layer audio data streams of the second group, or wherein the cost value of each of the single-layer audio data streams of the first group may be smaller than the cost value of each of the single-layer audio data streams of the second group, wherein the pressure merging unit may be adapted to generate the one or more pressure values of the one or more layers of the merged audio data stream, such that each pressure value of each of the single-layer audio data streams of the first group may be a pressure value of one of the layers of the merged audio data stream, and such that a combination of the pressure values of the single-layer audio data streams of the second group may be a pressure value of one of the layers of the merged audio data stream.

In a further embodiment, the merging module may furthermore comprise a diffuseness merging unit, wherein the diffuseness merging unit may be adapted to determine a third group comprising one or more single-layer audio data streams of the plurality of single-layer audio data streams and to determine a fourth group comprising one or more different single-layer audio data streams of the plurality of single-layer audio data streams. The cost value of each of the single-layer audio data streams of the third group may be greater than the cost value of each of the single-layer audio data streams of the fourth group, or wherein the cost value of each of the single-layer audio data streams of the third group may be smaller than the cost value of each of the single-layer audio data streams of the fourth group, wherein the diffuseness merging unit may be adapted to generate the one or more diffuseness values of the one or more layers of the merged audio data stream, such that each diffuseness value of each of the single-layer audio data streams of the third group may be a diffuseness value of one of the layers of the merged audio data stream, and such that a combination of the diffuseness values of the single-layer audio data streams of the fourth group may a diffuseness value of one of the layers of the merged audio data stream.

According to another embodiment, the merging module may furthermore comprise a position mixing unit (1403), wherein the position mixing unit (1403) may be adapted to determine a fifth group comprising one or more single-layer audio data streams of the plurality of single-layer audio data streams, wherein the cost value of each of the single-layer audio data streams of the fifth group may be greater than the cost value of any single-layer audio data streams not comprised in the fifth group of the plurality of single-layer audio data streams, or wherein the cost value of each of the single-layer audio data streams of the fifth group is smaller than the cost value of any single-layer audio data streams not comprised in the fifth group of the plurality of single-layer audio data streams. The position mixing unit (1403) may be adapted to generate the one or more position values of the one or more layers of the merged audio data stream, such that each position value of each of the single-layer audio data streams of the fifth group may be a position value of one of the layers of the merged audio data stream.

In another embodiment, the merging module may furthermore comprise a sound scene adaption module for manipulating the position value of one or more of the single-layer audio data streams of the plurality of single-layer audio data streams.

According to a further embodiment, the sound scene adaption module may be adapted to manipulate the position value of the one or more of the single-layer audio data streams of the plurality of single-layer audio data streams applying a rotation, a translation or a non-linear transformation on the position value.

In another embodiment, the demultiplexer may comprise a plurality of demultiplexing units, wherein each one of the demultiplexing units may be configured to demultiplex one or more of the input audio data streams.

According to a further embodiment, the apparatus may moreover comprise an artificial sound source generator for generating an artificial data stream comprising exactly one layer, wherein the artificial source generator may be adapted to receive pressure information being represented in a time domain and to receive a position information, wherein the artificial source generator may be adapted to replicate the pressure information to generate position information for a plurality of time-frequency bins, and wherein the artificial source generator may furthermore be adapted to calculate diffuseness information based on the pressure information.

In another embodiment, the artificial source generator may be adapted to transform the pressure information being represented in a time-domain to a time-frequency domain.

According to a further embodiment, the artificial source generator may be adapted to add reverberation to the pressure information.

Another embodiment allows to insert an artificial sound source into the sound scene. The insertion of an artificial sound source is particularly useful in virtual reality and video-games-like applications, in which a complex sound scene can be populated by synthetic sources. In teleconferencing scenarios the insertion is useful in combining parties communicating through a mono channel, for example, dialing in via mobile phones.

BRIEF DESCRIPTION OF THE DRAWINGS

Embodiments of the present invention will be detailed subsequently referring to the appended drawings, in which:

FIG. 2b illustrates an apparatus for generating an audio data stream comprising sound source data relating to one or more sound sources according to an embodiment, FIG. 3a-3c illustrate audio data streams according to different embodiments, FIG. 6b illustrates an apparatus 660 for generating an audio data stream comprising sound source data relating to one or more sound sources according to an embodiment, FIG. 7 depicts a modification module according to an embodiment, FIG. 25 illustrates a scenario, where the sound events position estimation is not possible, FIGS. 31a-31c depict possible sound scene scenarios.

FIG. 33a-33c illustrate scenarios where two microphone arrays receive direct sound, sound reflected by a wall and diffuse sound.

DETAILED DESCRIPTION OF THE INVENTION

Before providing a detailed description of embodiments of the present invention, an apparatus for generating an audio output signal of a virtual microphone is described to provide background information regarding the concepts of the present invention.

Figure 12:
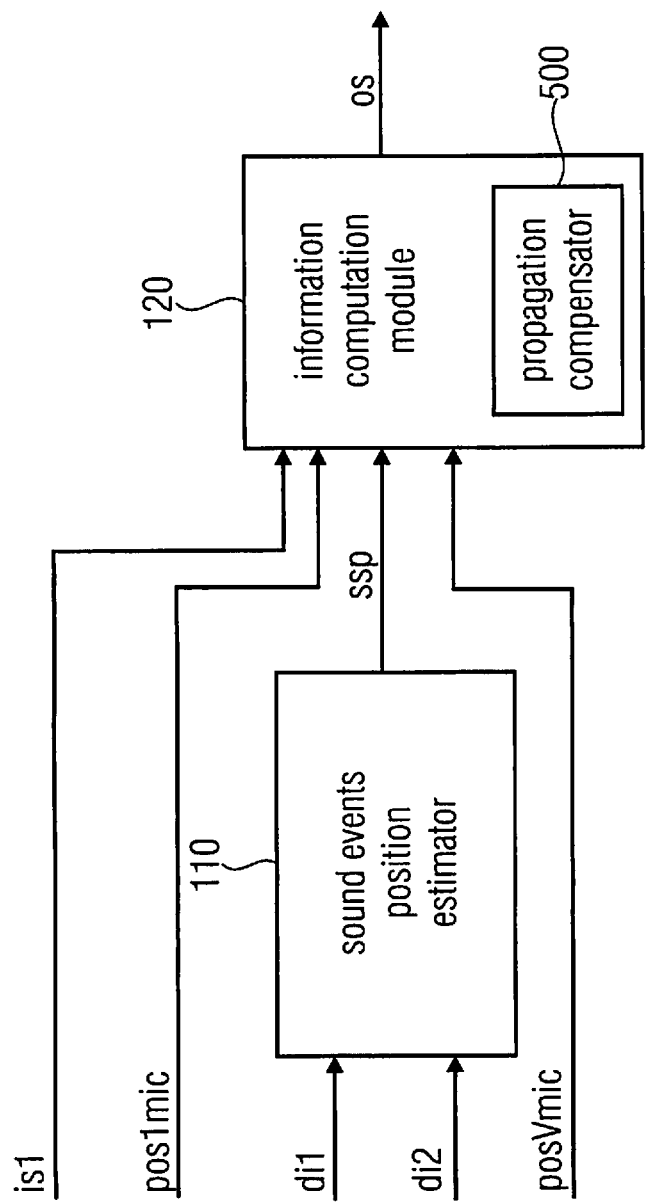
FIG. 12 illustrates an apparatus for generating an audio output signal of a virtual microphone according to an embodiment.

FIG. 12 illustrates an apparatus for generating an audio output signal to simulate a recording of a microphone at a configurable virtual position posVmic in an environment. The apparatus comprises a sound events position estimator 110 and an information computation module 120. The sound events position estimator 110 receives a first direction information di1 from a first real spatial microphone and a second direction information di2 from a second real spatial microphone. The sound events position estimator 110 is adapted to estimate a sound source position ssp indicating a position of a sound source in the environment, the sound source emitting a sound wave, wherein the sound events position estimator 110 is adapted to estimate the sound source position ssp based on a first direction information di1 provided by a first real spatial microphone being located at a first real microphone position pos1mic in the environment, and based on a second direction information di2 provided by a second real spatial microphone being located at a second real microphone position in the environment. The information computation module 120 is adapted to generate the audio output signal based on a first recorded audio input signal is1 being recorded by the first real spatial microphone, based on the first real microphone position pos1mic and based on the virtual position posVmic of the virtual microphone. The information computation module 120 comprises a propagation compensator being adapted to generate a first modified audio signal by modifying the first recorded audio input signal is1 by compensating a first delay or amplitude decay between an arrival of the sound wave emitted by the sound source at the first real spatial microphone and an arrival of the sound wave at the virtual microphone by adjusting an amplitude value, a magnitude value or a phase value of the first recorded audio input signal is1, to obtain the audio output signal.

Figure 13:
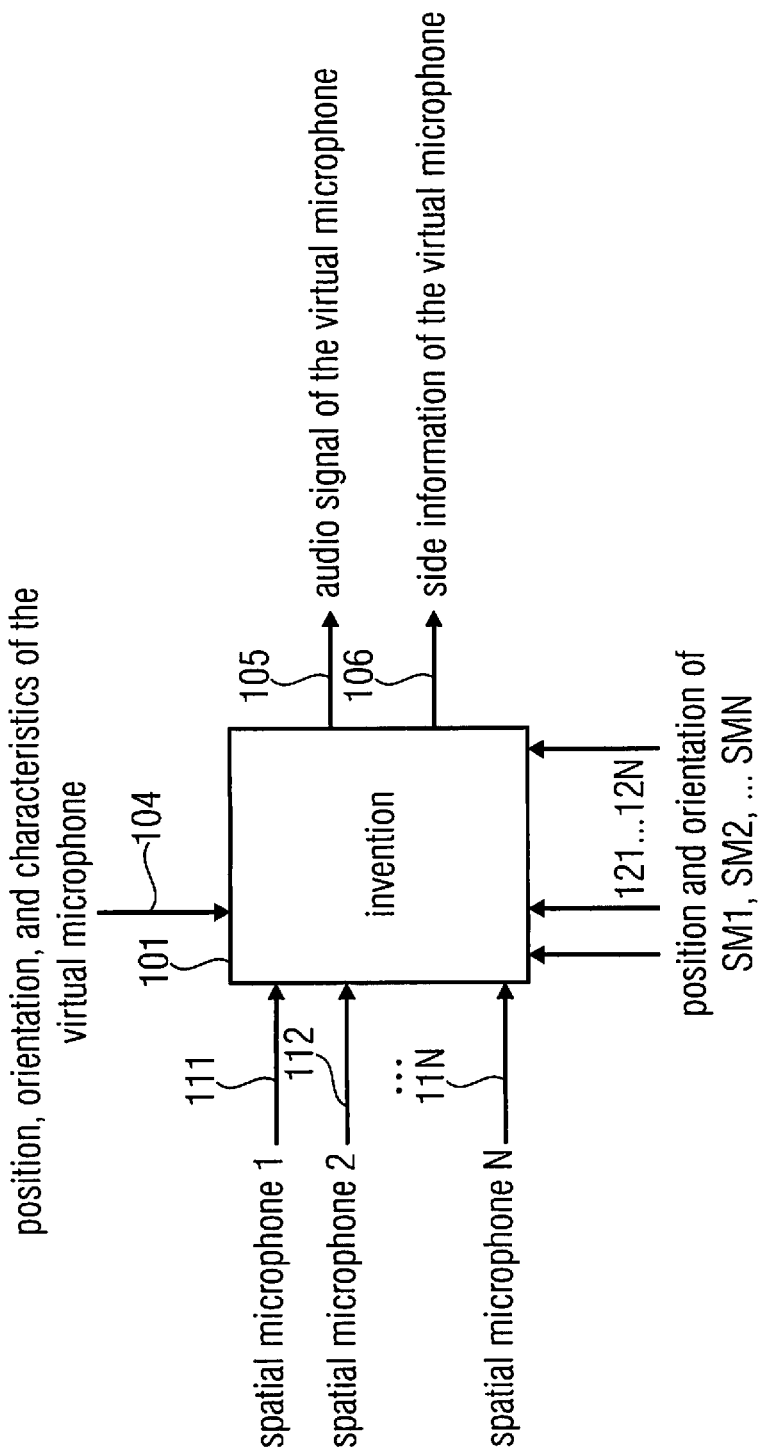
FIG. 13 illustrates the inputs and outputs of an apparatus and a method for generating an audio output signal of a virtual microphone according to an embodiment.

FIG. 13 illustrates the inputs and outputs of an apparatus and a method according to an embodiment. Information from two or more real spatial microphones 111, 112, . . . , 11N is fed to the apparatus/is processed by the method. This information comprises audio signals picked up by the real spatial microphones as well as direction information from the real spatial microphones, e.g. direction of arrival (DOA) estimates. The audio signals and the direction information, such as the direction of arrival estimates may be expressed in a time-frequency domain. If, for example, a 2D geometry reconstruction is desired and a traditional STFT (short time Fourier transformation) domain is chosen for the representation of the signals, the DOA may be expressed as azimuth angles dependent on k and n, namely the frequency and time indices.

In embodiments, the sound event localization in space, as well as describing the position of the virtual microphone may be conducted based on the positions and orientations of the real and virtual spatial microphones in a common coordinate system. This information may be represented by the inputs 121 . . . 12N and input 104 in FIG. 13. The input 104 may additionally specify the characteristic of the virtual spatial microphone, e.g., its position and pick-up pattern, as will be discussed in the following. If the virtual spatial microphone comprises multiple virtual sensors, their positions and the corresponding different pick-up patterns may be considered.

The output of the apparatus or a corresponding method may be, when desired, one or more sound signals 105, which may have been picked up by a spatial microphone defined and placed as specified by 104. Moreover, the apparatus (or rather the method) may provide as output corresponding spatial side information 106 which may be estimated by employing the virtual spatial microphone.

Figure 14:
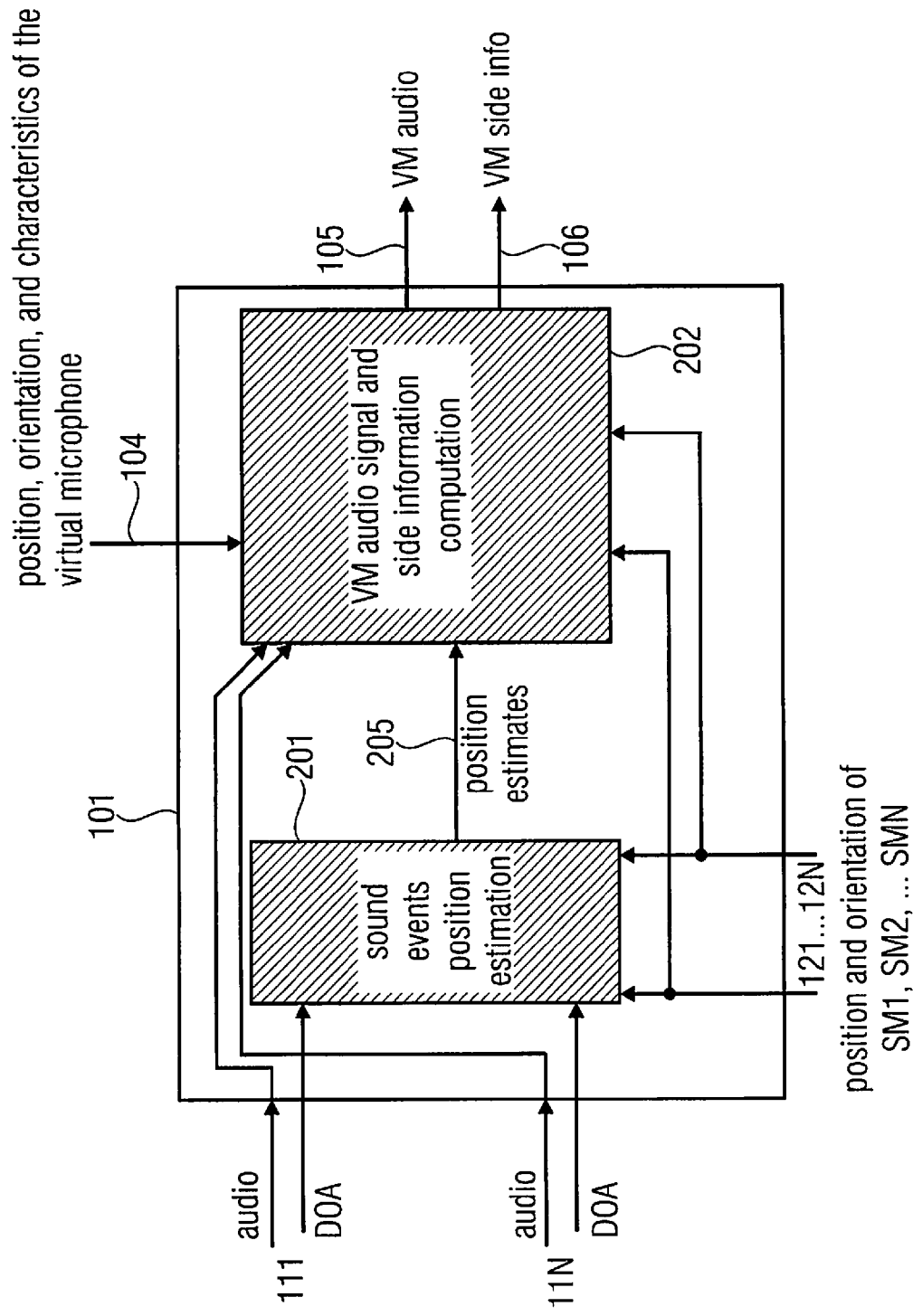
FIG. 14 illustrates the basic structure of an apparatus for generating an audio output signal of a virtual microphone according to an embodiment which comprises a sound events position estimator and an information computation module.

FIG. 14 illustrates an apparatus according to an embodiment, which comprises two main processing units, a sound events position estimator 201 and an information computation module 202. The sound events position estimator 201 may carry out geometrical reconstruction on the basis of the DOAs comprised in inputs 111 . . . 11N and based on the knowledge of the position and orientation of the real spatial microphones, where the DOAs have been computed. The output of the sound events position estimator 205 comprises the position estimates (either in 2D or 3D) of the sound sources where the sound events occur for each time and frequency bin. The second processing block 202 is an information computation module. According to the embodiment of FIG. 14, the second processing block 202 computes a virtual microphone signal and spatial side information. It is therefore also referred to as virtual microphone signal and side information computation block 202. The virtual microphone signal and side information computation block 202 uses the sound events' positions 205 to process the audio signals comprised in 111 . . . 11N to output the virtual microphone audio signal 105. Block 202, if necessitated, may also compute the spatial side information 106 corresponding to the virtual spatial microphone. Embodiments below illustrate possibilities, how blocks 201 and 202 may operate.

In the following, position estimation of a sound events position estimator according to an embodiment is described in more detail.

Depending on the dimensionality of the problem (2D or 3D) and the number of spatial microphones, several solutions for the position estimation are possible.

Figure 15:
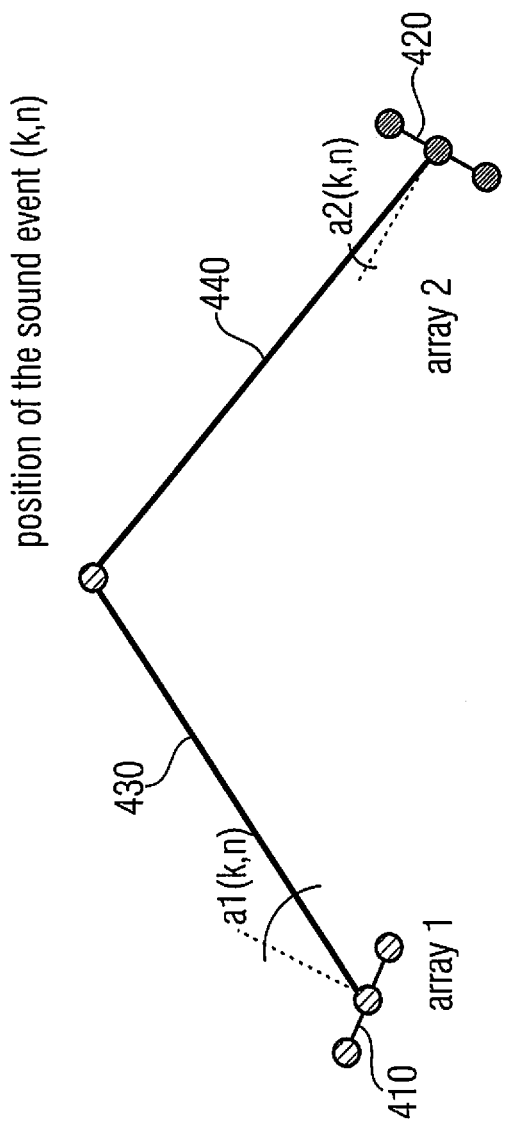
FIG. 15 shows an exemplary scenario in which the real spatial microphones are depicted as Uniform Linear Arrays of 3 microphones each.

If two spatial microphones in 2D exist, (the simplest possible case) a simple triangulation is possible. FIG. 15 shows an exemplary scenario in which the real spatial microphones are depicted as Uniform Linear Arrays (ULAs) of 3 microphones each. The DOA, expressed as the azimuth angles a1(k, n) and a2(k, n), are computed for the time-frequency bin (k, n). This is achieved by employing a proper DOA estimator, such as ESPRIT,

[13] R. Roy, A. Paulraj, and T. Kailath, "Direction-of-arrival estimation by subspace rotation methods—ESPRIT," in IEEE International Conference on Acoustics. Speech, and Signal Processing (ICASSP), Stanford, Calif. USA, April 1986, or (root) MUSIC, see

[14] R. Schmidt, "Multiple emitter location and signal parameter estimation." IEEE Transactions on Antennas and Propagation, vol. 34, no. 3, pp. 276-280, 1986 to the pressure signals transformed into the time-frequency domain.

In FIG. 15, two real spatial microphones, here, two real spatial microphone arrays 410, 420 are illustrated. The two estimated DOAs a1(k, n) and a2(k, n) are represented by two lines, a first line 430 representing DOA a1(k, n) and a second line 440 representing DOA a2(k, n). The triangulation is possible via simple geometrical considerations knowing the position and orientation of each array.

The triangulation fails when the two lines 430, 440 are exactly parallel. In real applications, however, this is very unlikely. However, not all triangulation results correspond to a physical or feasible position for the sound event in the considered space. For example, the estimated position of the sound event might be too far away or even outside the assumed space, indicating that probably the DOAs do not correspond to any sound event which can be physically interpreted with the used model. Such results may be caused by sensor noise or too strong room reverberation. Therefore, according to an embodiment, such undesired results are flagged such that the information computation module 202 can treat them properly.

Figure 16:
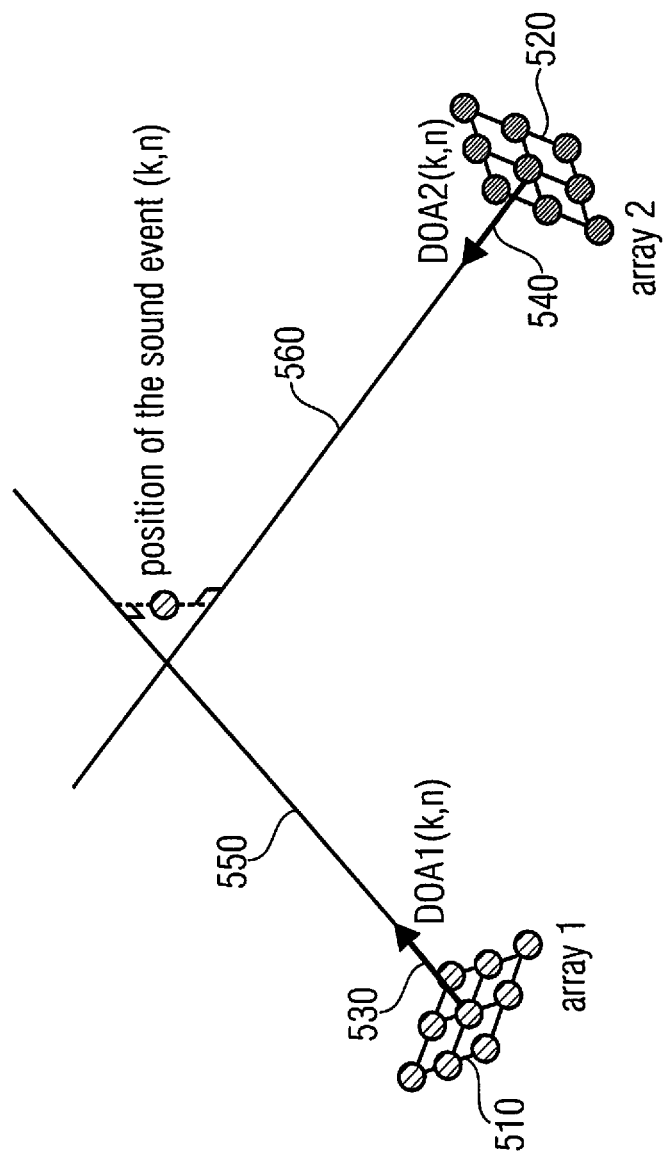
FIG. 16 depicts two spatial microphones in 3D for estimating the direction of arrival in 3D space.

FIG. 16 depicts a scenario, where the position of a sound event is estimated in 3D space. Proper spatial microphones are employed, for example, a planar or 3D microphone array.

In FIG. 16, a first spatial microphone 510, for example, a first 3D microphone array, and a second spatial microphone 520, e.g., a first 3D microphone array, is illustrated. The DOA in the 3D space, may for example, be expressed as azimuth and elevation. Unit vectors 530, 540 may be employed to express the DOAs. Two lines 550, 560 are projected according to the DOAs. In 3D, even with very reliable estimates, the two lines 550, 560 projected according to the DOAs might not intersect. However, the triangulation can still be carried out, for example, by choosing the middle point of the smallest segment connecting the two lines.

Similarly to the 2D case, the triangulation may fail or may yield unfeasible results for certain combinations of directions, which may then also be flagged, e.g. to the information computation module 202 of FIG. 14.

If more than two spatial microphones exist, several solutions are possible. For example, the triangulation explained above, could be carried out for all pairs of the real spatial microphones (if N=3, 1 with 2, 1 with 3, and 2 with 3). The resulting positions may then be averaged (along x and y, and, if 3D is considered, z).

Alternatively, more complex concepts may be used. For example, probabilistic approaches may be applied as described in

[15] J. Michael Steele, "Optimal Triangulation of Random Samples in the Plane", The Annals of Probability, Vol. 10, No. 3 (August, 1982), pp. 548-553.

According to an embodiment, the sound field may be analyzed in the time-frequency domain, for example, obtained via a short-time Fourier transform (SIFT), in which k and n denote the frequency index k and time index n, respectively. The complex pressure $P_v(k, n)$ at an arbitrary position $p_v$ for a certain k and n is modeled as a single spherical wave emitted by a narrow-band isotropic point-like source, e.g. by employing the formula:

$$P_v(k,n) = P_{IPLS}(k,n) \cdot \gamma(k, p_{IPLS}(k,n), p_v), \qquad (1)$$

where $P_{IPLS}(k, n)$ is the signal emitted by the IPLS at its position $p_{IPLS}(k, n)$. The complex factor $\gamma(k, p_{IPLS}, p_v)$ expresses the propagation from $p_{IPLS}(k, n)$ to $p_v$, e.g., it introduces appropriate phase and magnitude modifications. Here, the assumption may be applied that in each time-frequency bin only one IPLS is active. Nevertheless, multiple narrow-band IPLSs located at different positions may also be active at a single time instance.

Each IPLS either models direct sound or a distinct room reflection. Its position $p_{IPLS}(k, n)$ may ideally correspond to an actual sound source located inside the room, or a mirror image sound source located outside, respectively. Therefore, the position $p_{IPLS}(k, n)$ may also indicates the position of a sound event.

Please note that the term "real sound sources" denotes the actual sound sources physically existing in the recording environment, such as talkers or musical instruments. On the contrary, with "sound sources" or "sound events" or "IPLS" we refer to effective sound sources, which are active at certain time instants or at certain time-frequency bins, wherein the sound sources may, for example, represent real sound sources or mirror image sources.

Figure 33A:
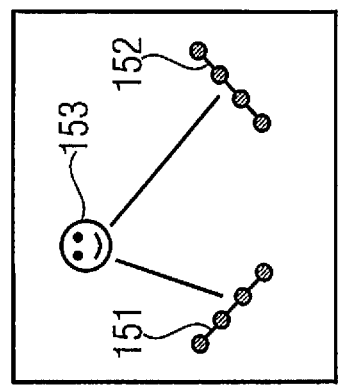

FIG. 33a-33b illustrate microphone arrays localizing sound sources. The localized sound sources may have different physical interpretations depending on their nature. When the microphone arrays receive direct sound, they may be able to localize the position of a true sound source (e.g. talkers). When the microphone arrays receive reflections, they may localize the position of a mirror image source. Mirror image sources are also sound sources.

FIG. 33a illustrates a scenario, where two microphone arrays 151 and 152 receive direct sound from an actual sound source (a physically existing sound source) 153.

FIG. 33b illustrates a scenario, where two microphone arrays 161, 162 receive reflected sound, wherein the sound has been reflected by a wall. Because of the reflection, the microphone arrays 161, 162 localize the position, where the sound appears to come from, at a position of an mirror image source 165, which is different from the position of the speaker 163.

Both the actual sound source 153 of FIG. 33a, as well as the mirror image source 165 are sound sources.

Figure 33C:
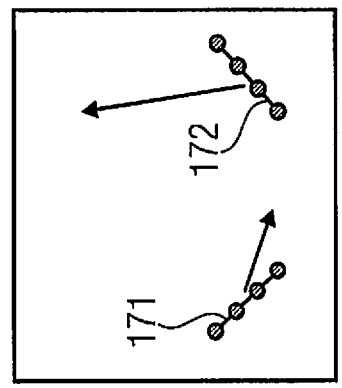

FIG. 33c illustrates a scenario, where two microphone arrays 171, 172 receive diffuse sound and are not able to localize a sound source.

While this single-wave model is accurate only for mildly reverberant environments given that the source signals fulfill the W-disjoint orthogonality (WDO) condition, i.e. the time-frequency overlap is sufficiently small. This is normally true for speech signals, see, for example,

[12] S. Rickard and Z. Yilmaz, "On the approximate W-disjoint orthogonality of speech." in Acoustics. Speech and Signal Processing. 2002. ICASSP 2002. IEEE International Conference on, April 2002, vol. 1.

However, the model also provides a good estimate for other environments and is therefore also applicable for those environments.

In the following, the estimation of the positions $p_{IPLS}(k, n)$ according to an embodiment is explained. The position $p_{IPLS}(k, n)$ of an active IPLS in a certain time-frequency bin, and thus the estimation of a sound event in a time-frequency bin, is estimated via triangulation on the basis of the direction of arrival (DOA) of sound measured in at least two different observation points.

Figure 17:
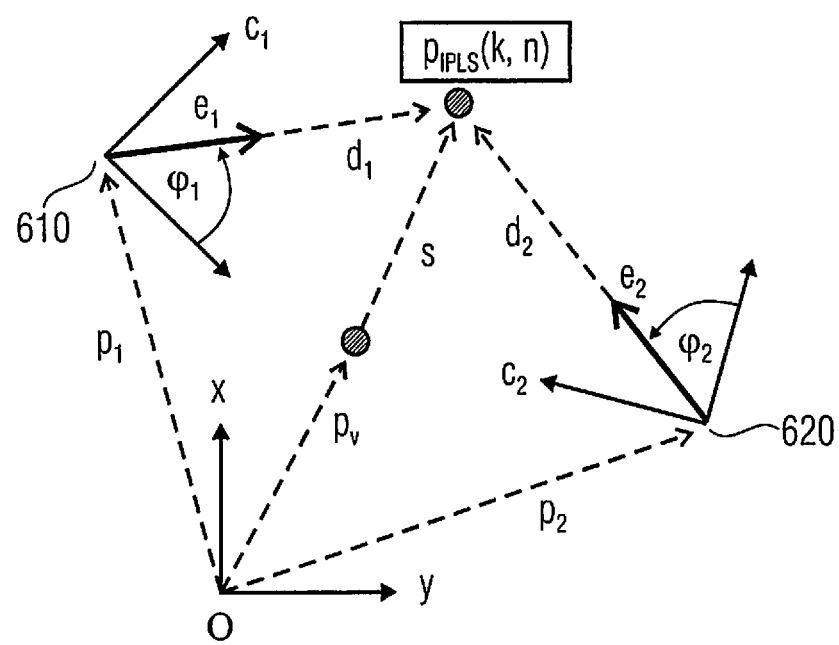
FIG. 17 illustrates a geometry where an isotropic point-like sound source of the current time-frequency bin(k, n) is located at a position $p_{IPLS}(k, n)$.

FIG. 17 illustrates a geometry, where the IPLS of the current time-frequency slot (k, n) is located in the unknown position $p_{IPLS}(k, n)$. In order to determine the necessitated DOA information, two real spatial microphones, here, two microphone arrays, are employed having a known geometry, position and orientation, which are placed in positions 610 and 620, respectively. The vectors $p_1$ and $p_2$ point to the positions 610, 620, respectively. The array orientations are defined by the unit vectors $c_1$ and $c_2$. The DOA of the sound is determined in the positions 610 and 620 for each (k, n) using a DOA estimation algorithm, for instance as provided by the DirAC analysis (see [2], [3]). By this, a first point-of-view unit vector $e_1^{POV}(k, n)$ and a second point-of-view unit vector $e_2^{POV}(k, n)$ with respect to a point of view of the microphone arrays (both not shown in FIG. 17) may be provided as output of the DirAC analysis. For example, when operating in 2D, the first point-of-view unit vector results to:

$$e_1^{POV}(k, n) = \begin{bmatrix} \cos(\varphi_1(k, n)) \\ \sin(\varphi_1(k, n)) \end{bmatrix} \qquad (2)$$

Here, $\phi_1(k, n)$ represents the azimuth of the DOA estimated at the first microphone array, as depicted in FIG. 17. The corresponding DOA unit vectors $e_1(k, n)$ and $e_2(k, n)$, with respect to the global coordinate system in the origin, may be computed by applying the formulae:

$$e_1(k,n) = R_1 \cdot e_1^{POV}(k,n),$$

$$e_2(k,n) = R_2 \cdot e_2^{POV}(k,n), \qquad (3)$$

where R are coordinate transformation matrices, e.g., $$R_1 = \begin{bmatrix} c_{1,x} & -c_{1,y} \\ c_{1,y} & c_{1,x} \end{bmatrix}, \qquad (4)$$

when operating in 2D and $c_1 = [c_{1,x}, c_{1,y}]^T$. For carry out the trangulation, the direction vectors $d_1(k, n)$ and $d_2(k, n)$ may be calculated as:

$$d_1(k,n) = d_1(k,n) e_1(k,n),$$

$$d_2(k,n) = d_2(k,n) e_2(k,n), \qquad (5)$$

where $d_1(k, n) = \|d_1(k,n)\|$ and $d_2(k, n) = \|d_2(k, n)\|$ are the unknown distances between the IPLS and the two microphone arrays. The following equation $$p_1 + d_1(k,n) = p_2 + d_2(k,n) \quad (6)$$

may be solved for $d_1(k, n)$. Finally, the position $p_{IPLS}(k, n)$ of the IPLS is given by $$p_{IPLS}(k,n) = d_1(k,n) e_1(k,n) + p_1. \quad (7)$$

In another embodiment, equation (6) may be solved for $d_2(k, n)$ and $P_{IPLS}(k, n)$ is analogously computed employing $d_2(k, n)$.

Equation (6) provides a solution when operating in 2D, unless $e_1(k, n)$ and $e_2(k, n)$ are parallel. However, when using more than two microphone arrays or when operating in 3D, a solution cannot be obtained when the direction vectors d do not intersect. According to an embodiment, in this case, the point which is closest to all direction vectors d is be computed and the result can be used as the position of the IPLS.

In an embodiment, all observation points $p_1, p_2, \ldots$ should be located such that the sound emitted by the IPLS falls into the same temporal block n. This requirement may simply be fulfilled when the distance $\Delta$ between any two of the observation points is smaller than $$\Delta_{max} = c \frac{n_{FFT}(1-R)}{f_s}, \quad (8)$$

where $n_{FFT}$ is the STFT window length, $0 \leq R < 1$ specifies the overlap between successive time frames and $f_s$ is the sampling frequency. For example, for a 1024-point STFT at 48 kHz with 50% overlap (R=0.5), the maximum spacing between the arrays to fulfill the above requirement is $\Delta=3.65$ m.

In the following, an information computation module 202, e.g. a virtual microphone signal and side information computation module, according to an embodiment is described in more detail.

Figure 18:
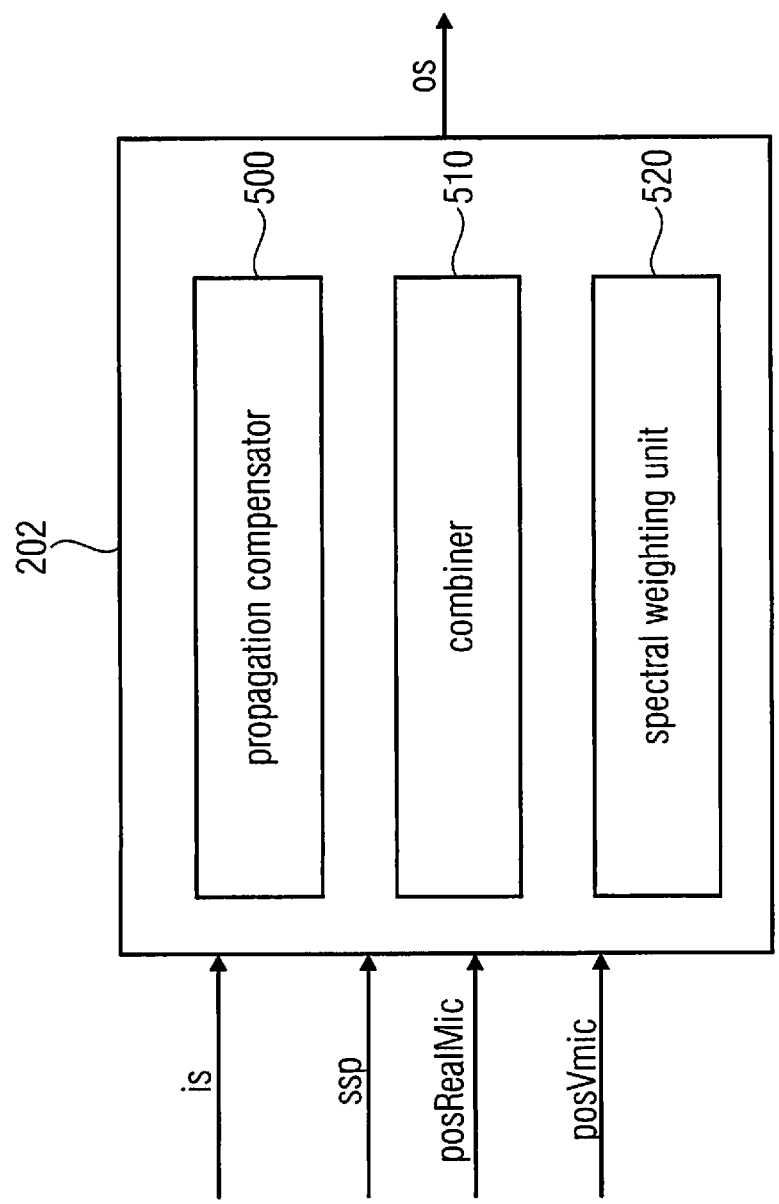
FIG. 18 depicts the information computation module according to an embodiment.

FIG. 18 illustrates a schematic overview of an information computation module 202 according to an embodiment. The information computation unit comprises a propagation compensator 500, a combiner 510 and a spectral weighting unit 520. The information computation module 202 receives the sound source position estimates ssp estimated by a sound events position estimator, one or more audio input signals is recorded by one or more of the real spatial microphones, positions posRealMic of one or more of the real spatial microphones, and the virtual position posVmic of the virtual microphone. It outputs an audio output signal os representing an audio signal of the virtual microphone.

Figure 19:
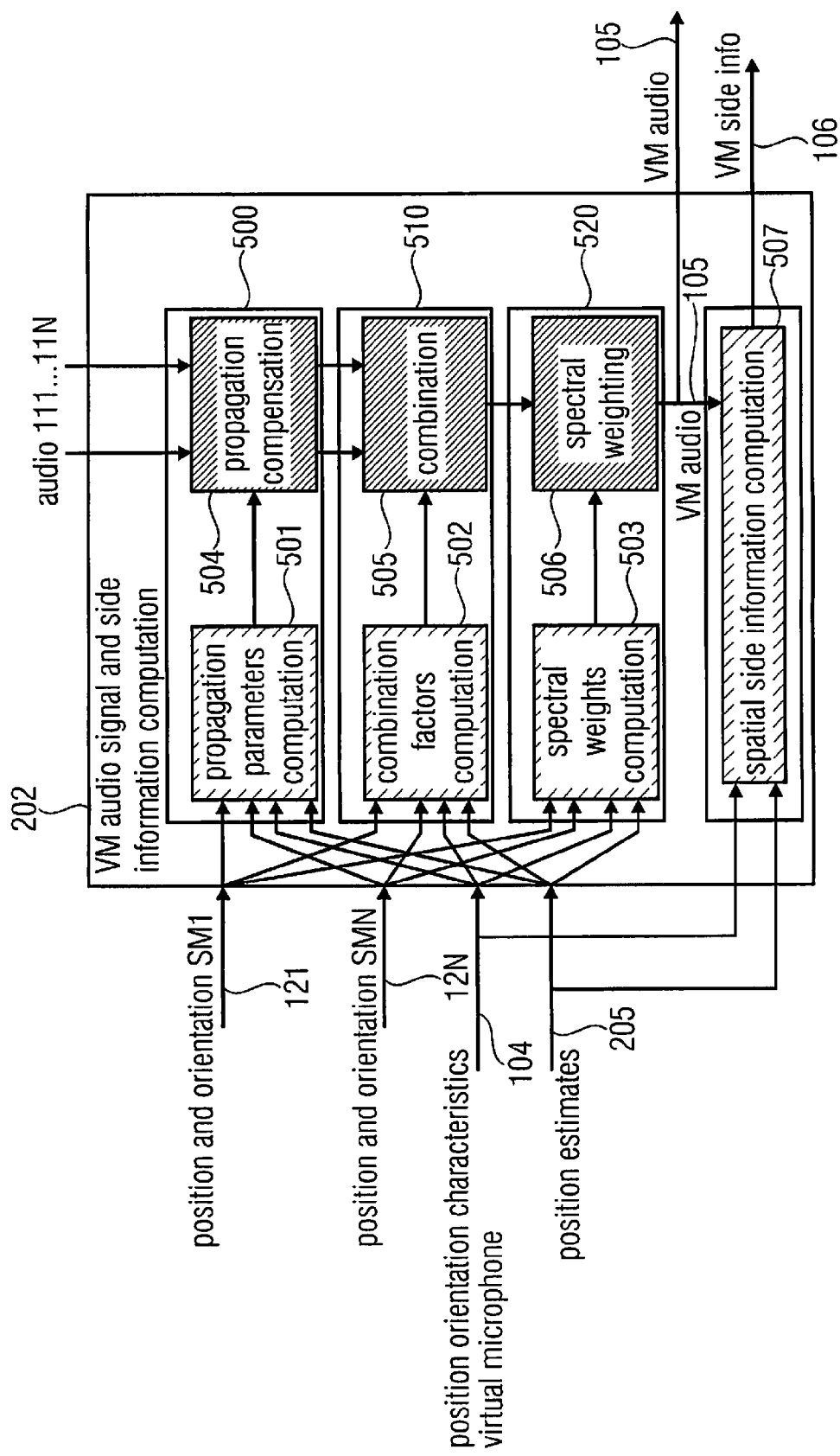
FIG. 19 depicts the information computation module according to another embodiment.

FIG. 19 illustrates an information computation module according to another embodiment. The information computation module of FIG. 19 comprises a propagation compensator 500, a combiner 510 and a spectral weighting unit 520. The propagation compensator 500 comprises a propagation parameters computation module 501 and a propagation compensation module 504. The combiner 510 comprises a combination factors computation module 502 and a combination module 505. The spectral weighting unit 520 comprises a spectral weights computation unit 503, a spectral weighting application module 506 and a spatial side information computation module 507.

To compute the audio signal of the virtual microphone, the geometrical information, e.g. the position and orientation of the real spatial microphones 121 . . . 12N, the position, orientation and characteristics of the virtual spatial microphone 104, and the position estimates of the sound events 205 are fed into the information computation module 202, in particular, into the propagation parameters computation module 501 of the propagation compensator 500, into the combination factors computation module 502 of the combiner 510 and into the spectral weights computation unit 503 of the spectral weighting unit 520. The propagation parameters computation module 501, the combination factors computation module 502 and the spectral weights computation unit 503 compute the parameters used in the modification of the audio signals 111 . . . 11N in the propagation compensation module 504, the combination module 505 and the spectral weighting application module 506.

In the information computation module 202, the audio signals 111 . . . 11N may at first be modified to compensate for the effects given by the different propagation lengths between the sound event positions and the real spatial microphones. The signals may then be combined to improve for instance the signal-to-noise ratio (SNR). Finally, the resulting signal may then be spectrally weighted to take the directional pick up pattern of the virtual microphone into account, as well as any distance dependent gain function. These three steps are discussed in more detail below.

Propagation compensation is now explained in more detail. In the upper portion of FIG. 20, two real spatial microphones (a first microphone array 910 and a second microphone array 920), the position of a localized sound event 930 for time-frequency bin (k, n), and the position of the virtual spatial microphone 940 are illustrated.

Figure 20:
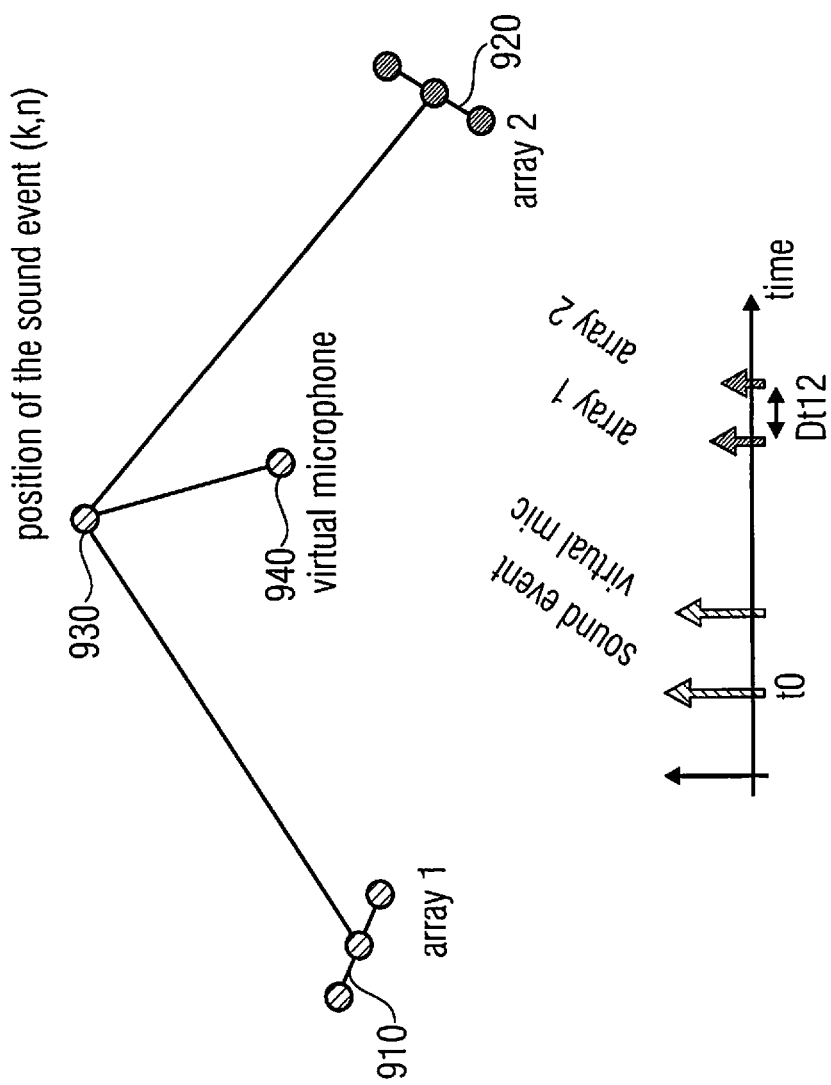
FIG. 20 shows two real spatial microphones, a localized sound event and a position of a virtual spatial microphone.

The lower portion of FIG. 20 depicts a temporal axis. It is assumed that a sound event is emitted at time t0 and then propagates to the real and virtual spatial microphones. The time delays of arrival as well as the amplitudes change with distance, so that the further the propagation length, the weaker the amplitude and the longer the time delay of arrival are.

The signals at the two real arrays are comparable only if the relative delay Dt12 between them is small. Otherwise, one of the two signals needs to be temporally realigned to compensate the relative delay Dt12, and possibly, to be scaled to compensate for the different decays.

Compensating the delay between the arrival at the virtual microphone and the arrival at the real microphone arrays (at one of the real spatial microphones) changes the delay independent from the localization of the sound event, making it superfluous for most applications.

Returning to FIG. 19, propagation parameters computation module 501 is adapted to compute the delays to be corrected for each real spatial microphone and for each sound event. If desired, it also computes the gain factors to be considered to compensate for the different amplitude decays.

The propagation compensation module 504 is configured to use this information to modify the audio signals accordingly. If the signals are to be shifted by a small amount of time (compared to the time window of the filter bank), then a simple phase rotation suffices. If the delays are larger, more complicated implementations are necessitated.

The output of the propagation compensation module 504 are the modified audio signals expressed in the original time-frequency domain.

In the following, a particular estimation of propagation compensation for a virtual microphone according to an embodiment will be described with reference to FIG. 17 which inter alia illustrates the position 610 of a first real spatial microphone and the position 620 of a second real spatial microphone.

In the embodiment that is now explained, it is assumed that at least a first recorded audio input signal, e.g. a pressure signal of at least one of the real spatial microphones (e.g. the microphone arrays) is available, for example, the pressure signal of a first real spatial microphone. We will refer to the considered microphone as reference microphone, to its position as reference position $p_{ref}$ and to its pressure signal as reference pressure signal $P_{ref}(k, n)$. However, propagation compensation may not only be conducted with respect to only one pressure signal, but also with respect to the pressure signals of a plurality or of all of the real spatial microphones.

The relationship between the pressure signal $P_{IPLS}(k, n)$ emitted by the IPLS and a reference pressure signal $P_{ref}(k, n)$ of a reference microphone located in $p_{ref}$ can be expressed by formula (9):

$$P_{ref}(k,n)=P_{IPLS}(k,n)\cdot \gamma(k,p_{IPLS},p_{ref}), \qquad (9)$$

In general, the complex factor $\gamma(k, p_a, p_b)$ expresses the phase rotation and amplitude decay introduced by the propagation of a spherical wave from its origin in $p_a$ to $p_b$. However, practical tests indicated that considering only the amplitude decay in $\gamma$ leads to plausible impressions of the virtual microphone signal with significantly fewer artifacts compared to also considering the phase rotation.

The sound energy which can be measured in a certain point in space depends strongly on the distance r from the sound source, in FIG. 6 from the position $p_{IPLS}$ of the sound source. In many situations, this dependency can be modeled with sufficient accuracy using well-known physical principles, for example, the 1/r decay of the sound pressure in the far-field of a point source. When the distance of a reference microphone, for example, the first real microphone from the sound source is known, and when also the distance of the virtual microphone from the sound source is known, then, the sound energy at the position of the virtual microphone can be estimated from the signal and the energy of the reference microphone, e.g. the first real spatial microphone. This means, that the output signal of the virtual microphone can be obtained by applying proper gains to the reference pressure signal.

Assuming that the first real spatial microphone is the reference microphone, then $p_{ref}=p_1$. In FIG. 17, the virtual microphone is located in $p_v$. Since the geometry in FIG. 17 is known in detail, the distance $d_1(k, n)=\|d_1(k, n)\|$ between the reference microphone (in FIG. 17: the first real spatial microphone) and the IPLS can easily be determined, as well as the distance $s(k, n)=\|s(k, n)\|$ between the virtual microphone and the IPLS, namely $$s(k,n)=\|s(k,n)\|=\|p_1+d_1(k,n)-p_v\|. \qquad (10)$$

The sound pressure $P_v(k, n)$ at the position of the virtual microphone is computed by combining formulas (1) and (9), leading to $$P_v(k, n) = \frac{\gamma(k, p_{IPLS}, p_v)}{\gamma(k, p_{IPLS}, p_{ref})} P_{ref}(k, n). \qquad (11)$$

As mentioned above, in some embodiments, the factors $\gamma$ may only consider the amplitude decay due to the propagation. Assuming for instance that the sound pressure decreases with 1/r, then $$P_v(k, n) = \frac{d_1(k, n)}{s(k, n)} P_{ref}(k, n). \qquad (12)$$

When the model in formula (1) holds, e.g., when only direct sound is present, then formula (12) can accurately reconstruct the magnitude information. However, in case of pure diffuse sound fields, e.g., when the model assumptions are not met, the presented method yields an implicit dereverberation of the signal when moving the virtual microphone away from the positions of the sensor arrays. In fact, as discussed above, in diffuse sound fields, we expect that most IPLS are localized near the two sensor arrays. Thus, when moving the virtual microphone away from these positions, we likely increase the distance $s=\|s\|$ in FIG. 17. Therefore, the magnitude of the reference pressure is decreased when applying a weighting according to formula (11). Correspondingly, when moving the virtual microphone close to an actual sound source, the time-frequency bins corresponding to the direct sound will be amplified such that the overall audio signal will be perceived less diffuse. By adjusting the rule in formula (12), one can control the direct sound amplification and diffuse sound suppression at will.

By conducting propagation compensation on the recorded audio input signal (e.g. the pressure signal) of the first real spatial microphone, a first modified audio signal is obtained.

In embodiments, a second modified audio signal may be obtained by conducting propagation compensation on a recorded second audio input signal (second pressure signal) of the second real spatial microphone.

In other embodiments, further audio signals may be obtained by conducting propagation compensation on recorded further audio input signals (further pressure signals) of further real spatial microphones.

Now, combining in blocks 502 and 505 in FIG. 19 according to an embodiment is explained in more detail. It is assumed that two or more audio signals from a plurality different real spatial microphones have been modified to compensate for the different propagation paths to obtain two or more modified audio signals. Once the audio signals from the different real spatial microphones have been modified to compensate for the different propagation paths, they can be combined to improve the audio quality. By doing so, for example, the SNR can be increased or the reverberance can be reduced.

Possible solutions for the combination comprise:
  Weighted averaging, e.g., considering SNR, or the distance to the virtual microphone, or the diffuseness which was estimated by the real spatial microphones. Traditional solutions, for example, Maximum Ratio Combining (MRC) or Equal Gain Combining (EQC) may be employed, or
  Linear combination of some or all of the modified audio signals to obtain a combination signal. The modified audio signals may be weighted in the linear combination to obtain the combination signal, or
  Selection, e.g., only one signal is used, for example, dependent on SNR or distance or diffuseness.

The task of module 502 is, if applicable, to compute parameters for the combining, which is carried out in module 505.

Now, spectral weighting according to embodiments is described in more detail. For this, reference is made to blocks 503 and 506 of FIG. 19. At this final step, the audio signal resulting from the combination or from the propagation compensation of the input audio signals is weighted in the time-frequency domain according to spatial characteristics of the virtual spatial microphone as specified by input 104 and/or according to the reconstructed geometry (given in 205).

Figure 21:
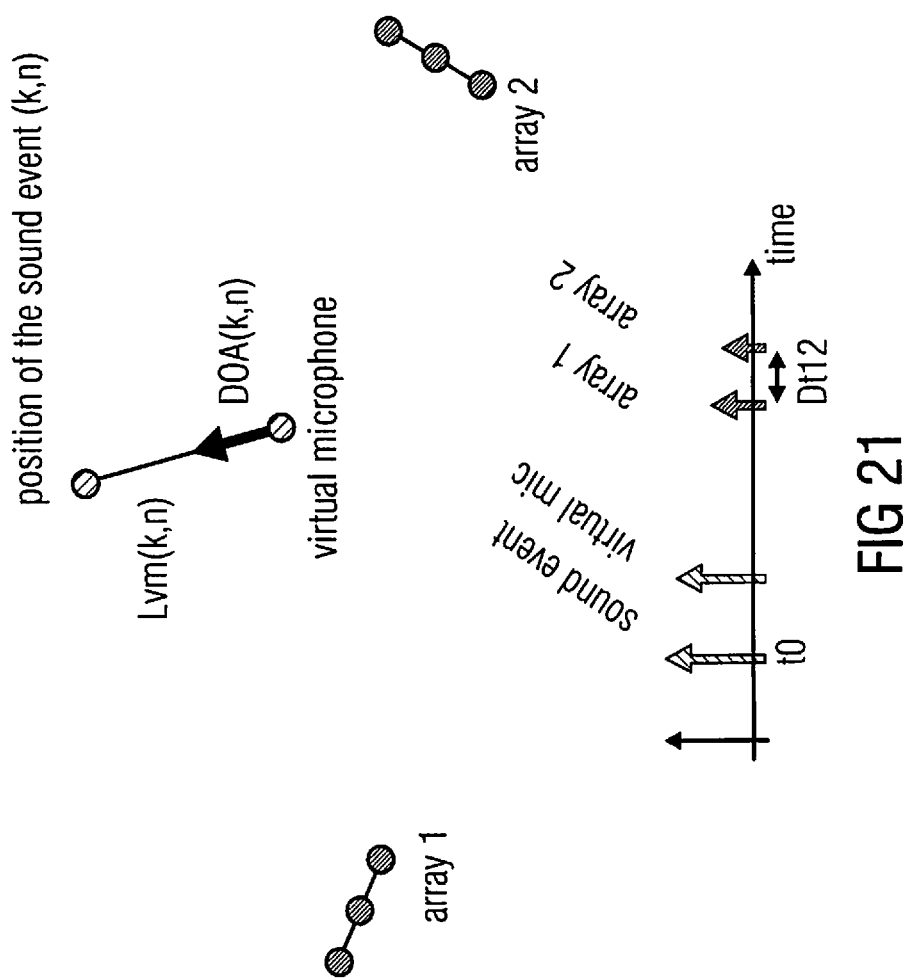
FIG. 21 illustrates, how to obtain the direction of arrival relative to a virtual microphone according to an embodiment.

For each time-frequency bin the geometrical reconstruction allows us to easily obtain the DOA relative to the virtual microphone, as shown in FIG. 21. Furthermore, the distance between the virtual microphone and the position of the sound event can also be readily computed.

The weight for the time-frequency bin is then computed considering the type of virtual microphone desired.

In case of directional microphones, the spectral weights may be computed according to a predefined pick-up pattern. For example, according to an embodiment, a cardioid microphone may have a pick up pattern defined by the function g(theta), g(theta)=0.5+0.5 cos(theta), where theta is the angle between the look direction of the virtual spatial microphone and the DOA of the sound from the point of view of the virtual microphone.

Another possibility is artistic (non physical) decay functions. In certain applications, it may be desired to suppress sound events far away from the virtual microphone with a factor greater than the one characterizing free-field propagation. For this purpose, some embodiments introduce an additional weighting function which depends on the distance between the virtual microphone and the sound event. In an embodiment, only sound events within a certain distance (e.g. in meters) from the virtual microphone should be picked up.

With respect to virtual microphone directivity, arbitrary directivity patterns can be applied for the virtual microphone. In doing so, one can for instance separate a source from a complex sound scene.

Since the DOA of the sound can be computed in the position $p_v$ of the virtual microphone, namely $$\varphi_v(k, n) = \arccos\left(\frac{s \cdot c_v}{\|s\|}\right),\quad (13)$$

where $c_v$ is a unit vector describing the orientation of the virtual microphone, arbitrary directivities for the virtual microphone can be realized. For example, assuming that $P_v(k,n)$ indicates the combination signal or the propagation-compensated modified audio signal, then the formula:

$$\tilde{P}_v(k,n)=P_v(k,n)[1+\cos(\varphi_v(k,n))] \quad (14)$$

calculates the output of a virtual microphone with cardioid directivity. The directional patterns, which can potentially be generated in this way, depend on the accuracy of the position estimation.

Figure 8:
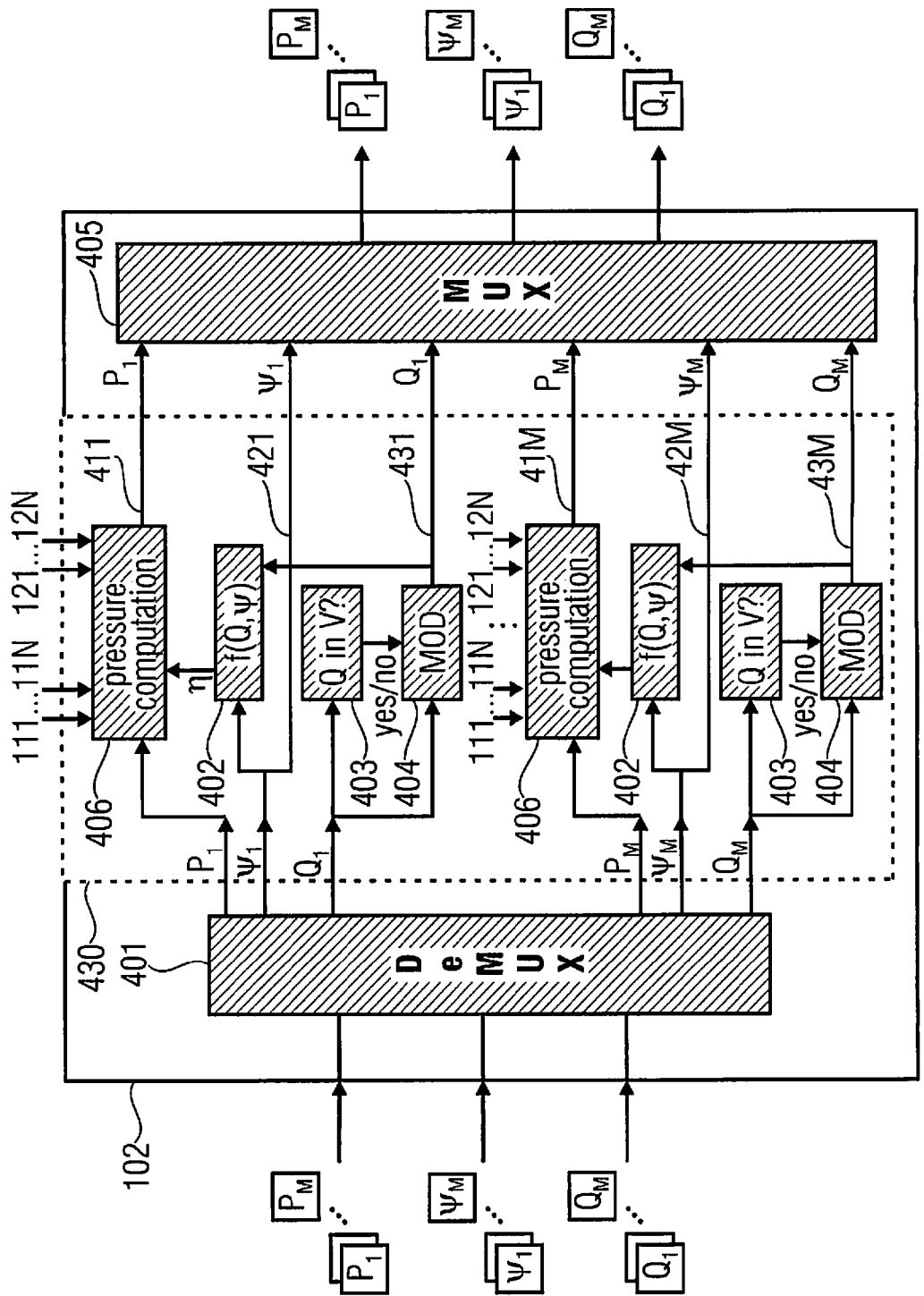
FIG. 8 depicts a modification module according to another embodiment.

In embodiments, one or more real, non-spatial microphones, for example, an omnidirectional microphone or a directional microphone such as a cardioid, are placed in the sound scene in addition to the real spatial microphones to further improve the sound quality of the virtual microphone signals 105 in FIG. 8. These microphones are not used to gather any geometrical information, but rather only to provide a cleaner audio signal. These microphones may be placed closer to the sound sources than the spatial microphones. In this case, according to an embodiment, the audio signals of the real, non-spatial microphones and their positions are simply fed to the propagation compensation module 504 of FIG. 19 for processing, instead of the audio signals of the real spatial microphones. Propagation compensation is then conducted for the one or more recorded audio signals of the non-spatial microphones with respect to the position of the one or more non-spatial microphones. By this, an embodiment is realized using additional non-spatial microphones.

In a further embodiment, computation of the spatial side information of the virtual microphone is realized. To compute the spatial side information 106 of the microphone, the information computation module 202 of FIG. 19 comprises a spatial side information computation module 507, which is adapted to receive as input the sound sources' positions 205 and the position, orientation and characteristics 104 of the virtual microphone. In certain embodiments, according to the side information 106 that needs to be computed, the audio signal of the virtual microphone 105 can also be taken into account as input to the spatial side information computation module 507.

The output of the spatial side information computation module 507 is the side information of the virtual microphone 106. This side information can be, for instance, the DOA or the diffuseness of sound for each time-frequency bin (k, n) from the point of view of the virtual microphone. Another possible side information could, for instance, be the active sound intensity vector Ia(k, n) which would have been measured in the position of the virtual microphone. How these parameters can be derived, will now be described.

According to an embodiment, DOA estimation for the virtual spatial microphone is realized. The information computation module 120 is adapted to estimate the direction of arrival at the virtual microphone as spatial side information, based on a position vector of the virtual microphone and based on a position vector of the sound event as illustrated by FIG. 22.

Figure 22:
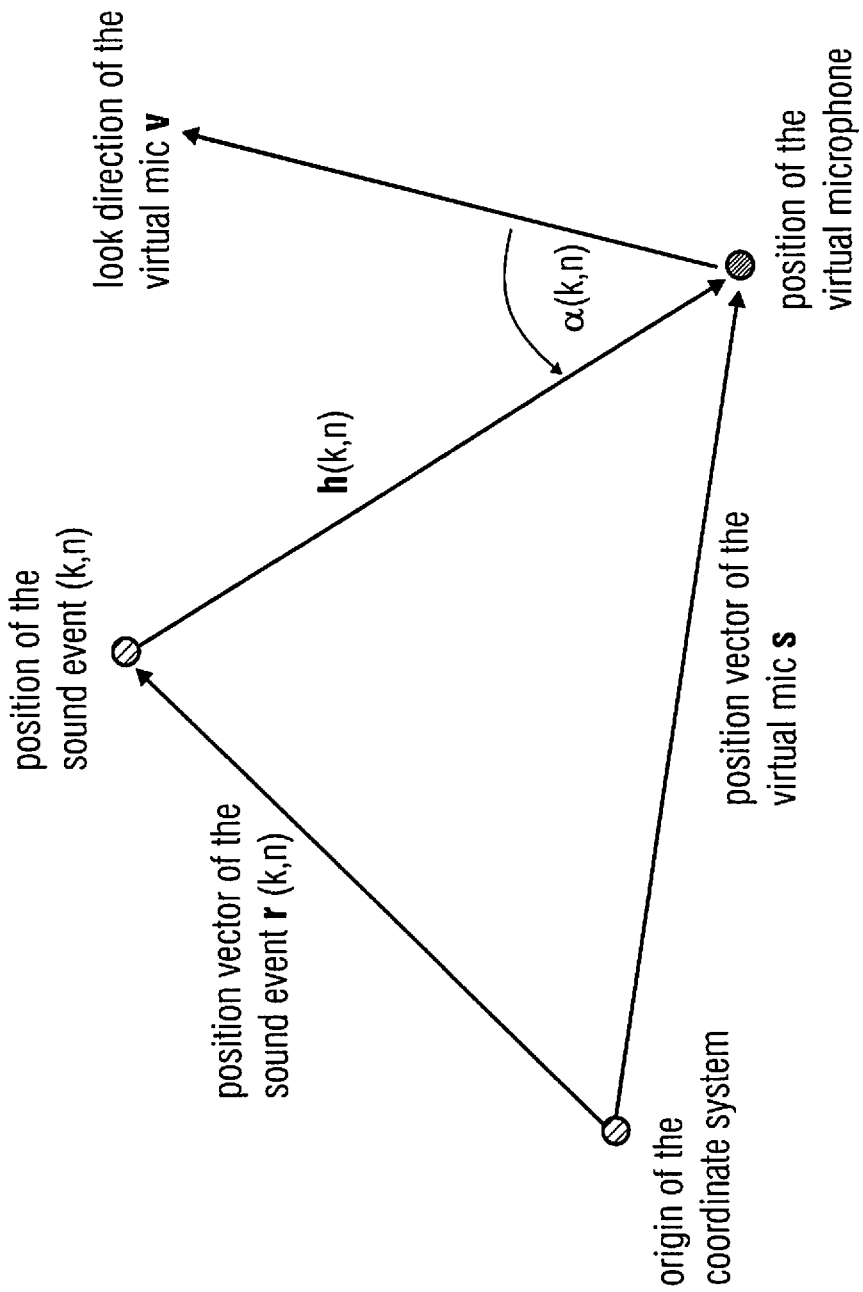
FIG. 22 depicts a possible way to derive the DOA of the sound from the point of view of the virtual microphone according to an embodiment.

FIG. 22 depicts a possible way to derive the DOA of the sound from the point of view of the virtual microphone: The position of the sound event, provided by block 205 in FIG. 19, can be described for each time-frequency bin (k, n) with a position vector r(k, n), the position vector of the sound event. Similarly, the position of the virtual microphone, provided as input 104 in FIG. 19, can be described with a position vector s(k,n), the position vector of the virtual microphone. The look direction of the virtual microphone can be described by a vector v(k, n). The DOA relative to the virtual microphone is given by a(k,n). It represents the angle between v and the sound propagation path h(k,n). h(k, n) can be computed by employing the formula:

h(k,n)=s(k,n)−r(k,n).

The desired DOA a(k, n) can now be computed for each (k, n) for instance via the definition of the dot product of h(k, n) and v(k,n), namely a(k,n)=arcos(h(k,n)·v(k,n)/(∥h(k,n)∥∥v(k,n)∥))

In another embodiment, the information computation module 120 may be adapted to estimate the active sound intensity at the virtual microphone as spatial side information, based on a position vector of the virtual microphone and based on a position vector of the sound event as illustrated by FIG. 22.

From the DOA a(k, n) defined above, we can derive the active sound intensity Ia(k, n) at the position of the virtual microphone. For this, it is assumed that the virtual microphone audio signal 105 in FIG. 19 corresponds to the output of an omnidirectional microphone, e.g., we assume, that the virtual microphone is an omnidirectional microphone. Moreover, the looking direction v in FIG. 22 is assumed to be parallel to the x-axis of the coordinate system. Since the desired active sound intensity vector Ia(k, n) describes the net flow of energy through the position of the virtual microphone, we can compute Ia(k, n) can be computed, e.g. according to the formula:

$$Ia(k,n) = -(1/2rho)|P_v(k,n)|^2 * [\cos a(k,n), \sin a(k,n)]^T,$$

where $[\square]^T$ denotes a transposed vector, rho is the air density, and $P_v$ (k, n) is the sound pressure measured by the virtual spatial microphone, e.g., the output 105 of block 506 in FIG. 19.

If the active intensity vector shall be computed expressed in the general coordinate system but still at the position of the virtual microphone, the following formula may be applied:

$$Ia(k,n) = (1/2rho)|P_v(k,n)|^2 h(k,n)/\|h(k,n)\|.$$

The diffuseness of sound expresses how diffuse the sound field is in a given time-frequency slot (see, for example, [2]). Diffuseness is expressed by a value ψ, wherein 0≤ψ≤1. A diffuseness of 1 indicates that the total sound field energy of a sound field is completely diffuse. This information is important e.g. in the reproduction of spatial sound. Traditionally, diffuseness is computed at the specific point in space in which a microphone array is placed.

According to an embodiment, the diffuseness may be computed as an additional parameter to the side information generated for the Virtual Microphone (VM), which can be placed at will at an arbitrary position in the sound scene. By this, an apparatus that also calculates the diffuseness besides the audio signal at a virtual position of a virtual microphone can be seen as a virtual DirAC front-end, as it is possible to produce a DirAC stream, namely an audio signal, direction of arrival, and diffuseness, for an arbitrary point in the sound scene. The DirAC stream may be further processed, stored, transmitted, and played back on an arbitrary multi-loudspeaker setup. In this case, the listener experiences the sound scene as if he or she were in the position specified by the virtual microphone and were looking in the direction determined by its orientation.

Figure 23:
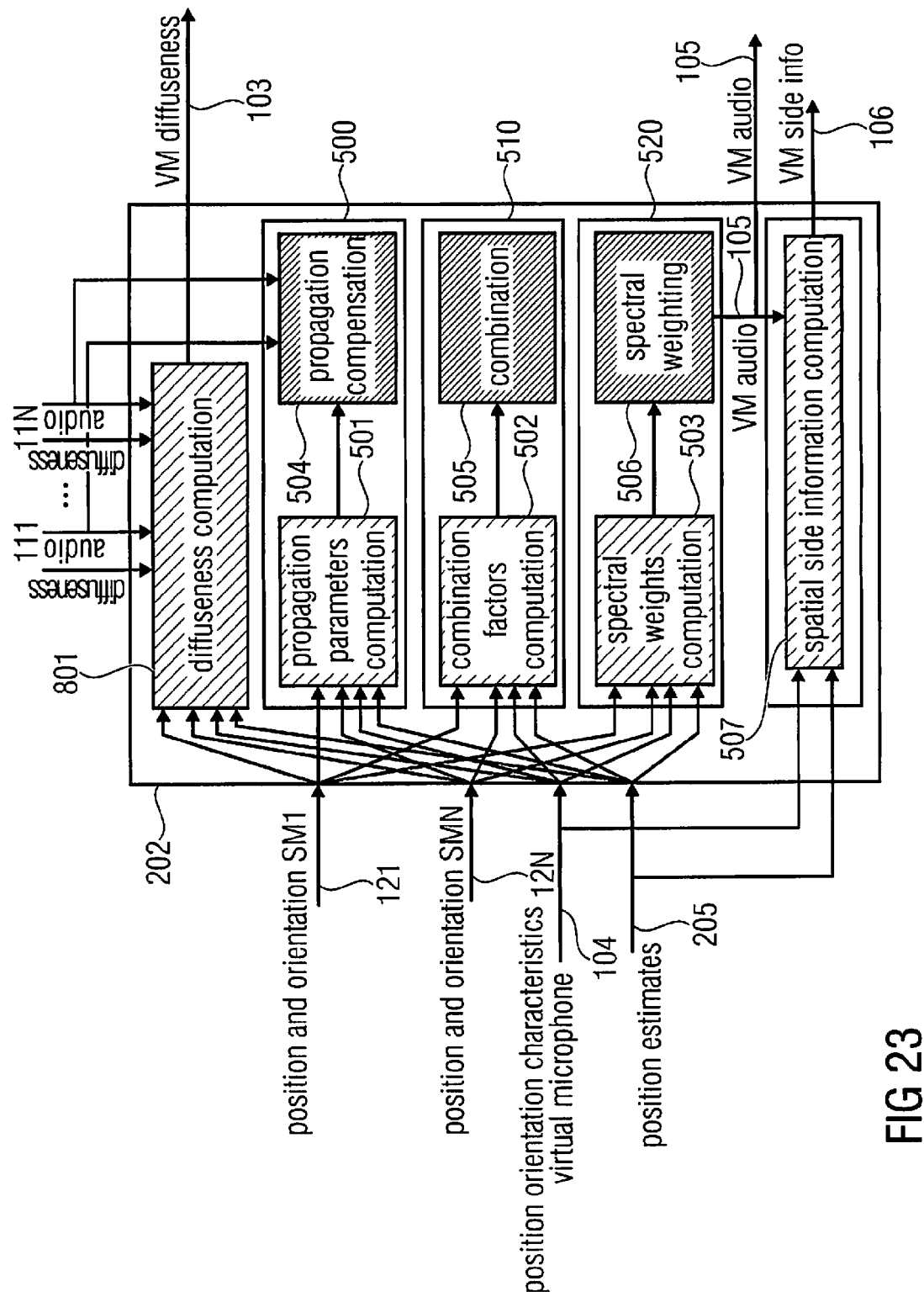
FIG. 23 illustrates an information computation block comprising a diffuseness computation unit according to an embodiment.

FIG. 23 illustrates an information computation block according to an embodiment comprising a diffuseness computation unit 801 for computing the diffuseness at the virtual microphone. The information computation block 202 is adapted to receive inputs 111 to 11N, that in addition to the inputs of FIG. 14 also include diffuseness at the real spatial microphones. Let $\psi^{(SM1)}$ to $\psi^{(SMN)}$ denote these values. These additional inputs are fed to the information computation module 202. The output 103 of the diffuseness computation unit 801 is the diffuseness parameter computed at the position of the virtual microphone.

Figure 24:
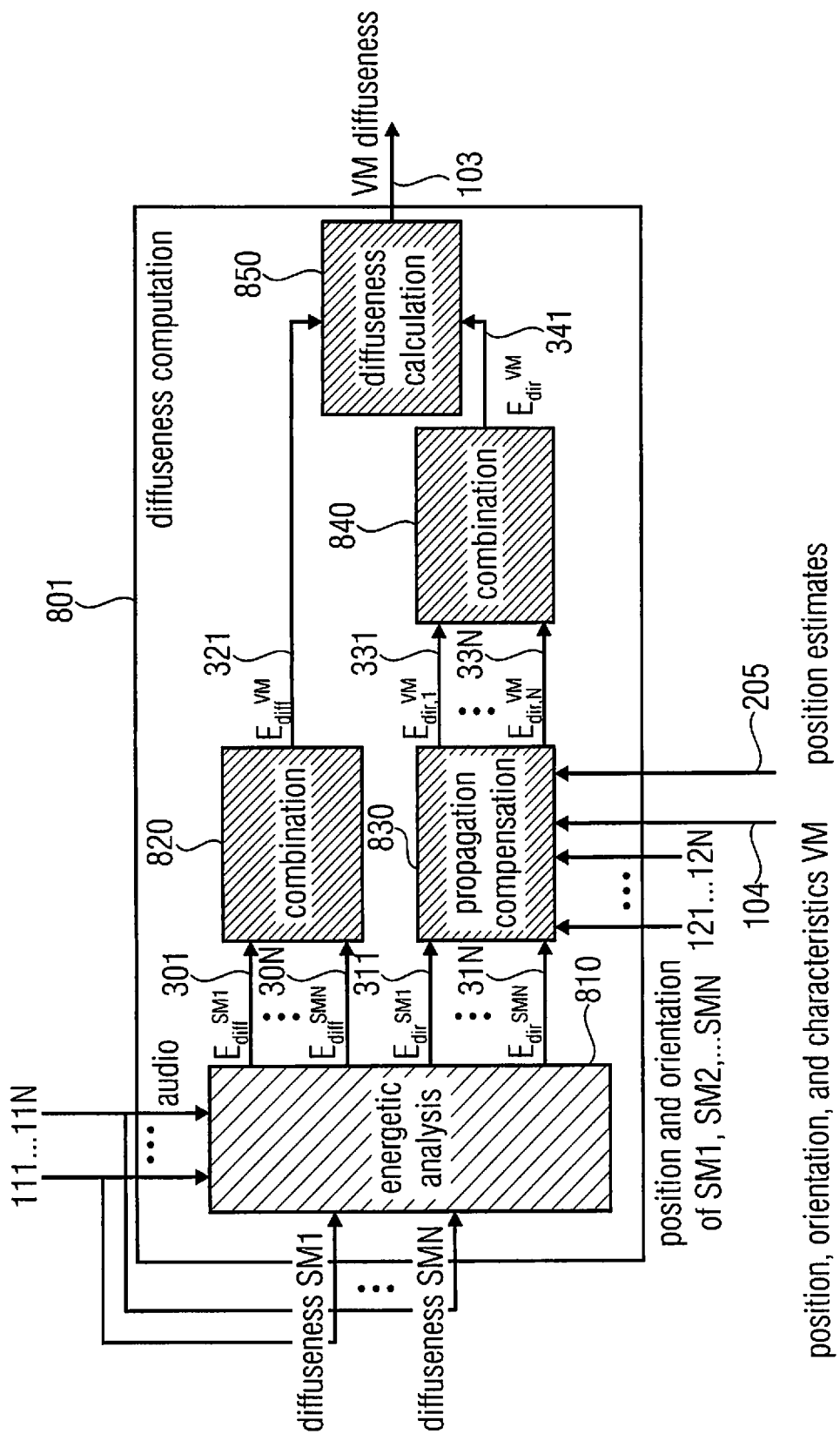
FIG. 24 depicts a diffuseness computation unit according to an embodiment.

A diffuseness computation unit 801 of an embodiment is illustrated in FIG. 24 depicting more details. According to an embodiment, the energy of direct and diffuse sound at each of the N spatial microphones is estimated. Then, using the information on the positions of the IPLS, and the information on the positions of the spatial and virtual microphones, N estimates of these energies at the position of the virtual microphone are obtained. Finally, the estimates can be combined to improve the estimation accuracy and the diffuseness parameter at the virtual microphone can be readily computed.

Let $E_{dir}^{(SM1)}$ to $E_{dir}^{(SMN)}$ and $E_{diff}^{(SM1)}$ to $E_{diff}^{(SMN)}$ denote the estimates of the energies of direct and diffuse sound for the N spatial microphones computed by energy analysis unit 810. If $P_i$ is the complex pressure signal and $\psi_i$ t; is diffuseness for the i-th spatial microphone, then the energies may, for example, be computed according to the formulae:

$$E_{dir}^{(SMi)} = (1 - \Psi_i) \cdot |P_i|^2$$

$$E_{diff}^{(SMi)} = \Psi_i |P_i|^2$$

The energy of diffuse sound should be equal in all positions, therefore, an estimate of the diffuse sound energy $E_{diff}^{(VM)}$ at the virtual microphone can be computed simply by averaging $E_{diff}^{(SM1)}$ to $E_{diff}^{(SM\ N)}$, e.g. in a diffuseness combination unit 820, for example, according to the formula:

$$E_{diff}^{(VM)} = \frac{1}{N} \sum_{i=1}^{N} E_{diff}^{(SMi)}$$

A more effective combination of the estimates $E_{diff}^{(SM1)}$ to $E_{diff}^{(SM\ N)}$ could be carried out by considering the variance of the estimators, for instance, by considering the SNR.

The energy of the direct sound depends on the distance to the source due to the propagation. Therefore, $E_{dir}^{(SM1)}$ to $E_{dir}^{(SM\ N)}$ may be modified to take this into account. This may be carried out, e.g., by a direct sound propagation adjustment unit 830. For example, if it is assumed that the energy of the direct sound field decays with 1 over the distance squared, then the estimate for the direct sound at the virtual microphone for the i-th spatial microphone may be calculated according to the formula:

$$E_{dir,i}^{(VM)} = \left(\frac{\text{distance } SMi - IPLS}{\text{distance } VM - IPLS}\right)^2 E_{dir}^{(SMi)}$$

Similarly to the diffuseness combination unit 820, the estimates of the direct sound energy obtained at different spatial microphones can be combined, e.g. by a direct sound combination unit 840. The result is $E_{dir}^{(VM)}$, e.g., the estimate for the direct sound energy at the virtual microphone. The diffuseness at the virtual microphone $\psi^{(VM)}$ may be computed, for example, by a diffuseness sub-calculator 850, e.g. according to the formula:

$$\Psi^{(VM)} = \frac{E_{diff}^{(VM)}}{E_{diff}^{(VM)} + E_{dir}^{(VM)}}$$

As mentioned above, in some cases, the sound events position estimation carried out by a sound events position estimator fails, e.g., in case of a wrong direction of arrival estimation. FIG. 25 illustrates such a scenario. In these cases, regardless of the diffuseness parameters estimated at the different spatial microphone and as received as inputs 111 to 11N, the diffuseness for the virtual microphone 103 may be set to 1 (i.e., fully diffuse), as no spatially coherent reproduction is possible.

Additionally, the reliability of the DOA estimates at the N spatial microphones may be considered. This may be expressed e.g. in terms of the variance of the DOA estimator or SNR. Such an information may be taken into account by the diffuseness sub-calculator 850, so that the VM diffuseness 103 can be artificially increased in case that the DOA estimates are unreliable. In fact, as a consequence, the position estimates 205 will also be unreliable.

Figure 2A:
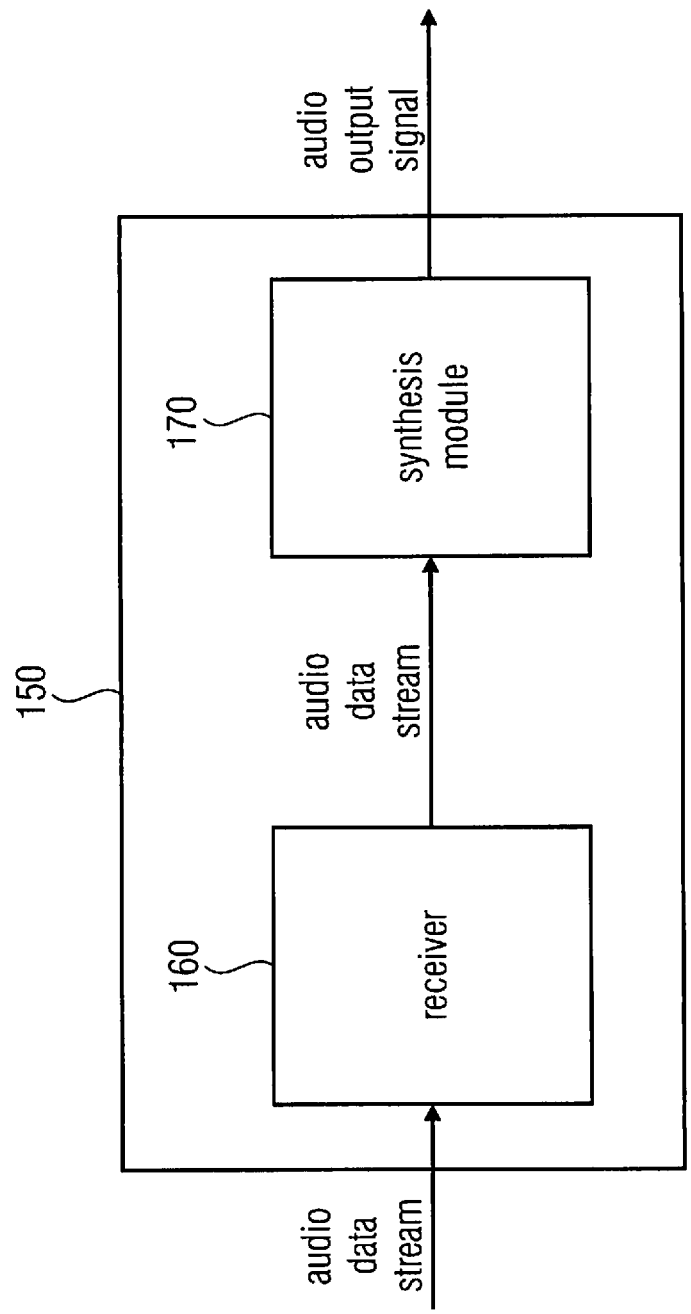
FIG. 2a illustrates an apparatus for generating at least one audio output signal based on an audio data stream comprising audio data relating to one or more sound sources according to an embodiment.

FIG. 2a illustrates an apparatus 150 for generating at least one audio output signal based on an audio data stream comprising audio data relating to one or more sound sources according to an embodiment.

The apparatus 150 comprises a receiver 160 for receiving the audio data stream comprising the audio data. The audio data comprises one or more pressure values for each one of the one or more sound sources. Furthermore, the audio data comprises one or more position values indicating a position of one of the sound sources for each one of the sound sources. Moreover, the apparatus comprises a synthesis module 170 for generating the at least one audio output signal based on at least one of the one or more pressure values of the audio data of the audio data stream and based on at least one of the one or more position values of the audio data of the audio data stream. The audio data is defined for a time-frequency bin of a plurality of time-frequency bins. For each one of the sound sources, at least one pressure value is comprised in the audio data, wherein the at least one pressure value may be a pressure value relating to an emitted sound wave, e.g. originating from the sound source. The pressure value may be a value of an audio signal, for example, a pressure value of an audio output signal generated by an apparatus for generating an audio output signal of a virtual microphone, wherein that the virtual microphone is placed at the position of the sound source.

Thus, FIG. 2a illustrates an apparatus 150 that may be employed for receiving or processing the mentioned audio data stream, i.e. the apparatus 150 may be employed on a receiver/synthesis side. The audio data stream comprises audio data which comprises one or more pressure values and one or more position values for each one of a plurality of sound sources, i.e. each one of the pressure values and the position values relates to a particular sound source of the one or more sound sources of the recorded audio scene. This means that the position values indicate positions of sound sources instead of the recording microphones. With respect to the pressure value this means that the audio data stream comprises one or more pressure value for each one of the sound sources, i.e. the pressure values indicate an audio signal which is related to a sound source instead of being related to a recording of a real spatial microphone.

According to an embodiment, the receiver 160 may be adapted to receive the audio data stream comprising the audio data, wherein the audio data furthermore comprises one or more diffuseness values for each one of the sound sources. The synthesis module 170 may be adapted to generate the at least one audio output signal based on at least one of the one or more diffuseness values.

FIG. 2b illustrates an apparatus 200 for generating an audio data stream comprising sound source data relating to one or more sound sources according to an embodiment. The apparatus 200 for generating an audio data stream comprises a determiner 210 for determining the sound source data based on at least one audio input signal recorded by at least one spatial microphone and based on audio side information provided by at least two spatial microphones. Furthermore, the apparatus 200 comprises a data stream generator 220 for generating the audio data stream such that the audio data stream comprises the sound source data. The sound source data comprises one or more pressure values for each one of the sound sources. Moreover, the sound source data furthermore comprises one or more position values indicating a sound source position for each one of the sound sources. Furthermore, the sound source data is defined for a time-frequency bin of a plurality of time-frequency bins.

The audio data stream generated by the apparatus 200 may then be transmitted. Thus, the apparatus 200 may be employed on an analysis/transmitter side. The audio data stream comprises audio data which comprises one or more pressure values and one or more position values for each one of a plurality of sound sources, i.e. each one of the pressure values and the position values relates to a particular sound source of the one or more sound sources of the recorded audio scene. This means that with respect to the position values, the position values indicate positions of sound sources instead of the recording microphones.

In a further embodiment, the determiner 210 may be adapted to determine the sound source data based on diffuseness information by at least one spatial microphone. The data stream generator 220 may be adapted to generate the audio data stream such that the audio data stream comprises the sound source data. The sound source data furthermore comprises one or more diffuseness values for each one of the sound sources.

FIG. 3a illustrates an audio data stream according to an embodiment. The audio data stream comprises audio data relating to two sound sources being active in one time-frequency bin. In particular, FIG. 3a illustrates the audio data that is transmitted for a time-frequency bin (k, n), wherein k denotes the frequency index and n denotes the time index. The audio data comprises a pressure value P1, a position value Q1 and a diffuseness value ψ1 of a first sound source. The position value Q1 comprises three coordinate values X1, Y1 and Z1 indicating the position of the first sound source. Furthermore, the audio data comprises a pressure value P2, a position value Q2 and a diffuseness value ψ2 of a second sound source. The position value Q2 comprises three coordinate values X2, Y2 and Z2 indicating the position of the second sound source.

FIG. 3b illustrates an audio stream according to another embodiment. Again, the audio data comprises a pressure value P1, a position value Q1 and a diffuseness value ψ1 of a first sound source. The position value Q1 comprises three coordinate values X1, Y1 and Z1 indicating the position of the first sound source. Furthermore, the audio data comprises a pressure value P2, a position value Q2 and a diffuseness value ψ2 of a second sound source. The position value Q2 comprises three coordinate values X2, Y2 and Z2 indicating the position of the second sound source.

Figure 3C:
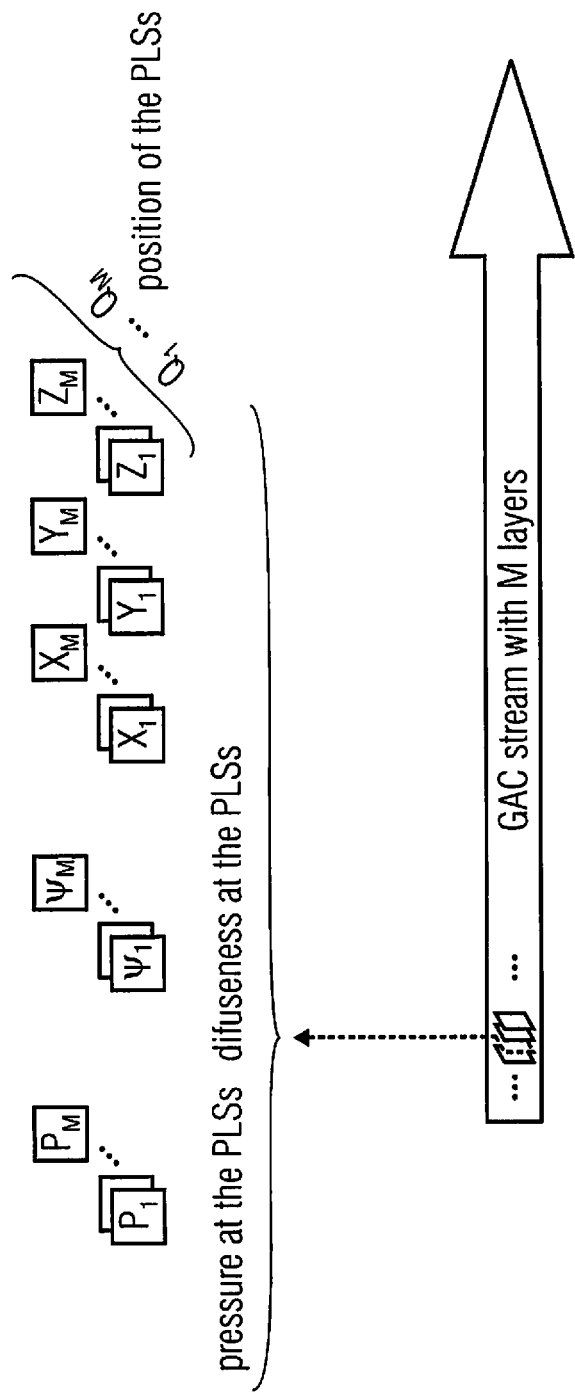

FIG. 3c provides another illustration of the audio data stream. As the audio data stream provides geometry-based spatial audio coding (GAC) information, it is also referred to as "geometry-based spatial audio coding stream" or "GAC stream". The audio data stream comprises information which relates to the one or more sound sources, e.g. one or more isotropic point-like source (IPLS). As already explained above, the GAC stream may comprise the following signals, wherein k and n denote the frequency index and the time index of the considered time-frequency bin:

P(k, n): Complex pressure at the sound source, e.g. at the IPLS. This signal possibly comprises direct sound (the sound originating from the IPLS itself) and diffuse sound.

Q(k,n): Position (e.g. Cartesian coordinates in 3D) of the sound source, e.g. of the IPLS: The position may, for example, comprise Cartesian coordinates X(k,n), Y(k, n), Z(k,n).

Diffuseness at the IPLS: ψ(k,n). This parameter is related to the power ratio of direct to diffuse sound comprised in P(k,n). If $P(k,n) = P_{dir}(k,n) + P_{diff}(k,n)$, then one possibility to express diffuseness is $\psi(k,n) = |P_{diff}(k,n)|^2 / |P(k,n)|^2$. If $|P(k,n)|^2$ is known, other equivalent representations are conceivable, for example, the Direct to Diffuse Ratio (DDR) $\Gamma = |Pdir(k,n)|^2 / |Pdiff(k,n)|^2$.

As already stated, k and n denote the frequency and time indices, respectively. If desired and if the analysis allows it, more than one IPLS can be represented at a given time-frequency slot. This is depicted in FIG. 3c as M multiple layers, so that the pressure signal for the i-th layer (i.e., for the i-th IPLS) is denoted with $P_i(k, n)$. For convenience, the position of the IPLS can be expressed as the vector $Q_i(k, n) = [X_i(k, n), Y_i(k, n), Z_i(k, n)]^T$. Differently than the state-of-the-art, all parameters in the GAC stream are expressed with respect to the one or more sound source, e.g. with respect to the IPLS, thus achieving independence from the recording position. In FIG. 3c, as well as in FIGS. 3a and 3b, all quantities in the figure are considered in time-frequency domain; the (k,n) notation was neglected for reasons of simplicity, for example, $P_i$ means $P_i(k,n)$, e.g. $P_i = P_i(k,n)$.

In the following, an apparatus for generating an audio data stream according to an embodiment is explained in more detail. As the apparatus of FIG. 2b, the apparatus of FIG. 4 comprises a determiner 210 and a data stream generator 220 which may be similar to the determiner 210. As the determiner analyzes the audio input data to determine the sound source data based on which the data stream generator generates the audio data stream, the determiner and the data stream generator may together be referred to as an "analysis module". (see analysis module 410 in FIG. 4).

The analysis module 410 computes the GAC stream from the recordings of the N spatial microphones. Depending on the number M of layers desired (e.g. the number of sound sources for which information shall be comprised in the audio data stream for a particular time-frequency bin), the type and number N of spatial microphones, different methods for the analysis are conceivable. A few examples are given in the following.

As a first example, parameter estimation for one sound source, e.g. one IPLS, per time-frequency slot is considered. In the case of M=1, the GAC stream can be readily obtained with the concepts explained above for the apparatus for generating an audio output signal of a virtual microphone, in that a virtual spatial microphone can be placed in the position of the sound source, e.g. in the position of the IPLS. This allows the pressure signals to be calculated at the position of the IPLS, together with the corresponding position estimates, and possibly the diffuseness. These three parameters are grouped together in a GAC stream and can be further manipulated by module 102 in FIG. 8 before being transmitted or stored.

For example, the determiner may determine the position of a sound source by employing the concepts proposed for the sound events position estimation of the apparatus for generating an audio output signal of a virtual microphone. Moreover, the determiner may comprise an apparatus for generating an audio output signal and may use the determined position of the sound source as the position of the virtual microphone to calculate the pressure values (e.g. the values of the audio output signal to be generated) and the diffuseness at the position of the sound source.

Figure 4:
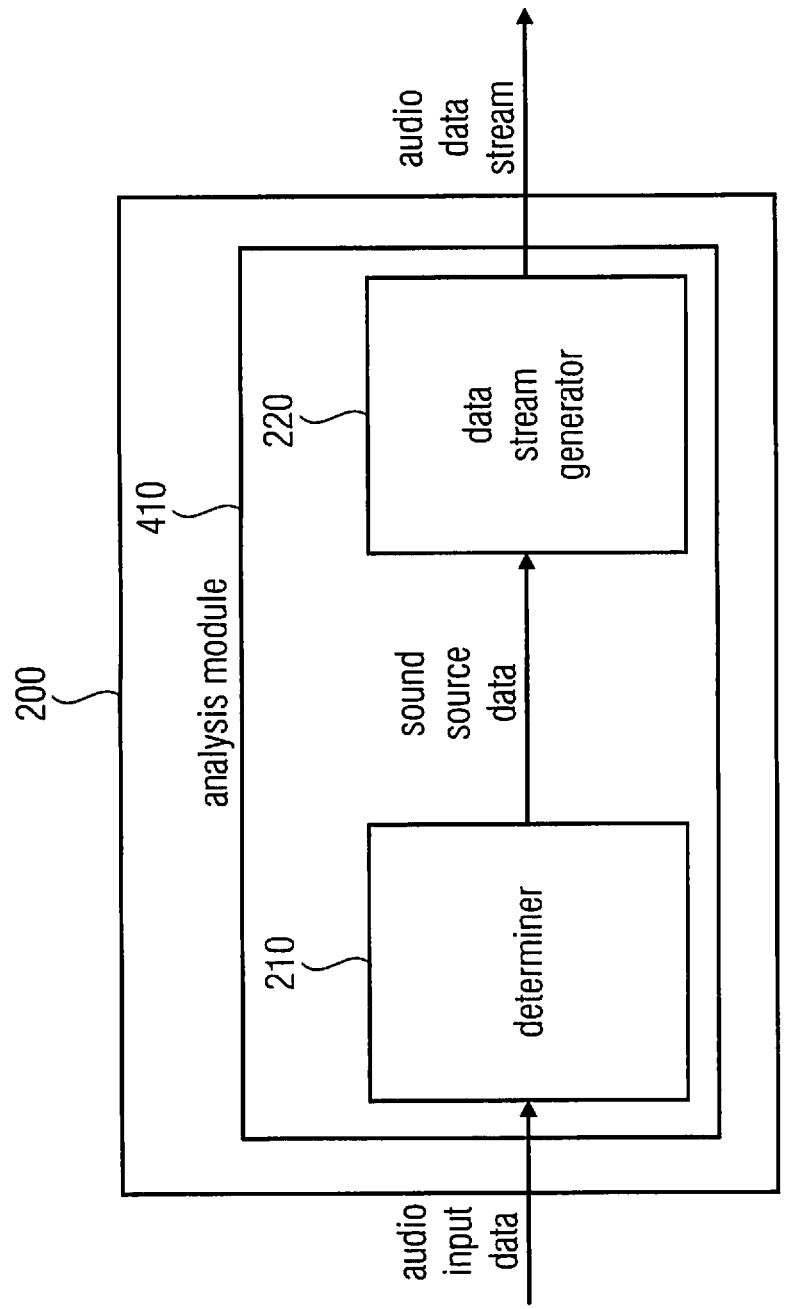
FIG. 4 illustrates an apparatus for generating an audio data stream comprising sound source data relating to one or more sound sources according to another embodiment.

In particular, the determiner 210, e.g., in FIG. 4), is configured to determine the pressure signals, the corresponding position estimates, and the corresponding diffuseness, while the data stream generator 220 is configured to generate the audio data stream based on the calculated pressure signals, position estimates and diffuseness.

As another example, parameter estimation for 2 sound sources, e.g. 2 IPLS, per time-frequency slot is considered. If the analysis module 410 is to estimate two sound sources per time-frequency bin, then the following concept based on state-of-the-art estimators can be used.

Figure 5:
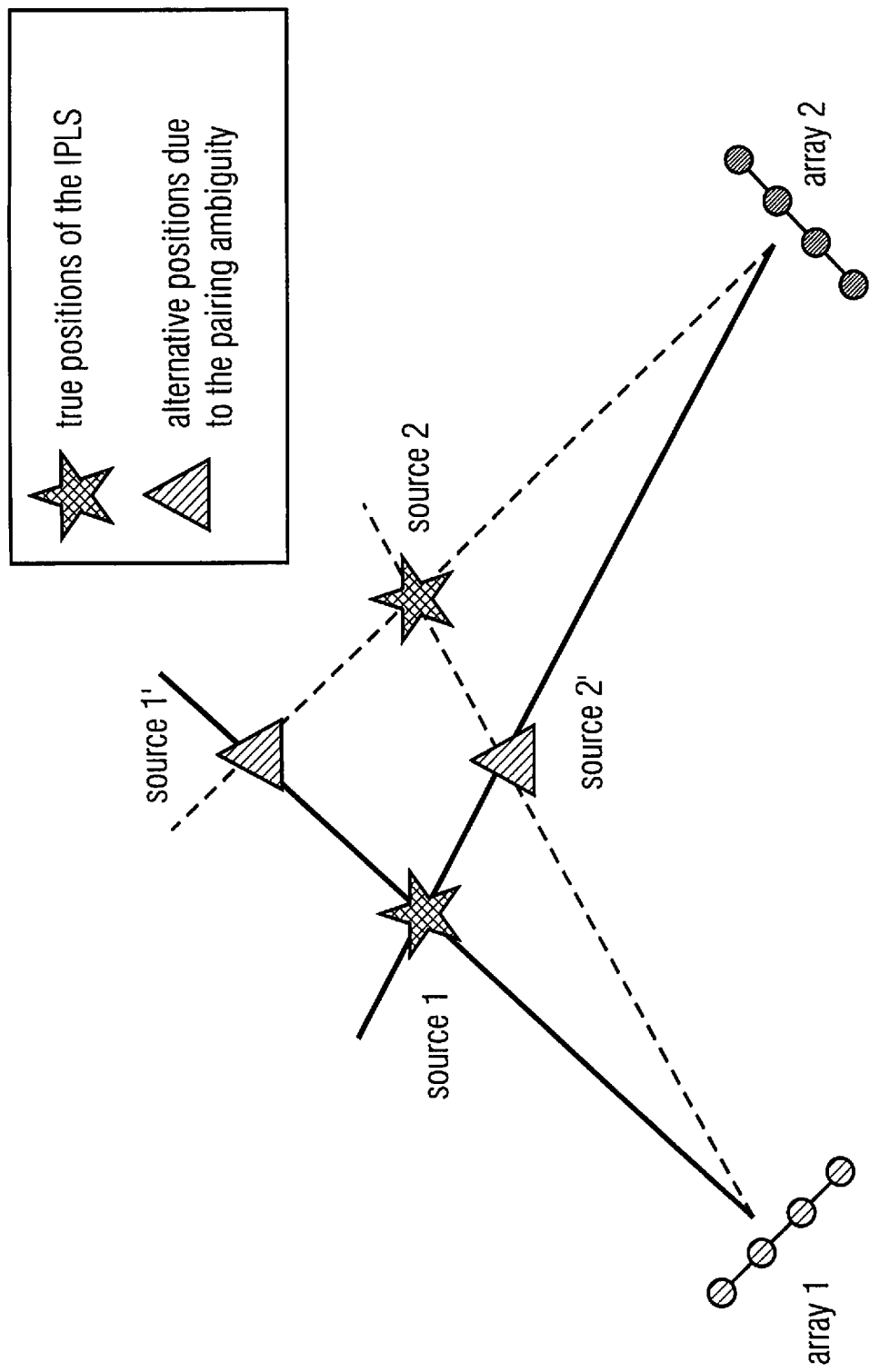
FIG. 5 illustrates a sound scene composed of two sound sources and two uniform linear microphone arrays.

FIG. 5 illustrates a sound scene composed of two sound sources and two uniform linear microphone arrays. Reference is made to ESPRIT, see

[26] R. Roy and T. Kailath. ESPRIT-estimation of signal parameters via rotational invariance techniques. Acoustics, Speech and Signal Processing, IEEE Transactions on, 37(7):984-995, July 1989.

ESPRIT ([26]) can be employed separately at each array to obtain two DOA estimates for each time-frequency bin at each array. Due to a pairing ambiguity, this leads to two possible solutions for the position of the sources. As can be seen from FIG. 5, the two possible solutions are given by (1, 2) and (1', 2'). In order to solve this ambiguity, the following solution can be applied. The signal emitted at each source is estimated by using a beamformer oriented in the direction of the estimated source positions and applying a proper factor to compensate for the propagation (e.g., multiplying by the inverse of the attenuation experienced by the wave). This can be carried out for each source at each array for each of the possible solutions. We can then define an estimation error for each pair of sources (i, j) as:

$$E_{i,j} = |P_{i,1} - P_{i,2}| + |P_{j,1} - P_{j,2}|, \quad (1)$$

where $(i, j) \in \{(1, 2), (1', 2')\}$ (see FIG. 5) and $P_{i,1}$ stands for the compensated signal power seen by array r from sound source i. The error is minimal for the true sound source pair. Once the pairing issue is solved and the correct DOA estimates are computed, these are grouped, together with the corresponding pressure signals and diffuseness estimates into a GAC stream. The pressure signals and diffuseness estimates can be obtained using the same method already described for the parameter estimation for one sound source.

Figure 6A:
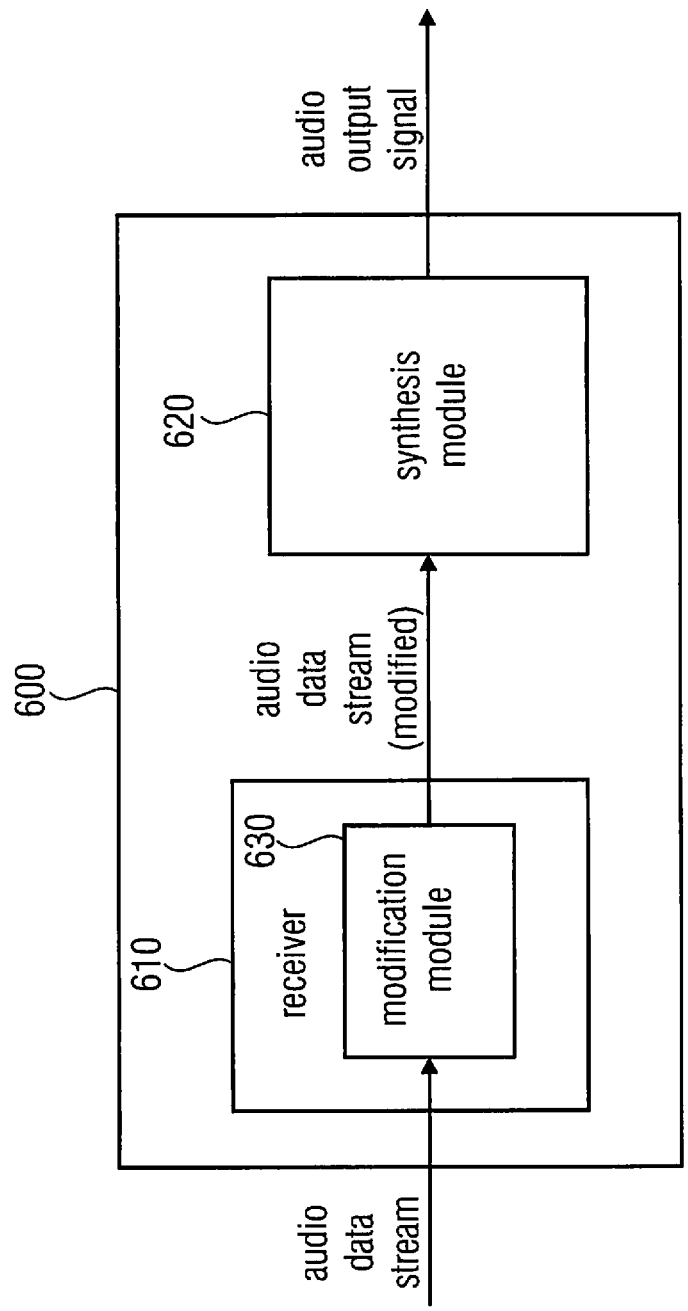
FIG. 6a illustrates an apparatus 600 for generating at least one audio output signal based on an audio data stream according to an embodiment.

FIG. 6a illustrates an apparatus 600 for generating at least one audio output signal based on an audio data stream according to an embodiment. The apparatus 600 comprises a receiver 610 and a synthesis module 620. The receiver 610 comprises a modification module 630 for modifying the audio data of the received audio data stream by modifying at least one of the pressure values of the audio data, at least one of the position values of the audio data or at least one of the diffuseness values of the audio data relating to at least one of the sound sources.

FIG. 6b illustrates an apparatus 660 for generating an audio data stream comprising sound source data relating to one or more sound sources according to an embodiment. The apparatus for generating an audio data stream comprises a determiner 670, a data stream generator 680 and furthermore a modification module 690 for modifying the audio data stream generated by the data stream generator by modifying at least one of the pressure values of the audio data, at least one of the position values of the audio data or at least one of the diffuseness values of the audio data relating to at least one of the sound sources.

While the modification module 610 of FIG. 6a is employed on a receiver/synthesis side, the modification module 660 of FIG. 6b is employed on a transmitter/analysis side.

The modifications of the audio data stream conducted by the modification modules 610, 660 may also be considered as modifications of the sound scene. Thus, the modification modules 610, 660 may also be referred to as sound scene manipulation modules.

The sound field representation provided by the GAC stream allows different kinds of modifications of the audio data stream, i.e. as a consequence, manipulations of the sound scene. Some examples in this context are:

1. Expanding arbitrary sections of space/volumes in the sound scene (e.g. expansion of a point-like sound source in order to make it appear wider to the listener);

2. Transforming a selected section of space/volume to any other arbitrary section of space/volume in the sound scene (the transformed space/volume could e.g. contain a source that is necessitated to be moved to a new location);
3. Position-based filtering, where selected regions of the sound scene are enhanced or partially/completely suppressed In the following a layer of an audio data stream, e.g. a GAC stream, is assumed to comprise all audio data of one of the sound sources with respect to a particular time-frequency bin.

FIG. 7 depicts a modification module according to an embodiment. The modification unit of FIG. 7 comprises a demultiplexer 401, a manipulation processor 420 and a multiplexer 405.

The demultiplexer 401 is configured to separate the different layers of the M-layer GAC stream and form M single-layer GAC streams. Moreover, the manipulation processor 420 comprises units 402, 403 and 404, which are applied on each of the GAC streams separately. Furthermore, the multiplexer 405 is configured to form the resulting M-layer GAC stream from the manipulated single-layer GAC streams.

Based on the position data from the GAC stream and the knowledge about the position of the real sources (e.g. talkers), the energy can be associated with a certain real source for every time-frequency bin. The pressure values P are then weighted accordingly to modify the loudness of the respective real source (e.g. talker). It necessitates a priori information or an estimate of the location of the real sound sources (e.g. talkers).

In some embodiments, if knowledge about the position of the real sources is available, then based on the position data from the GAC stream, the energy can be associated with a certain real source for every time-frequency bin.

The manipulation of the audio data stream, e.g. the GAC stream can take place at the modification module 630 of the apparatus 600 for generating at least one audio output signal of FIG. 6a, i.e. at a receiver/synthesis side and/or at the modification module 690 of the apparatus 660 for generating an audio data stream of FIG. 6b, i.e. at a transmitter/analysis side.

For example, the audio data stream, i.e. the GAC stream, can be modified prior to transmission, or before the synthesis after transmission.

Unlike the modification module 630 of FIG. 6a at the receiver/synthesis side, the modification module 690 of FIG. 6b at the transmitter/analysis side may exploit the additional information from the inputs 111 to 11N (the recorded signals) and 121 to 12N (relative position and orientation of the spatial microphones), as this information is available at the transmitter side. Using this information, a modification unit according to an alternative embodiment can be realized, which is depicted in FIG. 8.

Figure 9:
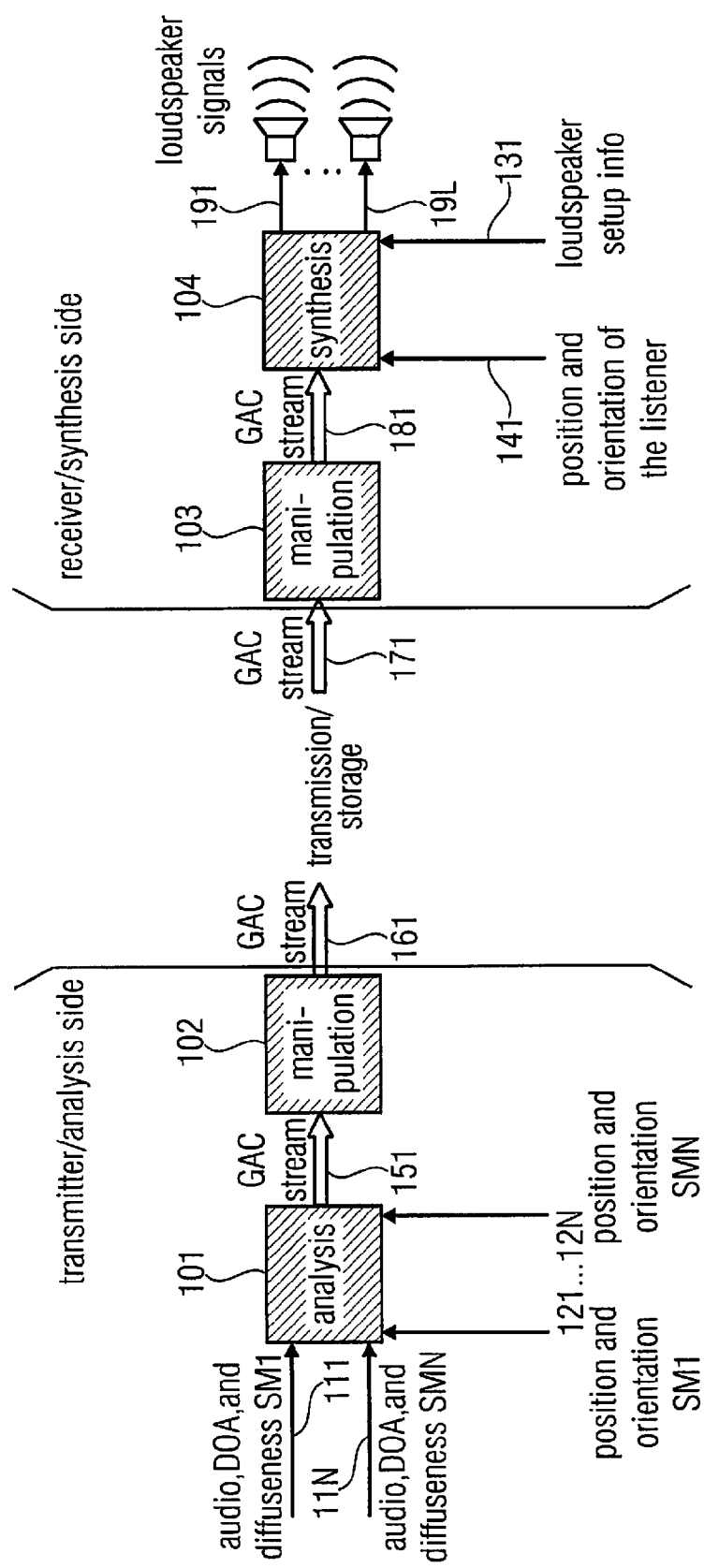
FIG. 9 illustrates transmitter/analysis units and a receiver/synthesis units according to an embodiment.

FIG. 9 depicts an embodiment by illustrating a schematic overview of a system, wherein a GAC stream is generated on a transmitter/analysis side, where, optionally, the GAC stream may be modified by a modification module 102 at a transmitter/analysis side, where the GAC stream may, optionally, be modified at a receiver/synthesis side by modification module 103 and wherein the GAC stream is used to generate a plurality of audio output signals 191 . . . 19L.

At the transmitter/analysis side, the sound field representation (e.g., the GAC stream) is computed in unit 101 from the inputs 111 to 11N, i.e., the signals recorded with N≥2 spatial microphones, and from the inputs 121 to 12N, i.e., relative position and orientation of the spatial microphones.

The output of unit 101 is the aforementioned sound field representation, which in the following is denoted as Geometry-based spatial Audio Coding (GAC) stream. Similarly to the proposal in
[20] Giovanni Del Galdo, Oliver Thiergart, Tobias Weller, and E. A. P. Habets. Generating virtual microphone signals using geometrical information gathered by distributed arrays. In Third Joint Workshop on Hands-free Speech Communication and Microphone Arrays (HSCMA '11), Edinburgh, United Kingdom, May 2011.
and as described for the apparatus for generating an audio output signal of a virtual microphone at a configurable virtual position, a complex sound scene is modeled by means of sound sources, e.g. isotropic point-like sound sources (IPLS), which are active at specific slots in a time-frequency representation, such as the one provided by the Short-Time Fourier Transform (STFT).

The GAC stream may be further processed in the optional modification module 102, which may also be referred to as a manipulation unit. The modification module 102 allows for a multitude of applications. The GAC stream can then be transmitted or stored. The parametric nature of the GAC stream is highly efficient. At the synthesis/receiver side, one more optional modification modules (manipulation units) 103 can be employed. The resulting GAC stream enters the synthesis unit 104 which generates the loudspeaker signals. Given the independence of the representation from the recording, the end user at the reproduction side can potentially manipulate the sound scene and decide the listening position and orientation within the sound scene freely.

The modification/manipulation of the audio data stream, e.g. the GAC stream can take place at modification modules 102 and/or 103 in FIG. 9, by modifying the GAC stream accordingly either prior to transmission in module 102 or after the transmission before the synthesis 103. Unlike in modification module 103 at the receiver/synthesis side, the modification module 102 at the transmitter/analysis side may exploit the additional information from the inputs 111 to 11N (the audio data provided by the spatial microphones) and 121 to 12N (relative position and orientation of the spatial microphones), as this information is available at the transmitter side. FIG. 8 illustrates an alternative embodiment of a modification module which employs this information.

Examples of different concepts for the manipulation of the GAC stream are described in the following with reference to FIG. 7 and FIG. 8. Units with equal reference signals have equal function.

1. Volume Expansion

It is assumed that a certain energy in the scene is located within volume V. The volume V may indicate a predefined area of an environment. $\Theta$ denotes the set of time-frequency bins (k, n) for which the corresponding sound sources, e.g. IPLS, are localized within the volume V.

If expansion of the volume V to another volume V' is desired, this can be achieved by adding a random term to the position data in the GAC stream whenever (k, n) ∈ (evaluated in the decision units 403) and substituting $Q(k, n) = [X(k, n), Y(k, n), Z(k, n)]^T$ (the index layer is dropped for simplicity) such that the outputs 431 to 43M of units 404 in FIGS. 7 and 8 become $$Q(k,n) = [X(k,n) + \Phi_x(k,n); Y(k,n) + \Phi_y(k,n); Z(k,n) + \Phi_z(k,n)]^T \quad (2)$$

where $\Phi_x$, $\Phi_y$ and $\Phi_z$ are random variables whose range depends on the geometry of the new volume V' with respect to the original volume V. This concept can for example be employed to make a sound source be perceived wider. In this example, the original volume V is infinitesimally small, i.e., the sound source, e.g. the IPLS, should be localized at the same point $Q(k, n)=[X(k, n), Y(k, n), Z(k, n)]^T$ for all $(k, n) \in \Theta$. This mechanism may be seen as a form of dithering of the position parameter $Q(k, n)$.

According to an embodiment, each one of the position values of each one of the sound sources comprise at least two coordinate values, and the modification module is adapted to modify the coordinate values by adding at least one random number to the coordinate values, when the coordinate values indicate that a sound source is located at a position within a predefined area of an environment.

2. Volume Transformation

In addition to the volume expansion, the position data from the GAC stream can be modified to relocate sections of space/volumes within the sound field. In this case as well, the data to be manipulated comprises the spatial coordinates of the localized energy.

V denotes again the volume which shall be relocated, and $\Theta$ denotes the set of all time-frequency bins $(k, n)$ for which the energy is localized within the volume V. Again, the volume V may indicate a predefined area of an environment.

Volume relocation may be achieved by modifying the GAC stream, such that for all time-frequency bins $(k,n) \in \Theta$, $Q(k,n)$ are replaced by $f(Q(k,n))$ at the outputs 431 to 43M of units 404, where f is a function of the spatial coordinates (X, Y, Z), describing the volume manipulation to be performed. The function f might represent a simple linear transformation such as rotation, translation, or any other complex non-linear mapping. This technique can be used for example to move sound sources from one position to another within the sound scene by ensuring that $\Theta$ corresponds to the set of time-frequency bins in which the sound sources have been localized within the volume V. The technique allows a variety of other complex manipulations of the entire sound scene, such as scene mirroring, scene rotation, scene enlargement and/or compression etc. For example, by applying an appropriate linear mapping on the volume V, the complementary effect of volume expansion, i.e., volume shrinkage can be achieved. This could e.g. be done by mapping $Q(k,n)$ for $(k,n) \in \Theta$ to $f(Q(k,n)) \in V'$, where $V' \subset V$ and V' comprises a significantly smaller volume than V.

According to an embodiment, the modification module is adapted to modify the coordinate values by applying a deterministic function on the coordinate values, when the coordinate values indicate that a sound source is located at a position within a predefined area of an environment.

3. Position-Based Filtering

The geometry-based filtering (or position-based filtering) idea offers a method to enhance or completely/partially remove sections of space/volumes from the sound scene. Compared to the volume expansion and transformation techniques, in this case, however, only the pressure data from the GAC stream is modified by applying appropriate scalar weights.

In the geometry-based filtering, a distinction can be made between the transmitter-side 102 and the receiver-side modification module 103, in that the former one may use the inputs 111 to 11N and 121 to 12N to aid the computation of appropriate filter weights, as depicted in FIG. 8. Assuming that the goal is to suppress/enhance the energy originating from a selected section of space/volume V, geometry-based filtering can be applied as follows:

For all $(k, n) \in \Theta$, the complex pressure $P(k, n)$ in the GAC stream is modified to $\eta P(k, n)$ at the outputs of 402, where $\eta$ is a real weighting factor, for example computed by unit 402. In some embodiments, module 402 can be adapted to compute a weighting factor dependent on diffuseness also.

The concept of geometry-based filtering can be used in a plurality of applications, such as signal enhancement and source separation. Some of the applications and the necessitated a priori information comprise:

Dereverberation. By knowing the room geometry, the spatial filter can be used to suppress the energy localized outside the room borders which can be caused by multipath propagation. This application can be of interest, e.g. for hands-free communication in meeting rooms and cars. Note that in order to suppress the late reverberation, it is sufficient to close the filter in case of high diffuseness, whereas to suppress early reflections a position-dependent filter is more effective. In this case, as already mentioned, the geometry of the room needs to be known a-priori.

Background Noise Suppression. A similar concept can be used to suppress the background noise as well. If the potential regions where sources can be located, (e.g., the participants' chairs in meeting rooms or the seats in a car) are known, then the energy located outside of these regions is associated to background noise and is therefore suppressed by the spatial filter. This application necessitates a priori information or an estimate, based on the available data in the GAC streams, of the approximate location of the sources.

Suppression of a point-like interferer. If the interferer is clearly localized in space, rather than diffuse, position-based filtering can be applied to attenuate the energy localized at the position of the interferer. It necessitates a priori information or an estimate of the location of the interferer.

Echo control. In this case the interferers to be suppressed are the loudspeaker signals. For this purpose, similarly as in the case for point-like interferers, the energy localized exactly or at the close neighborhood of the loudspeakers position is suppressed. It necessitates a priori information or an estimate of the loudspeaker positions.

Enhanced voice detection. The signal enhancement techniques associated with the geometry-based filtering invention can be implemented as a preprocessing step in a conventional voice activity detection system, e.g. in cars. The dereverberation, or noise suppression can be used as add-ons to improve the system performance.

Surveillance. Preserving only the energy from certain areas and suppressing the rest is a commonly used technique in surveillance applications. It necessitates a priori information on the geometry and location of the area of interest.

Source Separation. In an environment with multiple simultaneously active sources geometry-based spatial filtering may be applied for source separation. Placing an appropriately designed spatial filter centered at the location of a source, results in suppression/attenuation of the other simultaneously active sources. This innovation may be used e.g. as a front-end in SAOC. A priori information or an estimate of the source locations is necessitated.

Position-dependent Automatic Gain Control (AGC). Position-dependent weights may be used e.g. to equalize the loudness of different talkers in teleconferencing applications.

In the following, synthesis modules according to embodiments are described. According to an embodiment, a synthesis module may be adapted to generate at least one audio output signal based on at least one pressure value of audio data of an audio data stream and based on at least one position value of the audio data of the audio data stream. The at least one pressure value may be a pressure value of a pressure signal, e.g. an audio signal.

The principles of operation behind the GAC synthesis are motivated by the assumptions on the perception of spatial sound given in

[27] WO2004077884: Tapio Lokki, Juha Merimaa, and Ville Pulkki. Method for reproducing natural or modified spatial impression in multichannel listening, 2006.

In particular, the spatial cues necessitated to correctly perceive the spatial image of a sound scene can be obtained by correctly reproducing one direction of arrival of nondiffuse sound for each time-frequency bin. The synthesis, depicted in FIG. 10a, is therefore divided in two stages.

The first stage considers the position and orientation of the listener within the sound scene and determines which of the M IPLS is dominant for each time-frequency bin. Consequently, its pressure signal $P_{dir}$ and direction of arrival $\theta$ can be computed. The remaining sources and diffuse sound are collected in a second pressure signal $P_{diff}$.

The second stage is identical to the second half of the DirAC synthesis described in [27]. The nondiffuse sound is reproduced with a panning mechanism which produces a point-like source, whereas the diffuse sound is reproduced from all loudspeakers after having being decorrelated.

Figure 10A:
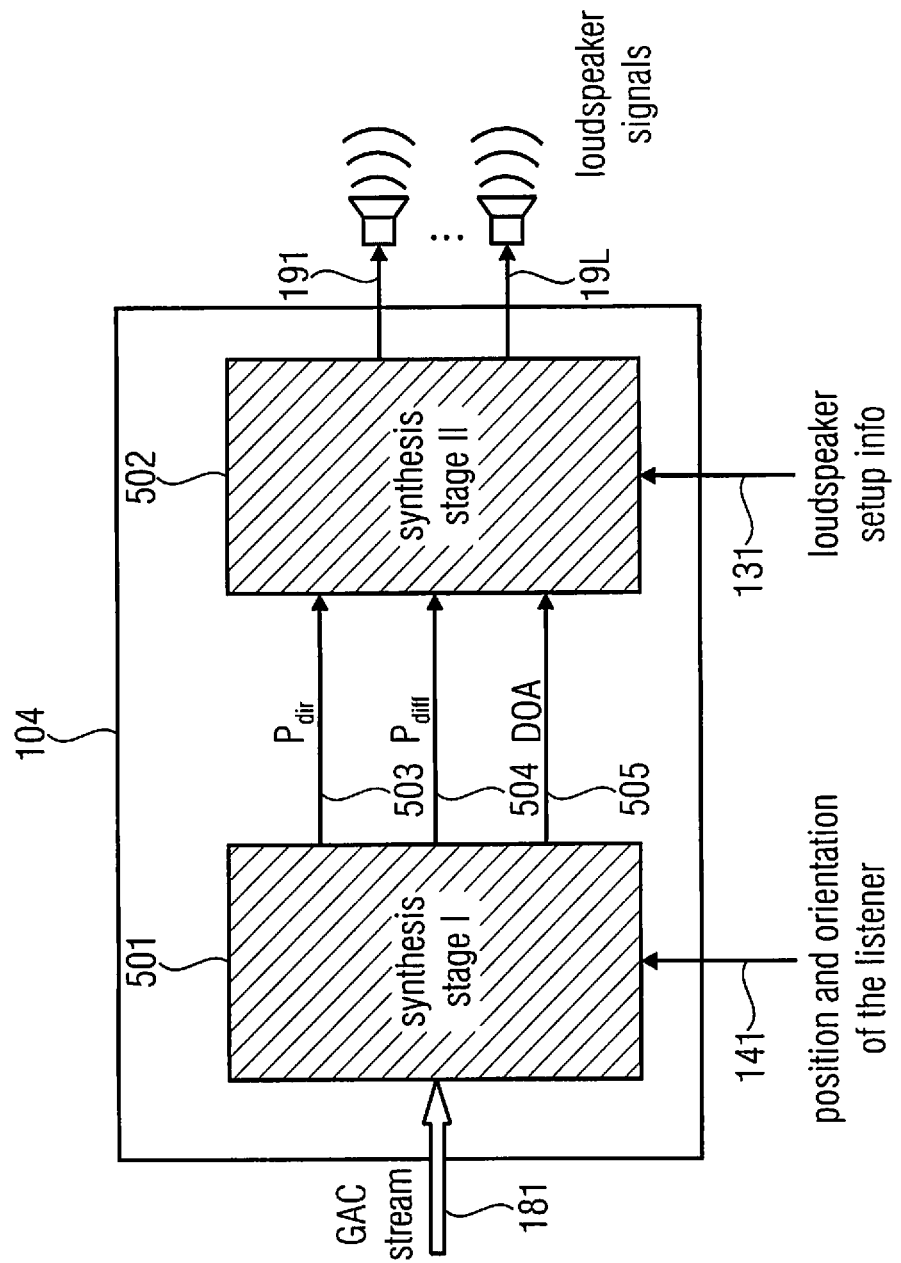
FIG. 10a depicts a synthesis module according to an embodiment.

FIG. 10a depicts a synthesis module according to an embodiment illustrating the synthesis of the GAC stream.

The first stage synthesis unit 501, computes the pressure signals $P_{dir}$ and $P_{diff}$ which need to be played back differently. In fact, while $P_{dir}$ comprises sound which has to be played back coherently in space, $P_{diff}$ comprises diffuse sound. The third output of first stage synthesis unit 501 is the Direction Of Arrival (DOA) $\theta$ 505 from the point of view of the desired listening position, i.e. a direction of arrival information. Note that the Direction of Arrival (DOA) may be expressed as an azimuthal angle if 2D space, or by an azimuth and elevation angle pair in 3D. Equivalently, a unit norm vector pointed at the DOA may be used. The DOA specifies from which direction (relative to the desired listening position) the signal $P_{dir}$ should come from. The first stage synthesis unit 501 takes the GAC stream as an input, i.e., a parametric representation of the sound field, and computes the aforementioned signals based on the listener position and orientation specified by input 141. In fact, the end user can decide freely the listening position and orientation within the sound scene described by the GAC stream.

The second stage synthesis unit 502 computes the L loudspeaker signals 511 to 51L based on the knowledge of the loudspeaker setup 131. Please recall that unit 502 is identical to the second half of the DirAC synthesis described in [27].

Figure 10B:
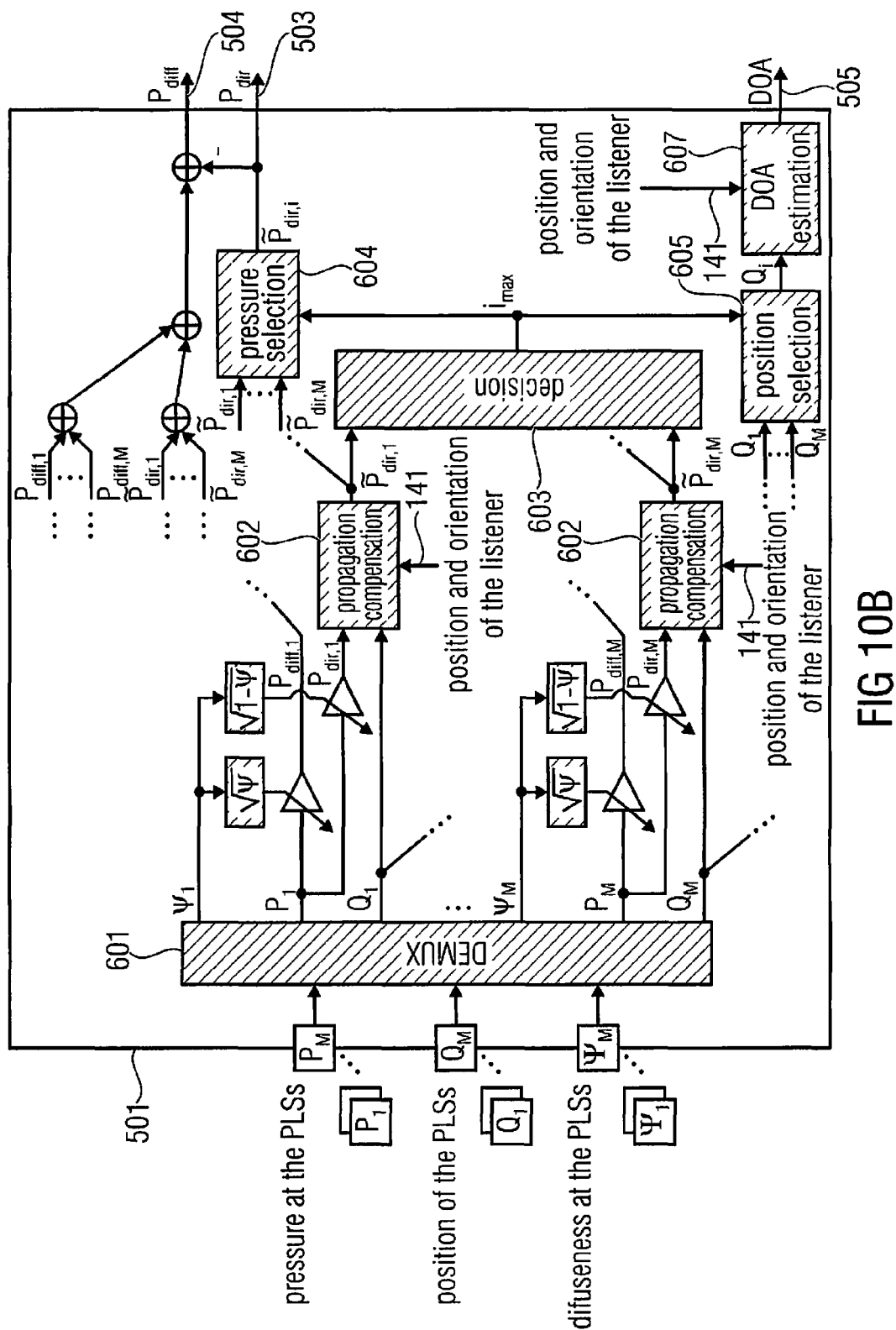
FIG. 10b depicts a first synthesis stage unit according to an embodiment.

FIG. 10b depicts a first synthesis stage unit according to an embodiment. The input provided to the block is a GAC stream composed of M layers. In a first step, unit 601 demultiplexes the M layers into M parallel GAC stream of one layer each.

The i-th GAC stream comprises a pressure signal $P_i$, a diffuseness $\psi_i$ and a position vector $Q_i=[X_i, Y_i, Z_i]^T$. The pressure signal $P_i$ comprises one or more pressure values. The position vector is a position value. At least one audio output signal is now generated based on these values.

The pressure signal for direct and diffuse sound $P_{dir,i}$ and $P_{diff,i}$, are obtained from $P_i$ by applying a proper factor derived from the diffuseness $\psi_i$. The pressure signals comprise direct sound enter a propagation compensation block 602, which computes the delays corresponding to the signal propagation from the sound source position, e.g. the IPLS position, to the position of the listener. In addition to this, the block also computes the gain factors necessitated for compensating the different magnitude decays. In other embodiments, only the different magnitude decays are compensated, while the delays are not compensated.

The compensated pressure signals, denoted by $\tilde{P}_{dir,i}$ enter block 603, which outputs the index $i_{max}$ of the strongest input $$i_{max} = \arg\max_i |\tilde{P}_{dir,i}|^2 \qquad (3)$$

The main idea behind this mechanism is that of the M IPLS active in the time-frequency bin under study, only the strongest (with respect to the listener position) is going to be played back coherently (i.e., as direct sound). Blocks 604 and 605 select from their inputs the one which is defined by $i_{max}$. Block 607 computes the direction of arrival of the $i_{max}$-th IPLS with respect to the position and orientation of the listener (input 141). The output of block 604 $\tilde{P}_{dir,i_{max}}$ corresponds to the output of block 501, namely the sound signal $P_{dir}$ which will be played back as direct sound by block 502. The diffuse sound, namely output 504 $P_{diff}$, comprises the sum of all diffuse sound in the M branches as well as all direct sound signals $\tilde{P}_{dir,j}$ except for the $i_{max}$-th, namely $\forall j \neq i_{max}$.

Figure 10C:
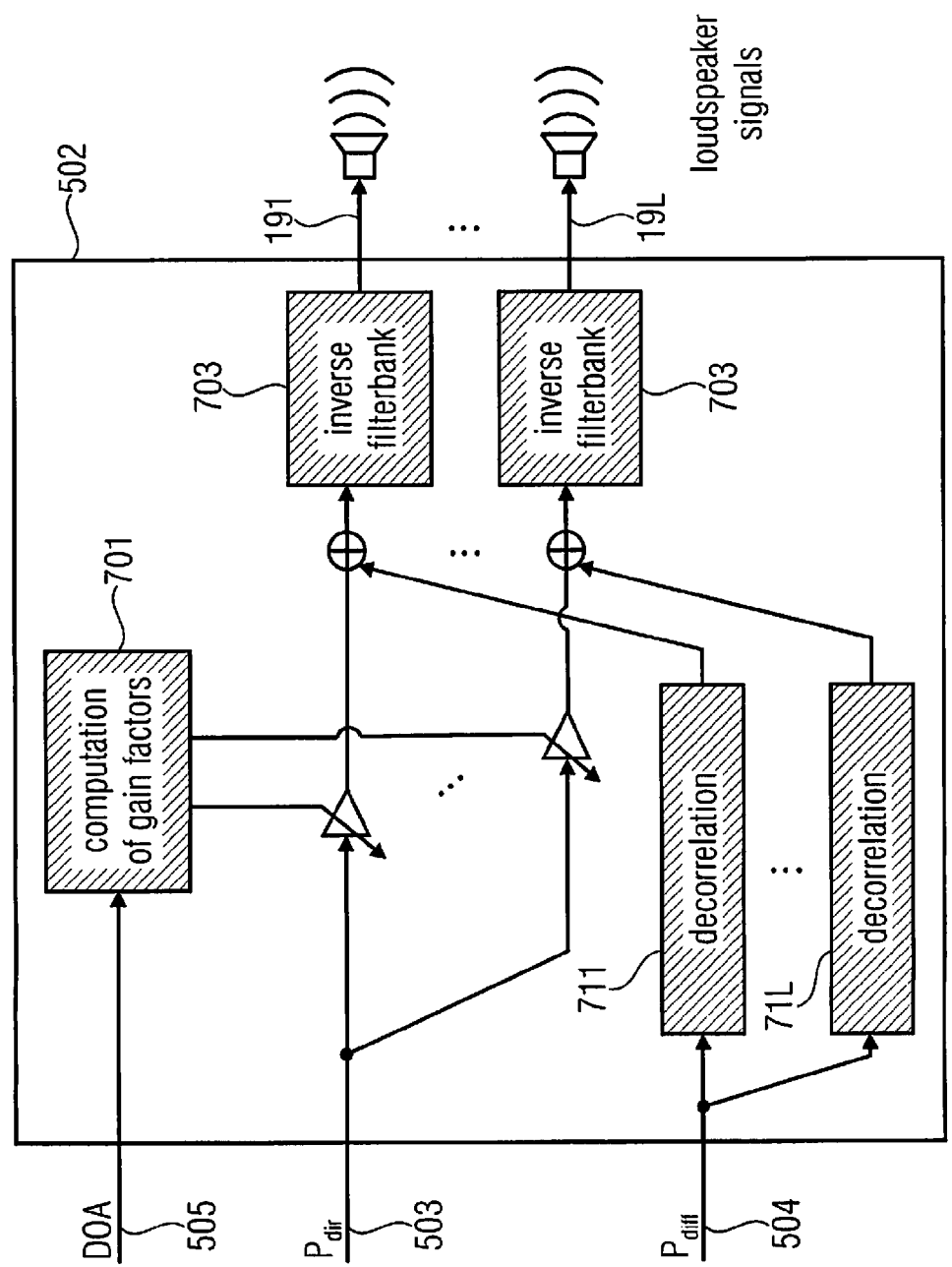
FIG. 10c depicts a second synthesis stage unit according to an embodiment.

FIG. 10c illustrates a second synthesis stage unit 502. As already mentioned, this stage is identical to the second half of the synthesis module proposed in [27]. The nondiffuse sound $P_{dir}$ 503 is reproduced as a point-like source by e.g. panning, whose gains are computed in block 701 based on the direction of arrival (505). On the other hand, the diffuse sound, $P_{diff}$ goes through L distinct decorrelators (711 to 71L). For each of the L loudspeaker signals, the direct and diffuse sound paths are added before going through the inverse filterbank (703).

Figure 11:
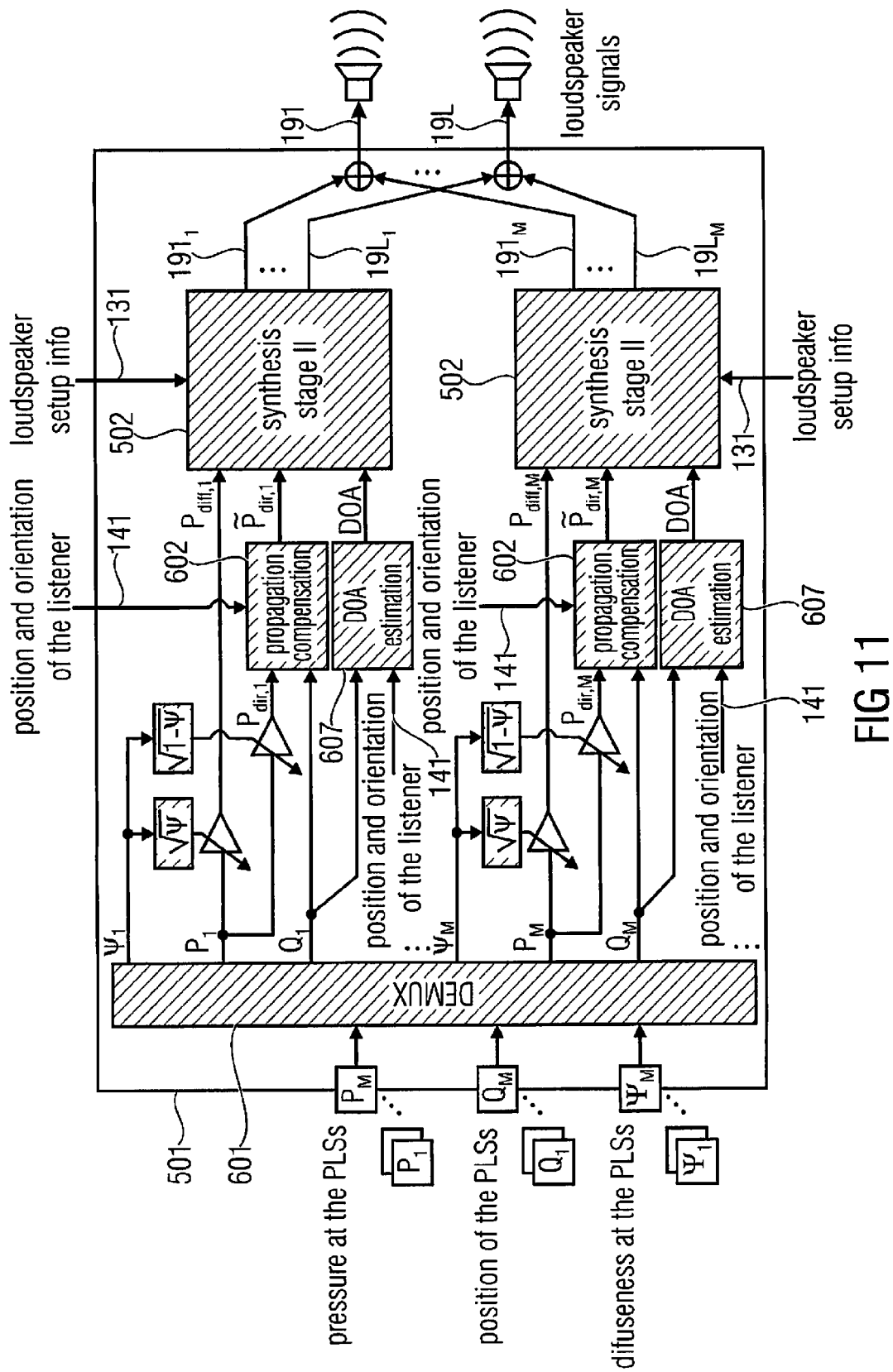
FIG. 11 depicts a synthesis module according to another embodiment.

FIG. 11 illustrates a synthesis module according to an alternative embodiment. All quantities in the figure are considered in time-frequency domain; the (k,n) notation was neglected for reasons of simplicity, e.g. $P_i=P_i(k,n)$. In order to improve the audio quality of the reproduction in case of particularly complex sound scenes, e.g., numerous sources active at the same time, the synthesis module, e.g. synthesis module 104 may, for example, be realized as shown in FIG. 11. Instead of selecting the most dominant IPLS to be reproduced coherently, the synthesis in FIG. 11 carries out a full synthesis of each of the M layers separately. The L loudspeaker signals from the i-th layer are the output of block 502 and are denoted by $19l_i$ to $19L_i$. The h-th loudspeaker signal $19h$ at the output of the first synthesis stage unit 501 is the sum of $19h_1$ to $19h_M$. Please note that differently from FIG. 10b, the DOA estimation step in block 607 needs to be carried out for each of the M layers.

Figure 26:
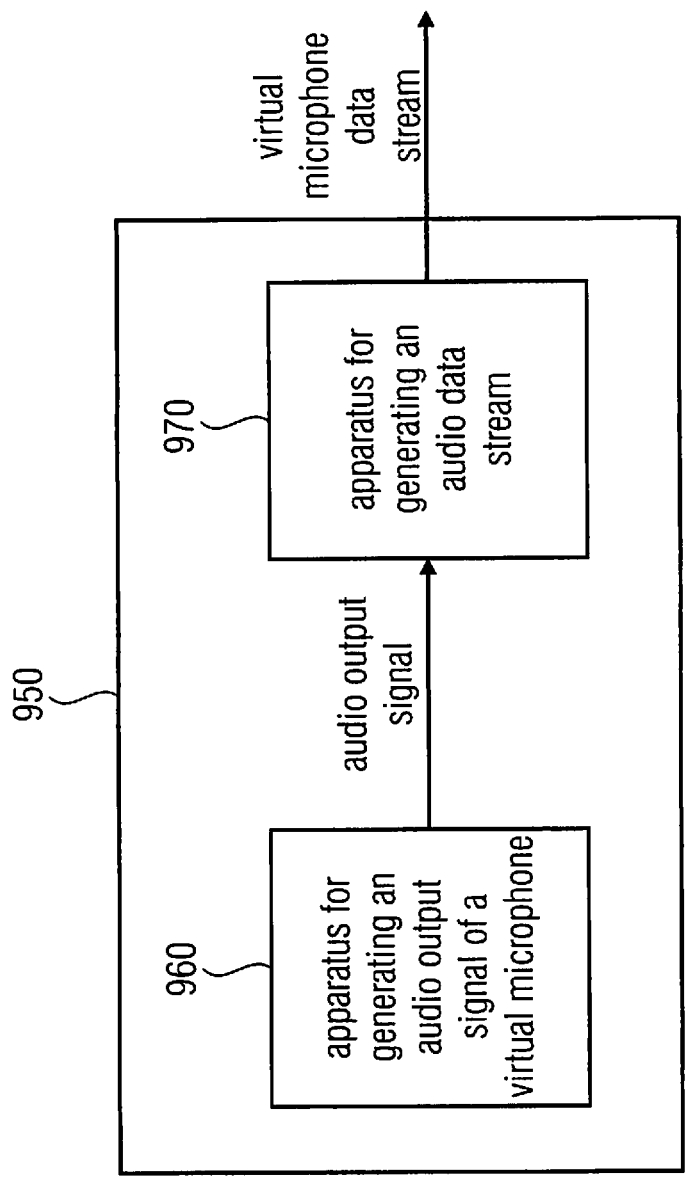
FIG. 26 illustrates an apparatus for generating a virtual microphone data stream according to an embodiment.

FIG. 26 illustrates an apparatus 950 for generating a virtual microphone data stream according to an embodiment. The apparatus 950 for generating a virtual microphone data stream comprises an apparatus 960 for generating an audio output signal of a virtual microphone according to one of the above-described embodiments, e.g. according to FIG. 12, and an apparatus 970 for generating an audio data stream according to one of the above-described embodiments, e.g. according to FIG. 2b, wherein the audio data stream generated by the apparatus 970 for generating an audio data stream is the virtual microphone data stream.

The apparatus 960 e.g. in FIG. 26 for generating an audio output signal of a virtual microphone comprises a sound events position estimator and an information computation module as in FIG. 12. The sound events position estimator is adapted to estimate a sound source position indicating a position of a sound source in the environment, wherein the sound events position estimator is adapted to estimate the sound source position based on a first direction information provided by a first real spatial microphone being located at a first real microphone position in the environment, and based on a second direction information provided by a second real spatial microphone being located at a second real microphone position in the environment. The information computation module is adapted to generate the audio output signal based on a recorded audio input signal, based on the first real microphone position and based on the calculated microphone position.

The apparatus 960 for generating an audio output signal of a virtual microphone is arranged to provide the audio output signal to the apparatus 970 for generating an audio data stream. The apparatus 970 for generating an audio data stream comprises a determiner, for example, the determiner 210 described with respect to FIG. 2*b*. The determiner of the apparatus 970 for generating an audio data stream determines the sound source data based on the audio output signal provided by the apparatus 960 for generating an audio output signal of a virtual microphone.

Figure 27:
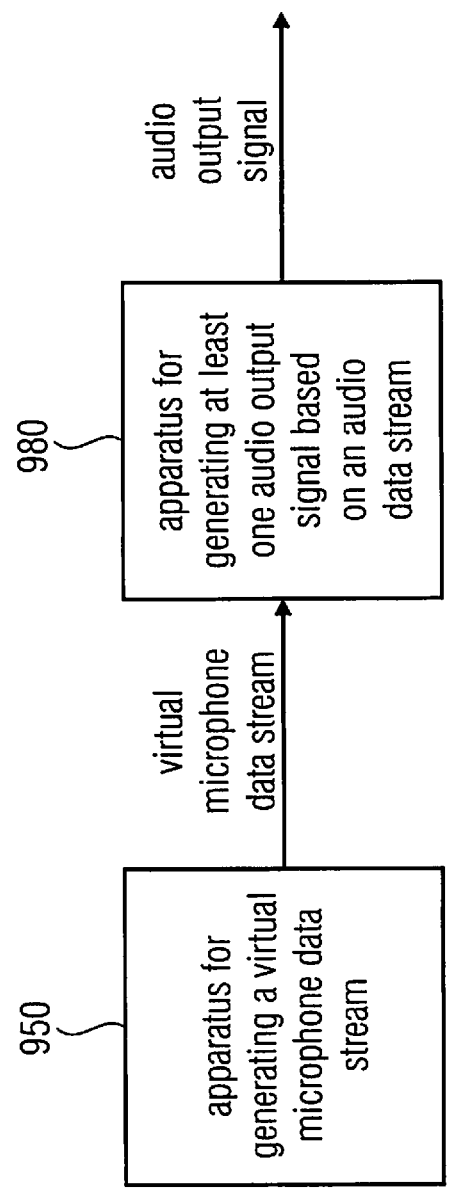
FIG. 27 illustrates an apparatus for generating at least one audio output signal based on an audio data stream according to another embodiment.

FIG. 27 illustrates an apparatus 980 for generating at least one audio output signal based on an audio data stream according to one of the above-described embodiments, e.g. the apparatus of claim 1, being configured to generate the audio output signal based on a virtual microphone data stream as the audio data stream provided by an apparatus 950 for generating a virtual microphone data stream, e.g. the apparatus 950 in FIG. 26.

The apparatus 980 for generating a virtual microphone data stream feeds the generated virtual microphone signal into the apparatus 980 for generating at least one audio output signal based on an audio data stream. It should be noted, that the virtual microphone data stream is an audio data stream. The apparatus 980 for generating at least one audio output signal based on an audio data stream generates an audio output signal based on the virtual microphone data stream as audio data stream, for example, as described with respect to the apparatus of FIG. 2*a*.

Figure 1:
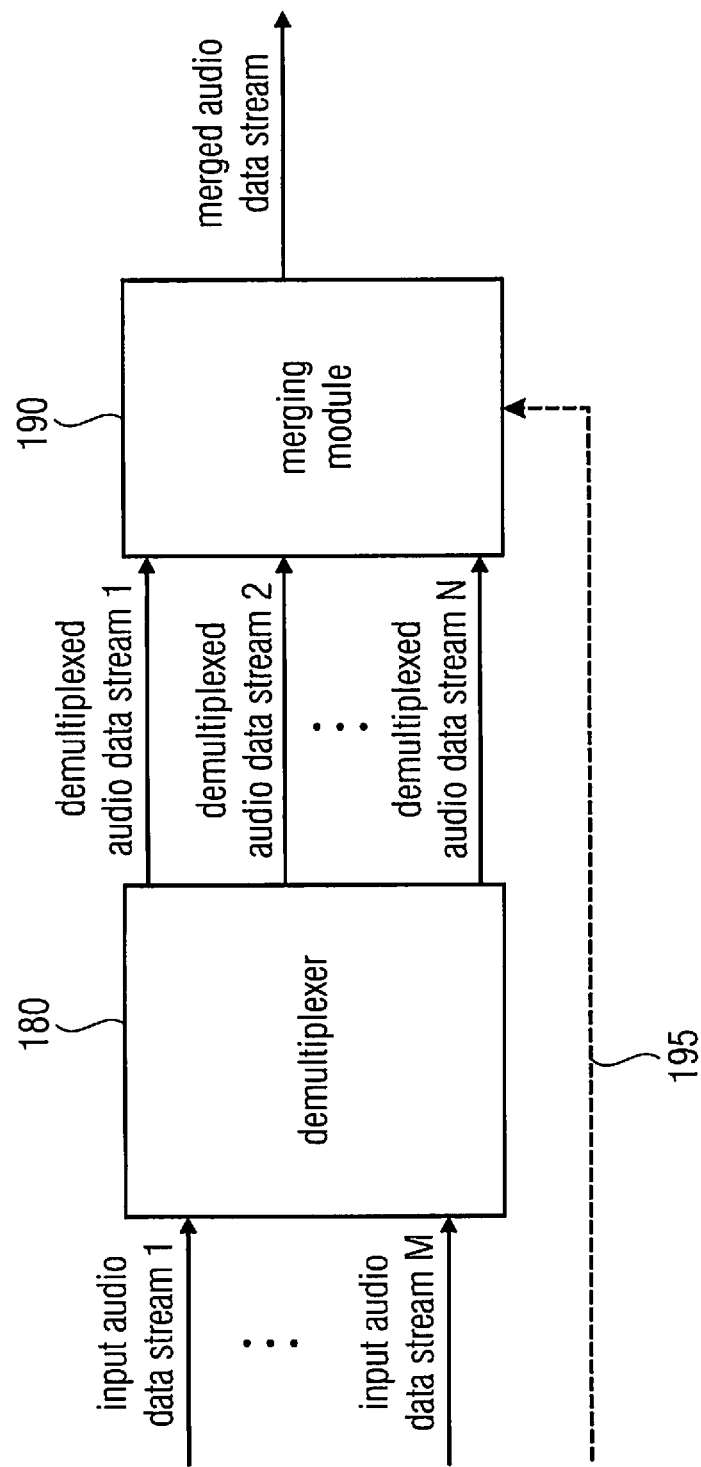
FIG. 1 illustrates an apparatus for generating a merged audio data stream according to an embodiment.

FIG. 1 illustrates an apparatus for generating a merged audio data stream according to an embodiment.

In an embodiment, the apparatus comprises a demultiplexer 180 for obtaining a plurality of single-layer audio data streams, wherein the demultiplexer 180 is adapted to receive one or more input audio data streams, wherein each input audio data stream comprises one or more layers, wherein the demultiplexer 180 is adapted to demultiplex each one of the input audio data streams having one or more layers into two or more demultiplexed audio data streams having exactly one layer, such that the one or more demultiplexed audio data streams together comprise the one or more layers of the input audio data stream, to obtain two or more of the single-layer audio data streams.

In a further embodiment, the apparatus comprises a demultiplexer 180 for obtaining a plurality of single-layer audio data streams, wherein the demultiplexer 180 is adapted to receive two or more input audio data streams, wherein each input audio data stream comprises one or more layers, wherein the demultiplexer 180 is adapted to demultiplex each one of the input audio data streams having two or more layers into two or more demultiplexed audio data streams having exactly one layer, such that the two or more demultiplexed audio data streams together comprise the two or more layers of the input audio data stream, to obtain two or more of the single-layer audio data streams.

Furthermore, the apparatus comprises a merging module 190 for generating the merged audio data stream, having one or more layers, based on the plurality of single-layer audio data streams. Each layer of the input data audio streams, of the demultiplexed audio data streams, of the single-layer data streams and of the merged audio data stream comprises a pressure value of a pressure signal, a position value and a diffuseness value as audio data, the audio data being defined for a time-frequency bin of a plurality of time-frequency bins.

In an embodiment, the apparatus may be adapted to feed one or more received input audio data streams having exactly one layer directly into the merging module without feeding them into the demultiplexer, see dashed line 195.

In some embodiments, the demultiplexer 180 is adapted to modify the pressure values of the demultiplexed audio data streams in order to equalize the volumes (e.g. loudness) of the different sound scenes represented by the demultiplexed audio data streams. For example, if two audio data streams originate from two different recording environments, and the first is characterized by low volume (e.g. due to sources which are far away from the microphones, or simply due to microphones with poor sensitivity or with low gain of the preamplifiers) it is possible to increase the volume of the first audio data stream by multiplying a scalar to the pressure values of the first audio data stream. Analogously, it is possible to decrease the volume of the second audio data stream in a similar fashion.

Figure 28:
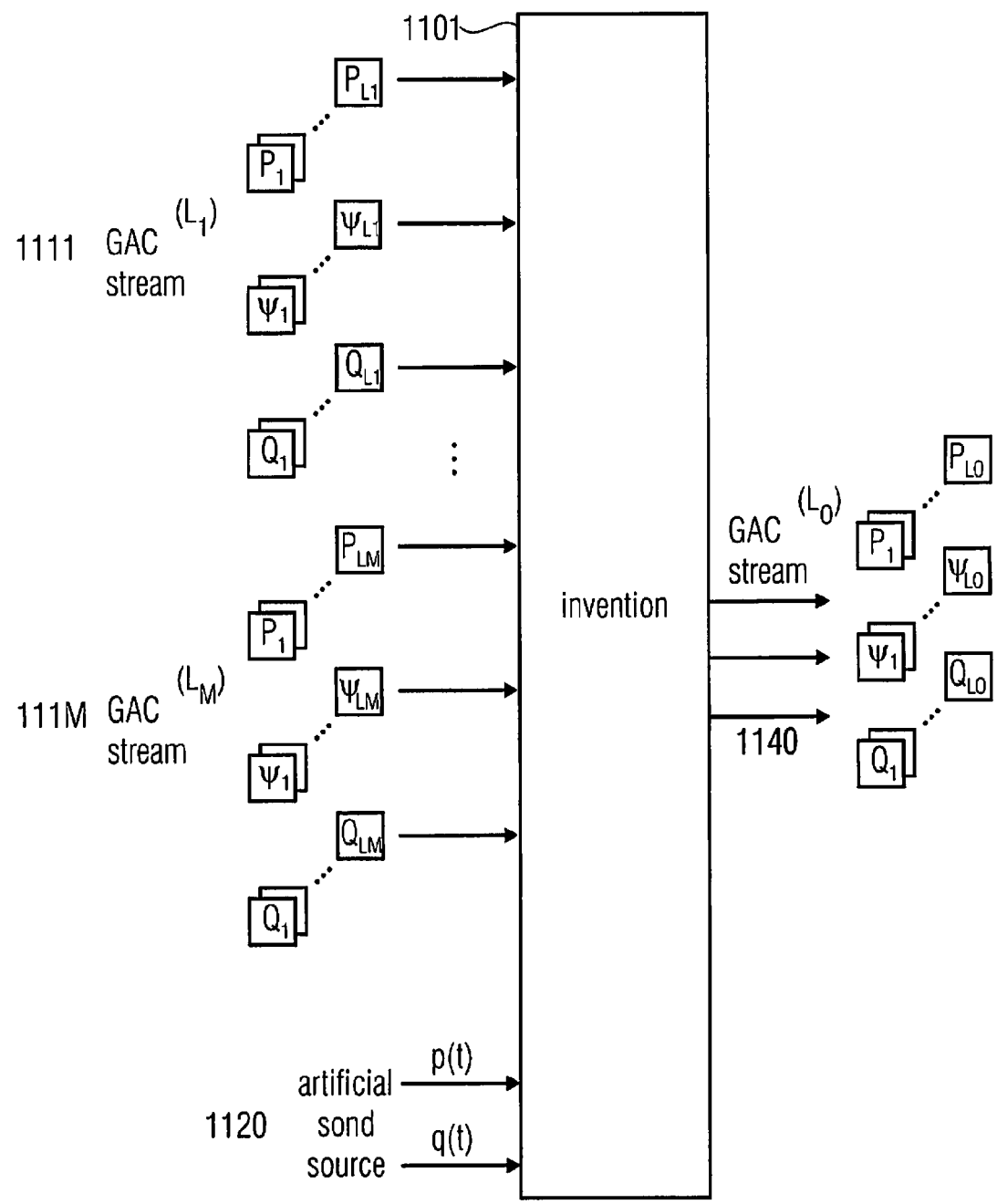
FIG. 28 depicts the inputs and outputs of an apparatus for generating a merged audio data stream according to another embodiment.

FIG. 28 depicts the inputs and outputs of an apparatus for generating a merged audio data stream according to another embodiment. A number of M audio data streams, for example M GAC streams, and optionally, a pressure signal p(t) and position q(t) of an artificial sound source to be injected, are input into the apparatus of FIG. 28. In another embodiment, two or more artificial sound sources (synthetic sound sources) are input into the apparatus. At the output, an audio output stream, e.g. a GAC stream representing the modified sound scene, is returned.

Analogously, an audio output stream, e.g. a GAC stream, can be directly generated from a mono sound source (i.e., without any merging).

The first kind of input 1111, 1112, . . . , 111M to the apparatus are audio data streams, e.g. M GAC streams, where the i-th stream comprises $L_i$ layers, $i \in \{1, 2 \ldots M\}$. Each layer of the i-th audio data stream comprises one or more pressure values of the complex pressure signal Pi, the position of the source $Q_i=[X_i, Y_i, Z_i]^T$, and the diffuseness $\psi_i$ in a time-frequency domain. If a two-dimensional representation is used, the position of the source may be defined as $Q_i=[X_i, Y_i]^T$. It should be noted, that all quantities depend on the time and frequency indices (k, n). In the formulations, however, the dependency on the time and frequency is not explicitly mentioned to keep the formulations better readable and for simplicity.

The input 1120 is optional information, being represented in a time domain, on the pressure and the position of an artificial sound source to be inserted into the sound scene. The 1140 output of the apparatus of FIG. 28 is an audio data stream, e.g. a GAC stream having $L_O$ layers.

Figure 29:
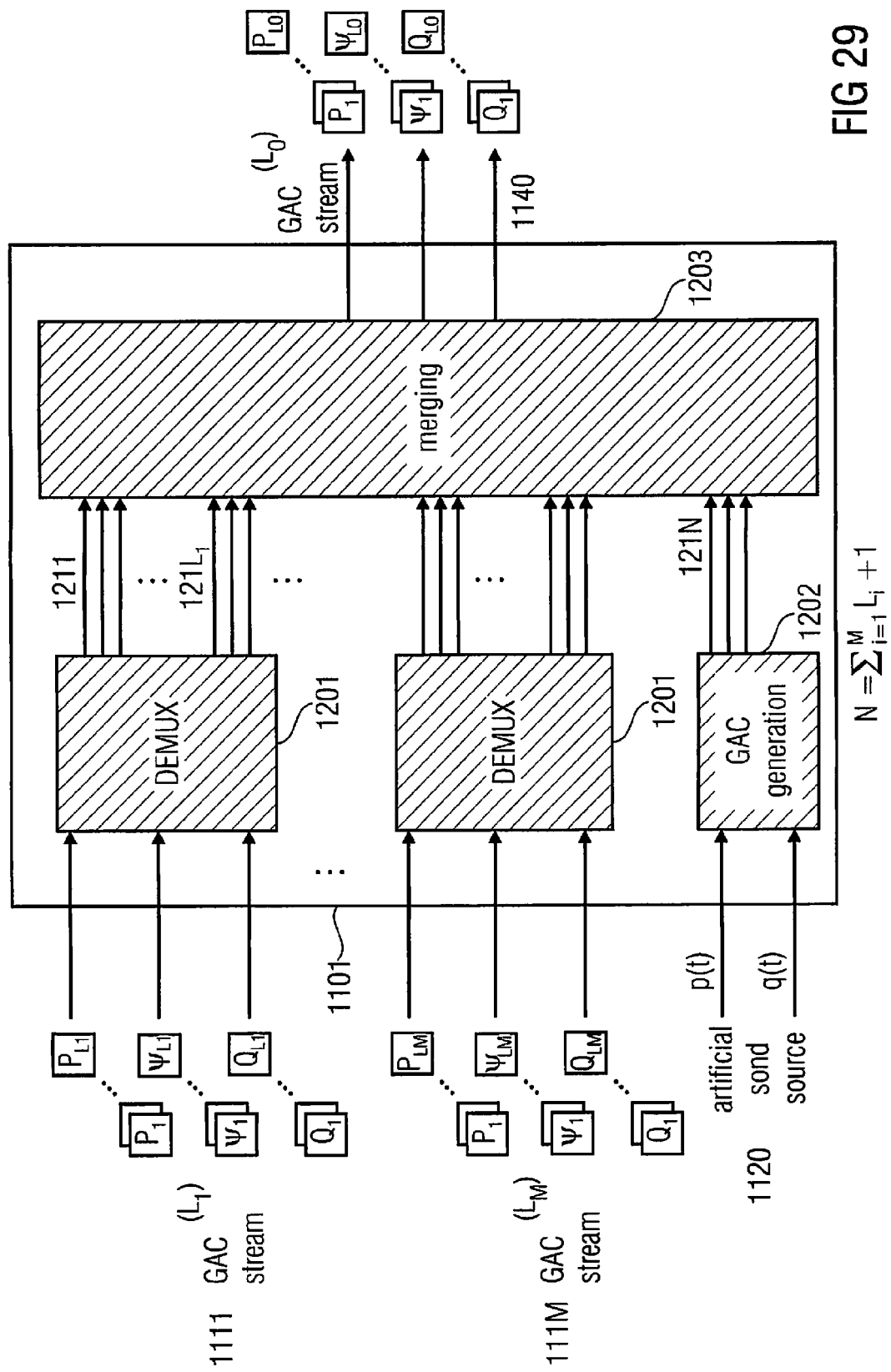
FIG. 29 illustrates an apparatus for generating a merged audio data stream according to another embodiment.

FIG. 29 illustrates an apparatus for generating a merged audio data stream according to another embodiment. In FIG. 29, the demultiplexer of FIG. 1 comprises a plurality demultiplexing units. The apparatus of FIG. 29 comprises the demultiplexing units (DEMUX) 1201, an artificial source generator (realizing audio stream, e.g. GAC stream, generation for an artificial source) 1202, and a merging module 1203.

Regarding one of the demultiplexing units 1201, the demultiplexing unit with respect to the i-th GAC stream 111$i$, which comprises $L_i$ layers, outputs $L_i$ separate single-layer GAC streams. The artificial source generator 1202 generates a single-layer GAC stream for the artificial sound source.

The merging module 1203, which carries out the merging, receives N single-layer GAC streams, wherein N is:

$$N = \sum_{i=1}^{M} L_i + 1. \qquad (1)$$

Figure 30:
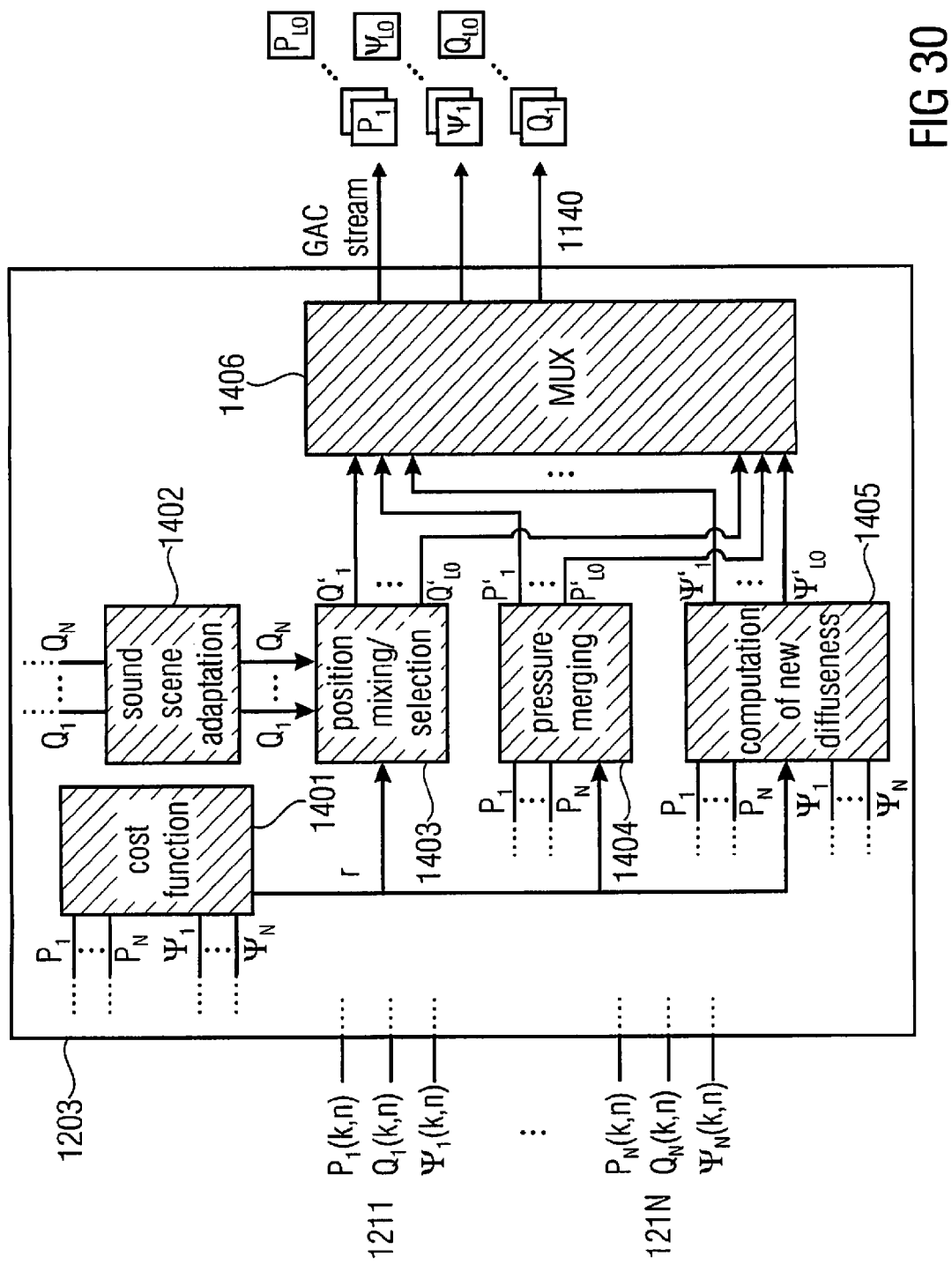
FIG. 30 depicts a merging module according to an embodiment.

FIG. 30 depicts a merging module 1203 according to an embodiment. The N single-layer audio data streams, e.g. the N single-layer GAC streams, 1211 to 121N are merged, resulting in audio data stream, e.g. one GAC stream 1140, having $L_O$ layers corresponding to the combination of the sound scenes, where $L_O \leq N$.

Merging is inter alia, based on the following concept: for each time-frequency bin, there are N IPLS active, each described by one of the N GAC streams. Considering e.g. power and diffuseness, the $L_O$ most prominent sources are identified. The first $L_O-1$ sources are simply reassigned to the first $L_O-1$ layers of the merged audio data stream, e.g. the output GAC stream, whereas all remaining sources are added to the last layer, i.e., the $L_O$-th.

The apparatus of FIG. 30 comprises a cost function module 1401. The cost function module 1401 analyses the N pressure signals and N diffuseness parameters. The cost function module 1401 is configured to determine the most prominent sound sources for each time-frequency bin. For example, the cost function $f_i$ for the i-th stream with $i \in [1.N]$ can be e.g. defined as $$f_i(\Psi_i, P_i) = (1-\Psi_i) \cdot |P_i|^2 \qquad (2)$$

such that a sound source, e.g. an IPLS, with high power and low diffuseness results in high values of the cost function. The cost function $f_i$ calculates a cost value.

The output of the cost function module 1401 is the vector r of size $L_O \times 1$, comprising the indices of the IPLS with highest $f_i$. Moreover, the indices are sorted from the most prominent IPLS to the least. This information is passed to a position mixing unit 1403, a pressure merging unit 1404, and a diffuseness merging unit 1405, where the parameters of the resulting GAC stream for each time-frequency bin are calculated accordingly. Embodiments how to compute the parameters are described in detail below.

The apparatus of FIG. 30 furthermore comprises a sound scene adaption module 1402. The sound scene adaption module 1402 allows additional control over the merging step, where the GAC position information is manipulated prior to the actual merging. In this way, several merging schemes can be achieved, e.g. merging with complete overlap of the events in the separate scenes, merging with placing the sound scenes side by side, merging with certain constraints on the amount of overlap etc.

FIG. 31a, FIG. 31b and FIG. 31c depict possible sound scene scenarios. FIG. 31a shows two sound scenes with one talker each. The vectors indicate a local coordinate system. After merging, without any modification carried out by the sound scene adaption module 1402, a sound scene as depicted at the bottom of FIG. 31a will be achieved. This might be undesired. By manipulating the coordinate system of one or more sound scenes, it is possible to compose the merged sound scene at will. In FIG. 31b, as an example, a rotation is introduced, so that in the merged sound scenes the talkers are separated. Translations (as shown in FIG. 31c) or non-linear transformations applied on the positions $Q_1$ to $Q_N$ are also possible.

The position mixing unit 1403, the pressure merging unit 1404, and the diffuseness merging unit 1405 are adapted to receive the N parameter streams as input and are adapted to compute the parameters of the resulting $L_O$ GAC streams.

Each of the parameters can be obtained in the following way:

a. The position mixing unit 1403 is adapted to determine the resulting position of the output GAC stream. The position of the i-th source in the output stream $Q_i'$ corresponds to the position of the i-th most prominent non-diffuse input source indicated by the vector r provided by the cost function module 1401.

$$Q_i' = Q_{r_i}, \text{ for } i=1,2, \ldots L_0 \qquad (3)$$

where $r_i$ indicates the i-th element of r.

By determining the $L_O$-th most prominent non-diffuse input sources as indicated by the vector r, the position mixing unit 1403 determines a group comprising one or more single-layer audio data streams, wherein the cost value of each of the single-layer audio data streams of the group may be greater than the cost value of any single-layer audio data streams not comprised in the group. The position mixing unit 1403 is adapted to select/generate the one or more position values of the one or more layers of the merged audio data stream, such that each position value of each of the single-layer audio data streams of the group is a position value of one of the layers of the merged audio data stream.

b. The resulting pressure for each of the streams is calculated by the pressure merging unit 1404. The pressure signal for all but the last ($L_O$-th) GAC stream is equal to the corresponding pressure signal according to input vector r. The pressure of the $L_O$-th GAC stream is given as a linear combination of the pressures of each of the N–$L_O$+1 remaining pressure signals, for example $$P_i' = P_{r_i}, \qquad (4)$$

$$\text{for } i = 1, 2, \ldots, L_0 - 1$$

$$P_{L_0}' = P_{r_{L_0}} + \sum_{i \notin r} P_i.$$

By determining the $L_O$–1-th most prominent non-diffuse input sources as indicated by the vector r, the pressure merging unit is adapted to determine a first group comprising one or more single-layer audio data streams of the plurality of single-layer audio data streams and to determine a second group (the remaining input sources in the vector r) comprising one or more different single-layer audio data streams of the plurality of single-layer audio data streams, wherein the cost value of each of the single-layer audio data streams of the first group is greater than the cost value of each of the single-layer audio data streams of the second group. The pressure merging unit is adapted to generate the one or more pressure values of the one or more layers of the merged audio data stream, such that each pressure value of each of the single-layer audio data streams of the first group is a pressure value of one of the layers of the merged audio data stream, and such that a combination of the pressure values of the single-layer audio data streams of the second group is a pressure value of one of the layers of the merged audio data stream.

c. The diffuseness of the resulting GAC stream is computed by the diffuseness merging unit 1405. Similarly to the other parameters, the diffuseness is copied from the input streams to all but the last, $L_O$-th GAC stream $$\Psi'_i = \Psi_{r_i}, \text{ for } i=1,2,\ldots,L_0-1.$$

The $L_O$-th diffuseness parameter may, for example, be computed considering that the pressure signal $P'_{L_0}$ comprises direct sound from more IPLS which will not be rendered coherently, as only one position $Q'_{L_0}$ can be assigned. Therefore, the amount of energy in $P'_{L_0}$ which corresponds to direct sound is merely $$(1-\Psi_{rL_0}) \cdot |P_{rL_0}|^2.$$

Consequently, the diffuseness can be obtained by $$\Psi'_{L_0} = \frac{|P'_{L_0}|^2 - (1-\Psi_{rL_0}) \cdot |P_{rL_0}|^2}{|P'_{L_0}|^2} \quad (5)$$

By determining the $L_O$-1-th most prominent non-diffuse input sources as indicated by the vector r, the diffuseness merging unit is adapted to determine a first group comprising one or more single-layer audio data streams of the plurality of single-layer audio data streams and to determine a second group (the remaining input sources in the vector r) comprising one or more different single-layer audio data streams of the plurality of single-layer audio data streams, wherein the cost value of each of the single-layer audio data streams of the first group is greater than the cost value of each of the single-layer audio data streams of the second group. The diffuseness merging unit is adapted to generate the one or more pressure values of the one or more layers of the merged audio data stream, such that each diffuseness value of each of the single-layer audio data streams of the first group is a diffuseness value of one of the layers of the merged audio data stream, and such that a combination of the diffuseness values of the single-layer audio data streams of the second group is a diffuseness value of one of the layers of the merged audio data stream.

Finally, the resulting $L_O$ single-layer GAC streams are multiplexed in block 1406 to form the final GAC stream (output 1140) of $L_O$ layers.

In the following, artificial source generators according to embodiments are described in more detail with reference to FIG. 32a and FIG. 32b.

The artificial source generator is an optional module and uses as input 1120 a position and a pressure signal expressed in time domain of an artificial sound source, which shall be inserted into the sound scene. It then returns the GAC stream of the artificial source as output 121N.

Figure 32A:
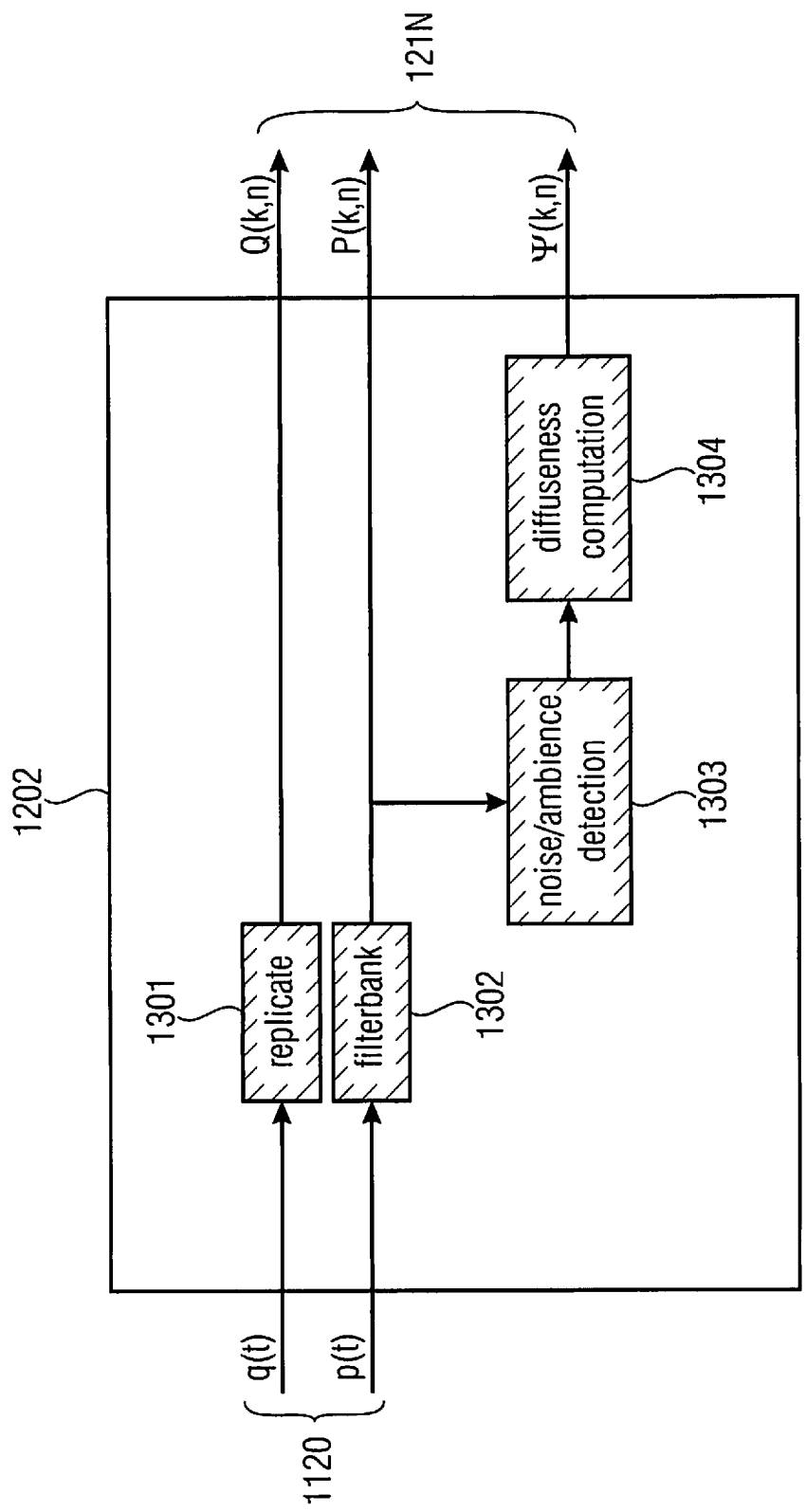
FIG. 32a-32b illustrate artificial source generators according to embodiments.
Figure 32B:
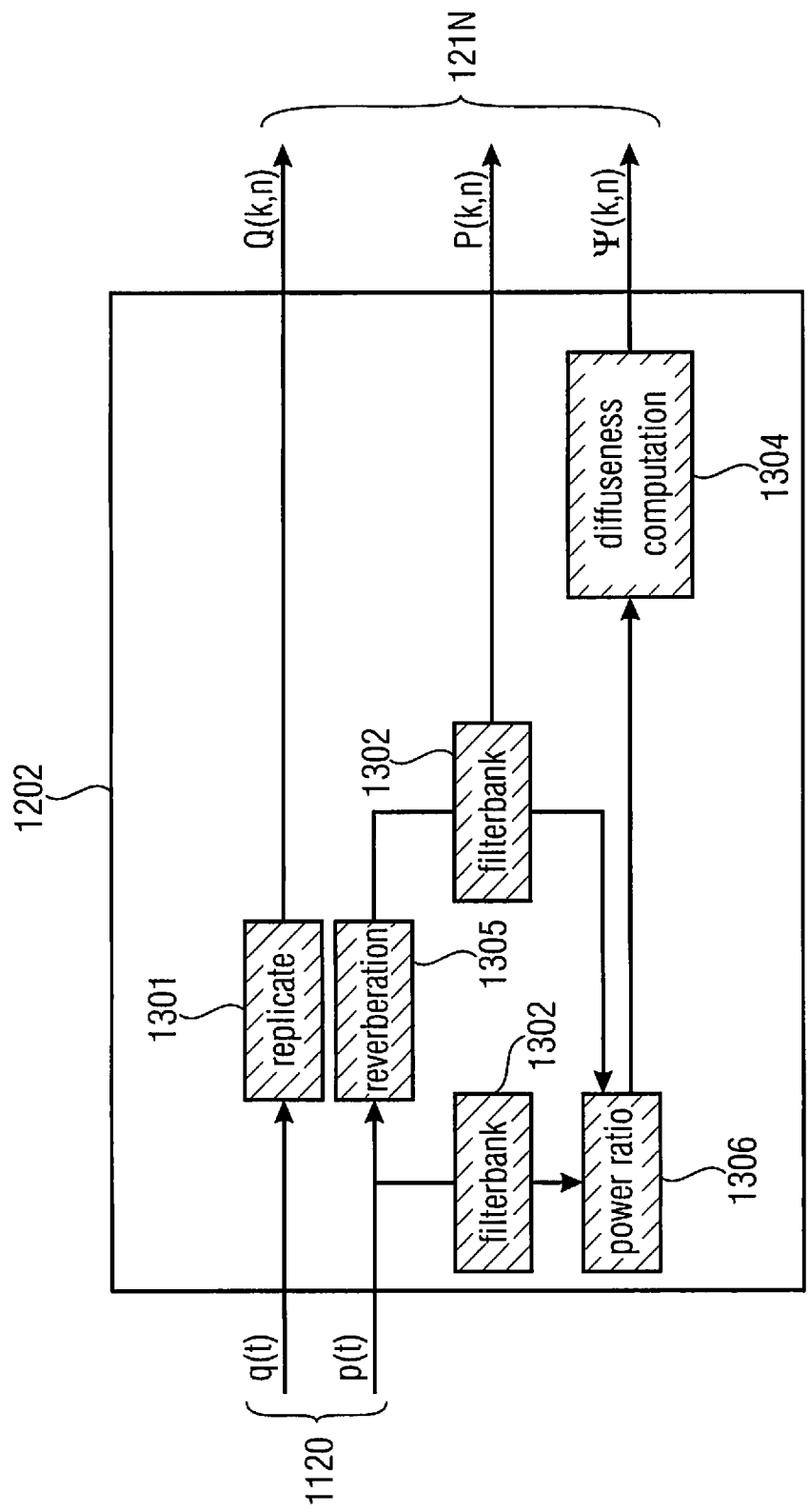

The information about the position of the source in time is given to the first processing block 1301. If the sound source is not moving, block 1301 simply copies the position to all time-frequency bins Q(k, n) in output 21N. For a moving source, the information in q(t) is copied to all frequency bins k corresponding to the proper time block n. The output of block 1301 is then directly passed as GAC stream to block 1203. The pressure signal p(t) of the injected source 1120 may be a. directly converted to the pressure signal of the GAC stream P(k, n) (see FIG. 32a)

b. reverberated first and then converted to the pressure signal of the GAC stream P(k, n) (see FIG. 32b).

According to embodiment a), illustrated in FIG. 32a, the signal is transformed into frequency domain using the analysis filterbank in block 1302 and then passed as parameter of the GAC stream corresponding to the inserted source. If the pressure signal p(t) is not dry, the signal may go through the optional block 1303, where the noise and/or ambience are detected. The information on the noise and ambience is then passed to block 1304, which computes the diffuseness estimate. Block 1303 may implement a state-of-the-art algorithm for these purposes, such as the one described in

[30] C. Uhle and C. Paul: A supervised learning approach to ambience extraction from mono recordings for blind upmixing in Proc. of the 11$^{th}$ Int. Conference on Digital Audio Effects (DAFx-08), Espoo, Finland, Sep. 1-4, 2008.

The information on the noise and ambience is then passed to block 1304, which computes the diffuseness estimate. This is particularly useful to avoid that ambience and noise comprised in p(t) are reproduced coherently at the synthesis. Therefore, the mechanism just described guarantees that the direct part of the signal is assigned a low diffuseness value whereas the noisy and ambient parts of the signal are associated with high diffuseness. Alternatively to the signal path way of block 1303 and 1304, the diffuseness parameter in 121N can be simply set to a constant value.

The embodiment b), illustrated in FIG. 32b, in some sense the opposite situation, is covered. Assuming that p(t) is a dry signal, it might be desired to add reverberation to make p(t) sound more natural, i.e., to make the synthetic sound source sound as if it was recorded in a room. This is achieved by means of block 1305. Both the reverberated and original signals undergo transformation conducted with the analysis filterbank 1302 and are then passed to the power ratio analysis block 1306. Block 1306 computes information on how much reverberation and how much direct sound is present in a certain time-frequency bin, for example, by computing the Direct to Reverberation Ratio (DRR). This information is then passed to block 1304, in which the diffuseness is computed.

For high DRR the diffuseness parameter is set to low values, whereas when reverberation dominates (e.g., in the tails of late reverberation) diffuseness is set to high values.

In the following, some special cases are described.

1. If M single-layer GAC streams need to be merged into a $L_O$=1 GAC stream, then a simplified embodiment can be employed. The resulting GAC stream will be characterized by:
   pressure: The pressure will be the sum of all M pressure signals
   position: The position will be the position of the strongest sound sources, e.g. the strongest IPLS diffuseness: The diffuseness will be computed according to formula (5).
2. If the number of layers at the output equals the total number of layers at the input, i.e., $L_O=N$, then, the output stream can be seen as a concatenation of the input streams.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding unit or item or feature of a corresponding apparatus.

The inventive decomposed signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LITERATURE

[1] Michael A. Gerzon. Ambisonics in multichannel broadcasting and video. J. Audio Eng. Soc, 33(11):859-871, 1985.

[2] V. Pulkki, "Directional audio coding in spatial sound reproduction and stereo upmixing," in Proceedings of the AES $28^{th}$ International Conference, pp. 251-258, PiteA, Sweden, Jun. 30-Jul. 2, 2006.

[3] V. Pulkki, "Spatial sound reproduction with directional audio coding," J. Audio Eng. Soc., vol. 55, no. 6. pp. 503-516, June 2007.

[4] C. Faller: "Microphone Front-Ends for Spatial Audio Coders", in Proceedings of the AES$125^{th}$ International Convention, San Francisco, October 2008.

[5] M. Kallinger. H. Ochsenfeld. G. Del Galdo. F. Ktich. D. Mahne. R. Schultz-Amling. and O. Thiergart, "A spatial filtering approach for directional audio coding." in Audio Engineering Society Convention 126, Munich, Germany, May 2009.

[6] R. Schultz-Amling, F. Küch. O. Thiergart, and M. Kallinger. "Acoustical zooming based on a parametric sound field representation," in Audio Engineering Society Convention 128, London UK, May 2010.

[7] J. Herre, C. Falch, D. Mahne, G. Del Galdo. M. Kallinger, and O. Thiergart. "Interactive teleconferencing combining spatial audio object coding and DirAC technology." in Audio Engineering Society Convention 128, London UK. May 2010.

[8] E. G. Williams, Fourier Acoustics: Sound Radiation and Neartield Acoustical Holography, Academic Press, 1999.

[9] A. Kuntz and R. Rabenstein, "Limitations in the extrapolation of wave fields from circular measurements," in 15th European Signal Processing Conference (EUSIPCO 2007). 2007.

[10] A. Walther and C. Faller, "Linear simulation of spaced microphone arrays using b-format recordings," in Audio Engiineering Society Convention 128. London UK. May 2010.

[11] U.S. 61/287,596: An Apparatus and a Method for Converting a First Parametric Spatial Audio Signal into a Second Parametric Spatial Audio Signal.

[12] S. Rickard and Z. Yilmaz, "On the approximate W-disjoint orthogonality of speech," in Acoustics, Speech and Signal Processing, 2002. ICASSP 2002. IEEE International Conference on, April 2002. vol. 1.

[13] R. Roy, A. Paulraj, and T. Kailath, "Direction-of-arrival estimation by subspace rotation methods—ESPRIT," in IEEE International Conference on Acoustics, Speech, and Signal Processing (ICASSP), Stanford, Calif., USA, April 1986.

[14] R. Schmidt, "Multiple emitter location and signal parameter estimation." IEEE Transactions on Antennas and Propagation, vol. 34, no. 3, pp. 276-280, 1986.

[15] J. Michael Steele, "Optimal Triangulation of Random Samples in the Plane", The Annals of Probability, Vol. 10, No. 3 (August, 1982), pp. 548-553.

[16] F. J. Fahy, Sound Intensity, Essex: Elsevier Science Publishers Ltd., 1989.

[17] R. Schultz-Amling. F. Küch, M. Kallinger, G. Del Galdo, T. Ahonen and V. Pulkki. "Planar microphone array processing for the analysis and reproduction of spatial audio using directional audio coding." in Audio Engineering Society Convention 124. Amsterdam. The Netherlands. May 2008.

[18] M. Kallinger, F. Kuck R. Schultz-Amling, G. Del Galdo. T. Ahonen and V. Pulkki, "Enhanced direction estimation using microphone arrays for directional audio coding;" in Hands-Free Speech Communication and Microphone Arrays, 2008. HSCMA 2008, May 2008, pp. 45-48.

[19] R. K. Furness, "Ambisonics—An overview," in AES $8^{th}$ International Conference, April 1990, pp. 181-189.

[20] Giovanni Del Galdo, Oliver Thiergart, Tobias Weller, and E. A. P. Habets. Generating virtual microphone signals using geometrical information gathered by distributed arrays. In Third Joint Workshop on Hands-free Speech Communication and Microphone Arrays (HSCMA '11), Edinburgh, United Kingdom, May 2011.

[21] Jürgen Herre, Cornelia Falch, Dirk Mahne, Giovanni Del Galdo, Markus Kallinger, and Oliver Thiergart. Interactive teleconferencing combining spatial audio object coding and DirAC technology. In Audio Engineering Society Convention 128, 5 2010.

[22] G. Del Galdo, F. Kuech, M. Kallinger, and R. Schultz-Amling. Efficient merging of multiple audio streams for spatial sound reproduction in directional audio coding. In International Conference on Acoustics, Speech, and Signal Processing (ICASSP 2009), 2009.

[23] US 20110216908: Apparatus for Merging Spatial Audio Streams.

[24] Emmanuel Gallo and Nicolas Tsingos. Extracting and re-rendering structured auditory scenes from field recordings. In AES 30th International Conference on Intelligent Audio Environments, 2007.

[25] Jeroen Breebaart, Jonas Engdegård, Cornelia Falch, Oliver Hellmuth, Johannes Hilpert, Andreas Hoelzer, Jeroesn Koppens, Werner Oomen, Barbara Resch, Erik Schuijers, and Leonid Terentiev. Spatial audio object coding (saoc)—the upcoming mpeg standard on parametric object based audio coding. In Audio Engineering Society Convention 124, 5 2008.

[26] R. Roy and T. Kailath. ESPRIT-estimation of signal parameters via rotational invariance techniques. Acoustics, Speech and Signal Processing, IEEE Transactions on, 37(7):984-995, July 1989.

[27] Tapio Lokki, Juha Merimaa, and Ville Pulkki. Method for reproducing natural or modified spatial impression in multichannel listening, 2006.

[28] Svein Merge. Device and method for converting spatial audio signal. U.S. patent application Ser. No. 10/547,151.

[29] Ville Pulkki. Spatial sound reproduction with directional audio coding. J. Audio Eng. Soc, 55(6):503-516, June 2007.

[30] C. Me and C. Paul: A supervised learning approach to ambience extraction from mono recordings for blind upmixing in Proc. of the $11^{th}$ Int. Conference on Digital Audio Effects (DAFx-08), Espoo, Finland, Sep. 1-4, 2008.

The invention claimed is:

1. An apparatus for generating a merged audio data stream, wherein the apparatus is implemented using a hardware apparatus or a computer, wherein the apparatus comprises:

a demultiplexer for acquiring a plurality of single-layer audio data streams, wherein the demultiplexer is adapted to receive one or more input audio data streams, wherein each input audio data stream comprises one or more layers, wherein the demultiplexer is adapted to demultiplex each one of the input audio data streams comprising one or more layers into two or more demultiplexed audio data streams comprising exactly one layer, such that the two or more demultiplexed audio data streams together comprise the one or more layers of the input audio data stream, to acquire two or more of the single-layer audio data streams; and a merging module for generating the merged audio data stream, comprising one or more layers, based on the plurality of single-layer audio data streams, wherein each layer of the input data audio streams, of the demultiplexed audio data streams, of the single-layer data streams and of the merged audio data stream comprises a pressure value of a pressure signal, a position value and a diffuseness value as audio data, wherein the position value indicates a position of a sound source.

2. An apparatus according to claim 1, wherein the audio data is defined for a time-frequency bin of a plurality of time-frequency bins.

3. An apparatus according to claim 2, wherein the merging module furthermore comprises a pressure merging unit, wherein the pressure merging unit is adapted to determine a first group comprising one or more single-layer audio data streams of the plurality of single-layer audio data streams and to determine a second group comprising one or more different single-layer audio data streams of the plurality of single-layer audio data streams, wherein a cost value of each of the single-layer audio data streams of the first group is greater than a cost value of each of the single-layer audio data streams of the second group, or wherein the cost value of each of the single-layer audio data streams of the first group is smaller than the cost value of each of the single-layer audio data streams of the second group, wherein the pressure merging unit is adapted to generate the one or more pressure values of the one or more layers of the merged audio data stream, such that each pressure value of each of the single-layer audio data streams of the first group is a pressure value of one of the layers of the merged audio data stream, and such that a combination of the pressure values of the single-layer audio data streams of the second group is a pressure value of one of the layers of the merged audio data stream.

4. An apparatus according to claim 2, wherein the merging module furthermore comprises a diffuseness merging unit, wherein the diffuseness merging unit is adapted to determine a third group comprising one or more single-layer audio data streams of the plurality of single-layer audio data streams and to determine a fourth group comprising one or more different single-layer audio data streams of the plurality of single-layer audio data streams, wherein a cost value of each of the single-layer audio data streams of the third group is greater than a cost value of each of the single-layer audio data streams of the fourth group, or wherein the cost value of each of the single-layer audio data streams of the third group is smaller than the cost value of each of the single-layer audio data streams of the fourth group, wherein the diffuseness merging unit is adapted to generate the one or more diffuseness values of the one or more layers of the merged audio data stream, such that each diffuseness value of each of the single-layer audio data streams of the third group is a diffuseness value of one of the layers of the merged audio data stream, and such that a combination of the diffuseness values of the single-layer audio data streams of the fourth group is a diffuseness value of one of the layers of the merged audio data stream.

5. An apparatus according to claim 2,
wherein the merging module furthermore comprises a position mixing unit,
wherein the position mixing unit is adapted to determine a fifth group comprising one or more single-layer audio data streams of the plurality of single-layer audio data streams,
wherein a cost value of each of the single-layer audio data streams of the fifth group is greater than a cost value of any single-layer audio data streams not comprised in the fifth group of the plurality of single-layer audio data streams, or wherein the cost value of each of the single-layer audio data streams of the fifth group is smaller than the cost value of any single-layer audio data streams not comprised in the fifth group of the plurality of single-layer audio data streams,
wherein the position value unit is adapted to generate the one or more position values of the one or more layers of the merged audio data stream, such that each position value of each of the single-layer audio data streams of the fifth group is a position value of one of the layers of the merged audio data stream.

6. An apparatus according to claim 2, wherein the merging module furthermore comprises a sound scene adaption module for manipulating the position value of one or more of the single-layer audio data streams of the plurality of single-layer audio data streams.

7. An apparatus according to claim 6, wherein the sound scene adaption module is adapted to manipulate the position value of the one or more of the single-layer audio data streams of the plurality of single-layer audio data streams applying a rotation, a translation or a non-linear transformation on the position value.

8. An apparatus according to claim 1,
wherein the merging module comprises a cost function module for assigning a cost value to each one of the single-layer audio data streams, and
wherein the merging module is adapted to generate the merged audio data stream based on the cost values assigned to the single-layer audio data streams.

9. An apparatus according to claim 8, wherein the cost function module is adapted to assign the cost value to each one of the single-layer audio data streams depending on at least one of the pressure values or the diffuseness values of the single-layer audio data stream.

10. An apparatus according to claim 9, wherein the cost function module is adapted to assign the cost value to each audio data stream of the group of single-layer audio data streams by applying the formula:

$$f_i(\Psi_i, P_i) = (1-\Psi_i) \cdot |P_i|^2$$

wherein $P_i$ is the pressure value and $\Psi_i$ is the diffuseness value of the layer of an i-th audio data stream of the group of single-layer audio data streams.

11. An apparatus according to claim 1, wherein the demultiplexer is adapted to modify a magnitude of one of the pressure values of one of the demultiplexed audio data streams by multiplying the magnitude by a scalar value.

12. An apparatus according to claim 1, wherein the demultiplexer comprises a plurality of demultiplexing units, wherein each one of the demultiplexing units is configured to demultiplex one or more of the input audio data streams.

13. An apparatus according to claim 1,
wherein the apparatus furthermore comprises an artificial source generator for generating an artificial data stream comprising exactly one layer,
wherein the artificial source generator is adapted to receive pressure information being represented in a time domain and to receive a position information,
wherein the artificial source generator is adapted to replicate the pressure information to generate position information for a plurality of time-frequency bins,
and wherein the artificial source generator is furthermore adapted to calculate diffuseness information based on the pressure information.

14. An apparatus according to claim 13, wherein the artificial source generator is adapted to transform the pressure information being represented in a time-domain to a time-frequency domain.

15. An apparatus according to claim 13, wherein the artificial source generator is adapted to add reverberation to the pressure information.

16. A method for generating a merged audio data stream, comprising
acquiring a plurality of single-layer audio data streams, wherein the demultiplexer is adapted to receive one or more input audio data streams, wherein each input audio data stream comprises one or more layers, wherein the demultiplexer is adapted to demultiplex each one of the input audio data streams comprising one or more layers into two or more demultiplexed audio data streams comprising exactly one layer, such that the two or more demultiplexed audio data streams together comprise the one or more layers of the input audio data stream, to acquire two or more of the single-layer audio data streams; and
generating the merged audio data stream, comprising one or more layers, based on the plurality of single-layer audio data streams,
wherein each layer of the input data audio streams, of the demultiplexed audio data streams, of the single-layer data streams and of the merged audio data stream comprises a pressure value of a pressure signal, a position value and a diffuseness value as audio data, the audio data being defined for a time-frequency bin of a plurality of time-frequency bins, wherein the position value indicates a position of a sound source.

17. A non-transitory digital storage medium comprising a computer program for implementing the method for generating a merged audio data stream, the method comprising
acquiring a plurality of single-layer audio data streams, wherein the demultiplexer is adapted to receive one or more input audio data streams, wherein each input audio data stream comprises one or more layers, wherein the demultiplexer is adapted to demultiplex each one of the input audio data streams comprising one or more layers into two or more demultiplexed audio data streams comprising exactly one layer, such that the two or more demultiplexed audio data streams together comprise the one or more layers of the input audio data stream, to acquire two or more of the single-layer audio data streams; and generating the merged audio data stream, comprising one or more layers, based on the plurality of single-layer audio data streams, wherein each layer of the input data audio streams, of the demultiplexed audio data streams, of the single-layer data streams and of the merged audio data stream comprises a pressure value of a pressure signal, a position value and a diffuseness value as audio data, the audio data being defined for a time-frequency bin of a plurality of time-frequency bins, wherein the position value indicates a position of a sound source, when being executed on a computer or a signal processor.

* * * * *